US012621715B2

(12) United States Patent
Paladugu et al.

(10) Patent No.:  US 12,621,715 B2
(45) Date of Patent:       May 5, 2026

(54) SESSION OFFLOADING FOR L2 UE-TO-NETWORK RELAY ARCHITECTURE

(71) Applicant: QUALCOMM Incorporated, San Diego, CA (US)

(72) Inventors: Karthika Paladugu, San Diego, CA (US); Hong Cheng, Basking Ridge, NJ (US); Gavin Bernard Horn, La Jolla, CA (US); Soo Bum Lee, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 500 days.

(21) Appl. No.: 17/454,621

(22) Filed: Nov. 11, 2021

(65) Prior Publication Data

US 2023/0142957 A1      May 11, 2023

(51) Int. Cl.
*H04W 28/086*        (2023.01)
*H04W 28/02*         (2009.01)

(52) U.S. Cl.
CPC ...  *H04W 28/0861* (2023.05); *H04W 28/0226* (2013.01); *H04W 28/0231* (2013.01); *H04W 28/0252* (2013.01)

(58) Field of Classification Search
CPC ......... H04W 28/0861; H04W 28/0226; H04W 28/0231; H04W 28/0252; H04W 88/04; H04W 92/18; H04W 76/22
See application file for complete search history.

(56) References Cited

U.S. PATENT DOCUMENTS

| | | | |
|---|---|---|---|
| 2019/0075438 A1 | 3/2019 | Kuo et al. | |
| 2022/0322202 A1* | 10/2022 | Li | H04M 15/8033 |
| 2022/0377822 A1* | 11/2022 | Wang | H04W 36/033 |
| 2023/0189101 A1* | 6/2023 | Bi | H04W 36/03 370/331 |

(Continued)

FOREIGN PATENT DOCUMENTS

EP           3471493 A1      4/2019

OTHER PUBLICATIONS

Kozoil et al, "QoS and Service Continuity in 3GPP D2D for IoT and Wearables", IEEE, 2017 (Year: 2017).*

(Continued)

*Primary Examiner* — Omer S Mian
(74) *Attorney, Agent, or Firm* — Procopio, Cory, Hargreaves & Savitch LLP/QUALCOMM Incorporated

(57)                    ABSTRACT

A remote UE or a relay UE may identify a configuration for a relocation of one or more session termination points associated with one or more radio access packet data sessions from the relay UE to the remote UE or from the remote UE to the relay UE. The remote UE or the relay UE may execute the relocation of the one or more session termination points associated with the one or more radio access packet data sessions from the relay UE to the remote UE or from the remote UE to the relay UE based on the configuration. The session termination point relocation may be controlled by the remote UE, the relay UE, or a network entity. The remote UE may transmit or receive data with a network via the relay UE based on the relocation of the one or more session termination points.

48 Claims, 22 Drawing Sheets

(56)                    References Cited

U.S. PATENT DOCUMENTS

2023/0269578 A1 *    8/2023   Yilmaz   ................. H04W 74/08
                                                                        726/3
2023/0319549 A1 *   10/2023   Dees   ..................... H04W 12/06
                                                                        455/410

OTHER PUBLICATIONS

"3rd Generation Partnership Project, Technical Specification Group Radio Access Network, Study on NR Sidelink Relay, (Release 17)", 3GPP Standard, Technical Report, 3GPP TR 38.836, 3rd Generation Partnership Project, Mobile Competence Centre, 650, Route Des Lucioles, F-06921 Sophia-Antipolis Cedex, France, vol. RAN WG2, No. V17.0.0 Mar. 29, 2021, XP052000125, pp. 1-26, sections 5-6, paragraph [4.5.4.2] figures 4.5.4.2-1.
International Search Report and Written Opinion—PCT/US2022/046602—ISA/EPO—Feb. 2, 2023.
3GPP: 3rd Generation Partnership Project, Technical Specification Group Radio Access Network, Study on NR sidelink relay, (Release 17), TR 38.836 V17.0.0, Mar. 2021, 26 Pages, Section 4.5.1.
3GPP: 3rd Generation Partnership Project, Technical Specification Group Services and System Aspects, Study on System Enhancement for Proximity Based Services (ProSe) in the 5G System (5GS) (Release 17), TR 23.752 V17.0.0, Mar. 2021, 184 Pages, Section 6.7.3.

* cited by examiner

1000A

1000B

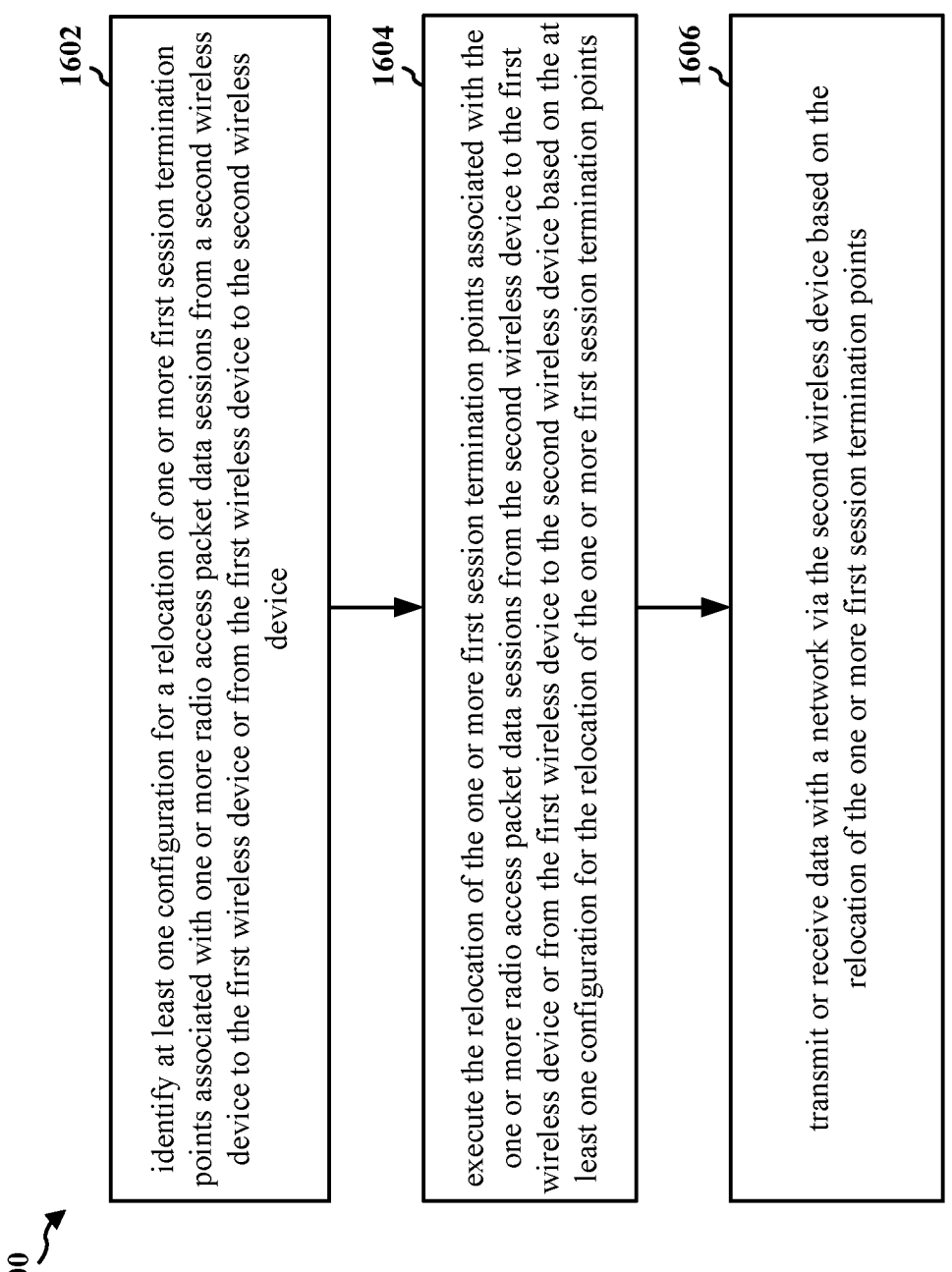

1602 identify at least one configuration for a relocation of one or more first session termination points associated with one or more radio access packet data sessions from a second wireless device to the first wireless device or from the first wireless device to the second wireless device

1604 execute the relocation of the one or more first session termination points associated with the one or more radio access packet data sessions from the second wireless device to the first wireless device or from the first wireless device to the second wireless device based on the at least one configuration for the relocation of the one or more first session termination points

1606 transmit or receive data with a network via the second wireless device based on the relocation of the one or more first session termination points

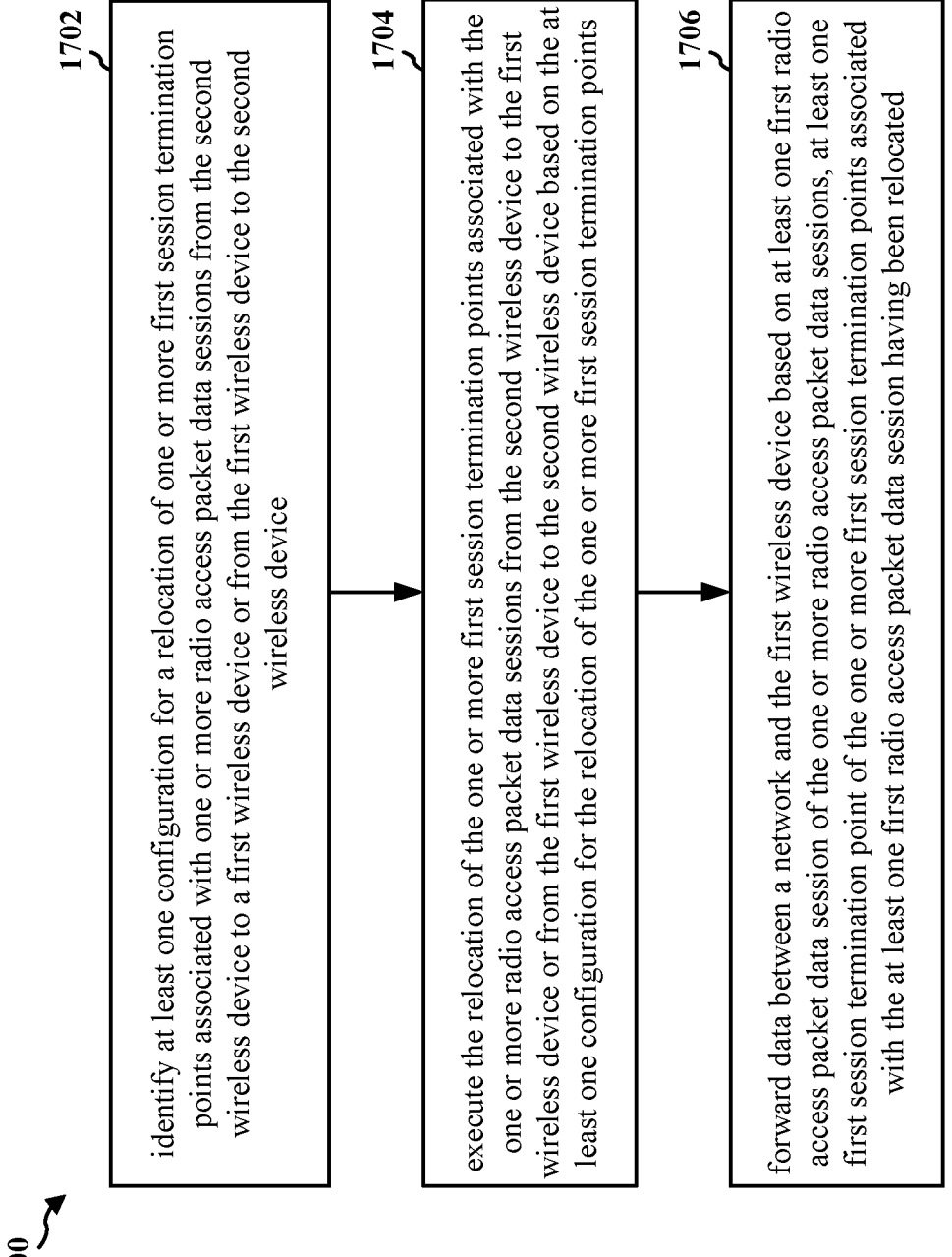

1702 identify at least one configuration for a relocation of one or more first session termination points associated with one or more radio access packet data sessions from the second wireless device or from the first wireless device to a first wireless device to the second wireless device

1704 execute the relocation of the one or more first session termination points associated with the one or more radio access packet data sessions from the second wireless device to the first wireless device or from the first wireless device to the second wireless device based on the at least one configuration for the relocation of the one or more first session termination points

1706 forward data between a network and the first wireless device based on at least one first radio access packet data session of the one or more radio access packet data sessions, at least one first session termination point of the one or more first session termination points associated with the at least one first radio access packet data session having been relocated

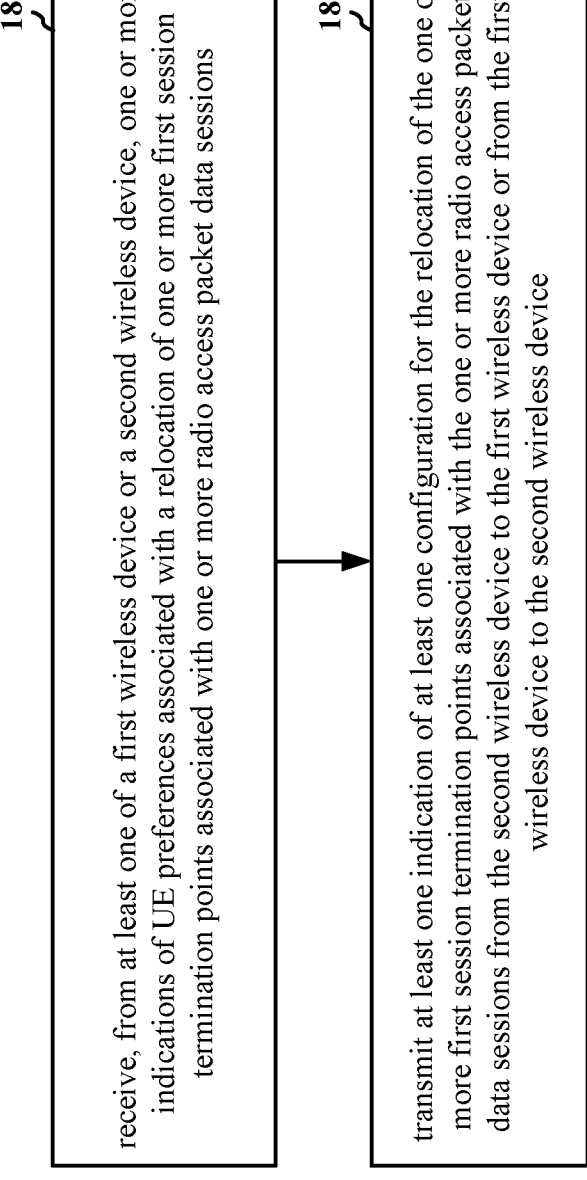

1802 receive, from at least one of a first wireless device or a second wireless device, one or more indications of UE preferences associated with a relocation of one or more first session termination points associated with one or more radio access packet data sessions

1804 transmit at least one indication of at least one configuration for the relocation of the one or more first session termination points associated with the one or more radio access packet data sessions from the second wireless device to the first wireless device or from the first wireless device to the second wireless device

SESSION OFFLOADING FOR L2 UE-TO-NETWORK RELAY ARCHITECTURE

INTRODUCTION

The present disclosure relates generally to communication systems, and more particularly, to session management in connection with a relay link in a wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method is provided. The method may be performed by a first wireless device. The method includes identifying at least one configuration for a relocation of one or more first session termination points associated with one or more radio access packet data sessions from a second wireless device to the first wireless device or from the first wireless device to the second wireless device. The method includes executing the relocation of the one or more first session termination points associated with the one or more radio access packet data sessions from the second wireless device to the first wireless device or from the first wireless device to the second wireless device based on the at least one configuration for the relocation of the one or more first session termination points. The method includes transmitting or receiving data with a network via the second wireless device based on the relocation of the one or more first session termination points.

In another aspect of the disclosure, an apparatus is provided. The apparatus may be a first wireless device. The apparatus includes a memory and at least one processor coupled to the memory, the memory and the at least one processor configured to: identify at least one configuration for a relocation of one or more first session termination points associated with one or more radio access packet data sessions from a second wireless device to the first wireless device or from the first wireless device to the second wireless device; execute the relocation of the one or more first session termination points associated with the one or more radio access packet data sessions from the second wireless device to the first wireless device or from the first wireless device to the second wireless device based on the at least one configuration for the relocation of the one or more first session termination points; and transmit or receive data with a network via the second wireless device based on the relocation of the one or more first session termination points.

In another aspect of the disclosure, an apparatus is provided. The apparatus may be a first wireless device. The apparatus includes means for identifying at least one configuration for a relocation of one or more first session termination points associated with one or more radio access packet data sessions from a second wireless device to the first wireless device or from the first wireless device to the second wireless device. The apparatus includes means for executing the relocation of the one or more first session termination points associated with the one or more radio access packet data sessions from the second wireless device to the first wireless device or from the first wireless device to the second wireless device based on the at least one configuration for the relocation of the one or more first session termination points. The apparatus includes means for transmitting or receiving data with a network via the second wireless device based on the relocation of the one or more first session termination points.

In another aspect of the disclosure, a computer-readable storage medium is provided. The computer-readable medium includes computer executable code at a first wireless device, the code when executed by a processor causes the processor to: identify at least one configuration for a relocation of one or more first session termination points associated with one or more radio access packet data sessions from a second wireless device to the first wireless device or from the first wireless device to the second wireless device; execute the relocation of the one or more first session termination points associated with the one or more radio access packet data sessions from the second wireless device to the first wireless device or from the first wireless device to the second wireless device based on the at least one configuration for the relocation of the one or more first session termination points; and transmit or receive data with a network via the second wireless device based on the relocation of the one or more first session termination points.

In an aspect of the disclosure, a method is provided. The method may be performed by a second wireless device. The method includes identifying at least one configuration for a relocation of one or more first session termination points associated with one or more radio access packet data sessions from the second wireless device to a first wireless device or from the first wireless device to the second wireless device. The method includes executing the relocation of the one or more first session termination points associated with the one or more radio access packet data sessions from the second wireless device to the first wireless device or from the first wireless device to the second wireless device based on the at least one configuration for the relocation of the one or more first session termination points. The method includes forwarding data between a network and the first wireless device based on at least one first radio access packet data session of the one or more radio access packet data sessions. At least one first session termination point of the one or more first session termination points associated with the at least one first radio access packet data session may have been relocated.

In another aspect of the disclosure, an apparatus is provided. The apparatus may be a second wireless device. The apparatus includes a memory and at least one processor coupled to the memory, the memory and the at least one processor configured to: identify at least one configuration for a relocation of one or more first session termination points associated with one or more radio access packet data sessions from the second wireless device to a first wireless device or from the first wireless device to the second wireless device; execute the relocation of the one or more first session termination points associated with the one or more radio access packet data sessions from the second wireless device to the first wireless device or from the first wireless device to the second wireless device based on the at least one configuration for the relocation of the one or more first session termination points; and forward data between a network and the first wireless device based on at least one first radio access packet data session of the one or more radio access packet data sessions, at least one first session termination point of the one or more first session termination points associated with the at least one first radio access packet data session having been relocated.

In another aspect of the disclosure, an apparatus is provided. The apparatus may be a second wireless device. The apparatus includes means for identifying at least one configuration for a relocation of one or more first session termination points associated with one or more radio access packet data sessions from the second wireless device to a first wireless device or from the first wireless device to the second wireless device. The apparatus includes means for executing the relocation of the one or more first session termination points associated with the one or more radio access packet data sessions from the second wireless device to the first wireless device or from the first wireless device to the second wireless device based on the at least one configuration for the relocation of the one or more first session termination points. The apparatus includes means for forwarding data between a network and the first wireless device based on at least one first radio access packet data session of the one or more radio access packet data sessions. At least one first session termination point of the one or more first session termination points associated with the at least one first radio access packet data session may have been relocated.

In another aspect of the disclosure, a computer-readable storage medium is provided. The computer-readable medium includes computer executable code at a second wireless device, the code when executed by a processor causes the processor to: identify at least one configuration for a relocation of one or more first session termination points associated with one or more radio access packet data sessions from the second wireless device to a first wireless device or from the first wireless device to the second wireless device; execute the relocation of the one or more first session termination points associated with the one or more radio access packet data sessions from the second wireless device to the first wireless device or from the first wireless device to the second wireless device based on the at least one configuration for the relocation of the one or more first session termination points; and forward data between a network and the first wireless device based on at least one first radio access packet data session of the one or more radio access packet data sessions, at least one first session termination point of the one or more first session termination points associated with the at least one first radio access packet data session having been relocated.

In an aspect of the disclosure, a method is provided. The method may be performed by a network entity. The method includes receiving, from at least one of a first wireless device or a second wireless device, one or more indications of UE preferences associated with a relocation of one or more first session termination points associated with one or more radio access packet data sessions. The method includes transmitting at least one indication of at least one configuration for the relocation of the one or more first session termination points associated with the one or more radio access packet data sessions from the second wireless device to the first wireless device or from the first wireless device to the second wireless device.

In another aspect of the disclosure, an apparatus is provided. The apparatus may be a network entity. The apparatus includes a memory and at least one processor coupled to the memory, the memory and the at least one processor configured to: receive, from at least one of a first wireless device or a second wireless device, one or more indications of UE preferences associated with a relocation of one or more first session termination points associated with one or more radio access packet data sessions; and transmit at least one indication of at least one configuration for the relocation of the one or more first session termination points associated with the one or more radio access packet data sessions from the second wireless device to the first wireless device or from the first wireless device to the second wireless device.

In another aspect of the disclosure, an apparatus is provided. The apparatus may be a network entity. The apparatus includes means for receiving, from at least one of a first wireless device or a second wireless device, one or more indications of UE preferences associated with a relocation of one or more first session termination points associated with one or more radio access packet data sessions. The apparatus includes means for transmitting at least one indication of at least one configuration for the relocation of the one or more first session termination points associated with the one or more radio access packet data sessions from the second wireless device to the first wireless device or from the first wireless device to the second wireless device.

In another aspect of the disclosure, a computer-readable storage medium is provided. The computer-readable medium includes computer executable code at a network entity, the code when executed by a processor causes the processor to: receive, from at least one of a first wireless device or a second wireless device, one or more indications of UE preferences associated with a relocation of one or more first session termination points associated with one or more radio access packet data sessions; and transmit at least one indication of at least one configuration for the relocation of the one or more first session termination points associated with the one or more radio access packet data sessions from the second wireless device to the first wireless device or from the first wireless device to the second wireless device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 16 is a flowchart of a method of wireless communication.

FIG. 17 is a flowchart of a method of wireless communication.

FIG. 18 is a flowchart of a method of wireless communication.

DETAILED DESCRIPTION

Figure 1:
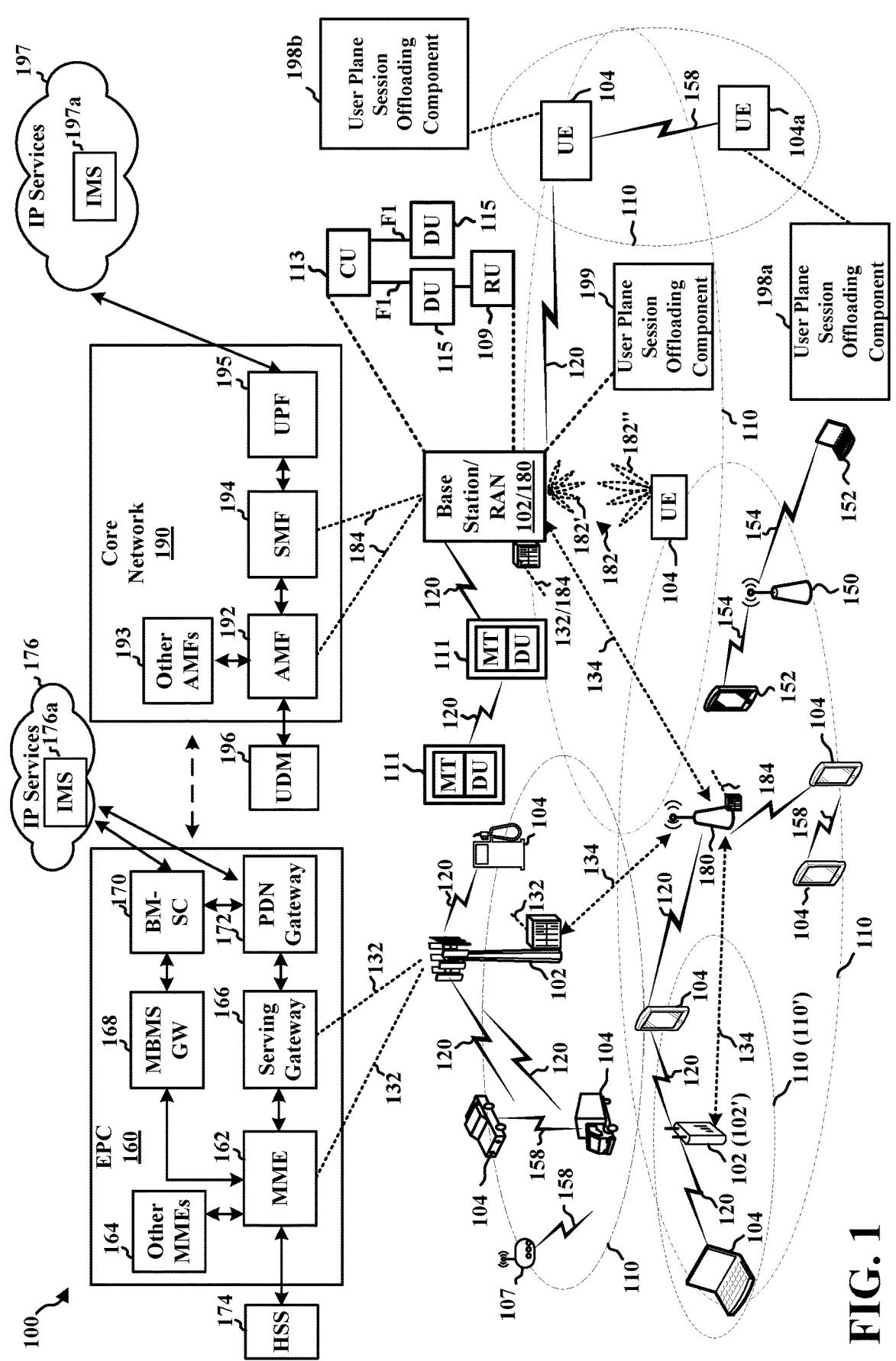
FIG. 1 is a diagram illustrating an example of a wireless communications system and an access network.

A relay UE (e.g., a UE that may provide, to a remote UE, a relay path to the cellular network) may have a direct Uu connection with the radio access network (RAN) (which may be further connected to the core network (CN)). The RAN and CN may be referred to collectively as the network. A remote UE (e.g., a UE that may utilize the relay path provided by a relay UE to connect to a RAN) may have a connection with the RAN and the CN via a relay path including the relay UE. In one or more configurations, each of the relay UE and the remote UE may have an independent control plane session and an independent user plane session with the RAN and the CN. A control plane session (which may carry signaling traffic and may be responsible for routing) may include access stratum (AS)/non-AS (NAS) connections and signaling radio bearers (SRBs). A user plane session (which may carry the user traffic) may include radio access protocol data unit (PDU) sessions and data radio bearers (DRBs). The remote UE may set up AS/NAS connections with the relay path including the relay UE.

According to one or more aspects, the present disclosure may relate to the signaling between a remote UE, a relay UE, and one or more network entities to enable user plane session offloading between the remote UE and the relay UE, such that certain data processing tasks may be handed over from one of the remote UE or the relay UE to the other, while end-to-end (E2E) security and E2E quality of service (QoS) between the CN and the offloaded or relocated user plane session termination point may be enabled or maintained. As used herein, offloading a user plane session may refer to a relocation of one or more session termination points associated with one or more radio access packet data sessions. According to one or more examples, in one or more configurations, the relay UE may offload a user plane session to the remote UE. In such an example, the remote UE may not host a control plane session. Accordingly, the remote UE may have no AS/NAS connections via the relay path. According to another example, in one or more configurations, the remote UE may offload a user plane session to the relay UE, while retaining a control plane session. Accordingly, the remote UE may set up AS/NAS connections via the relay path including the relay UE. Therefore, some processing tasks may be handed over to the relay UE as desired (e.g., when the remote UE is a reduced capability device, or when the remote UE is overloaded, etc.). In one configuration, the offloading of a user plane session from the remote UE to a relay UE may be triggered by a software application.

Without the user plane session offloading capability, processing tasks may not be handed over between the remote UE and the relay UE. In certain situations, however, it may be preferable to hand over the execution of certain processing tasks to a different device between the remote UE and the relay UE because, for example, one of the remote UE or the relay UE may be a reduced capability device, or may be overloaded. Therefore, it may be desired to offload a user plane session from the remote UE to the relay UE or from the relay UE to the remote UE to enable the handing over of processing tasks between the two devices. In one or more configurations, the user plane session offloading may be based on tethering over the local connection (e.g., a sidelink, a Bluetooth connection, a Wi-Fi connection, a Zigbee connection, etc.). According to one or more examples, tethering based offloading may be associated with additional latencies due to hop-by-hop decoding (e.g., with which packets may be processed by all the layers of the protocol stack at the relay UE before being forwarded on to the next hop). Further, there may be no E2E 5G security for the offloaded session with tethering based offloading because the device to which the session is offloaded may not host the corresponding packet data convergence protocol (PDCP) endpoint. The signaling aspects presented herein enable user plane session offloading with reduced latency. In one or more configurations presented herein, the session offloading may be based on an E2E user plane session between the remote UE and the network via a relay UE in the relay path, where the decoding and security is E2E. In other words, the layer 2 (L2) relay session offloading may be different from the tethering based offloading in that the user plane session may be between the remote UE and the network entity. The user plane session may be associated with DRBs, which may be associated with PDCP entities terminating at the remote UE and the RAN. The PDCP entities may provide E2E security, which may be realized as the packets are processed in lower layers (e.g., the adaptation layer (AL), the medium access control (MAC) layer, the radio link control (RLC) layer, or the physical (PHY) layer) at the relay UE, and are processed by the service data adaptation protocol (SDAP) layer or the PDCP layer at the endpoints (e.g., the remote UE and the RAN). In one or more configurations, the session offloading in the relay path may be controlled by a UE (e.g., the relay UE). The relay UE may manage the session offloading configuration locally. In one or more configurations, when the user plane session is offloaded from the remote UE to the relay UE, it may be preferable to use an N:1 bearer mapping for relaying with the involvement of the NG-RAN. According to one or more examples, as specified in TS 38.836, the N:1 bearer mapping may include the uplink bearer mapping between ingress sidelink RLC channels for relaying and egress Uu RLC channels over the relay UE Uu path and the downlink bearer mapping at the base station to map E2E the SRB and the DRB of the remote UE into the Uu RLC channel over the relay UE Uu path. This may be because that in an L2 relaying setup with multiple remote UEs, the sidelink RLC channels may be mapped to a single Uu RLC channel. The QoS for the sidelink RLC channels and the Uu RLC channels may be configured by the RAN considering the E2E QoS specification of the remote UE user plane session. According to one or more aspects, when the remote UE or the relay UE locally decides to offload the session, it may not be possible to adjust the QoS properly for the Uu link without informing the NG-RAN regarding the session offloading. The relay UE may request QoS modification for the Uu RLC channel, but that alone may not be sufficient for NG-RAN to understand why QoS modification may be accepted or the level of QoS to be allocated to the Uu RLC channel. Therefore, the UE controlled session offloading may not be suitable for some cases due to potential performance impacts. Moreover, QoS reconfiguration and relaying stack reconfiguration is efficient with modifications also at the NG-RAN. Further, there may be added complexity at the relay UE in connection with configuration and management of E2E QoS (e.g., the support of QoS for remote UE user plane sessions between the remote UE and the CN) during mobility. In one or more configurations, the session offloading in the relay path may be controlled by the RAN (e.g., a next generation RAN (NG-RAN)) (e.g., a base station). The RAN may configure the session offloading with assistance information from the remote UE and/or the relay UE. The RAN may be better able to control E2E QoS and context management during mobility. Policy or subscription based control may also be enforced by the RAN.

Accordingly, a remote UE or a relay UE may identify a configuration for offloading one or more user plane sessions from the relay UE to the remote UE or from the remote UE to the relay UE. The remote UE or the relay UE may offload the one or more user plane sessions from the relay UE to the remote UE or from the remote UE to the relay UE based on the configuration for offloading the one or more user plane sessions. The session offloading may be controlled by the remote UE, the relay UE, or a network entity in the RAN (e.g., a base station). If the network entity controls the session offloading, the network entity may provide the configuration for offloading of the one or more user plane sessions from the relay UE to the remote UE or from the remote UE to the relay UE. The remote UE may transmit or receive data with a network via the relay UE based on at least one offloaded user plane session. The relay UE may forward data between a network and a remote UE based on at least one offloaded user plane session. Accordingly, based on the signaling aspects described herein, data processing may be handed over to a more capable device between the remote UE and the relay UE. Without the signaling aspects presented herein, the processing may instead be performed by a less capable device (when a device is overloaded, etc.). Further, E2E security and E2E QoS between the CN and the user plane endpoints may be realized. Herein the L2 may include a MAC layer, an RLC layer, a PDCP layer, and an SDAP layer. Further, a user plane session may correspond to an L2 session.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 113, one or more distributed units (DU) 115, and/or one or more remote units (RU) 109, as illustrated in FIG. 1. A RAN may be disaggregated with a split between an RU 109 and an aggregated CU/DU. A RAN may be disaggregated with a split between the CU 113, the DU 115, and the RU 109. A RAN may be disaggregated with a split between the CU 113 and an aggregated DU/RU. The CU 113 and the one or more DUs 115 may be connected via an F1 interface. A DU 115 and an RU 109 may be connected via a fronthaul interface. A connection between the CU 113 and a DU 115 may be referred to as a midhaul, and a connection between a DU 115 and an RU 109 may be referred to as a fronthaul. The connection between the CU 113 and the core network may be referred to as the backhaul. The RAN may be based on a functional split between various components of the RAN, e.g., between the CU 113, the DU 115, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 115 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 113 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 113 and a DU 115. IAB nodes 111 may include a DU 115 and a mobile termination (MT). The DU 115 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, Bluetooth Low Energy (Bluetooth LE), Zigbee, Wi-Fi, Wi-Fi-Direct, based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS) 176*a*, a Packet Switch (PS) Streaming (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IMS 197*a*, a PSS, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device.

Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the remote UE 104*a* may include a user plane session offloading component 198*a* that may be configured to identify at least one configuration for a relocation of one or more first session termination points associated with one or more radio access packet data sessions from a second wireless device to the first wireless device or from the first wireless device to the second wireless device. The user plane session offloading component 198*a* may be configured to execute the relocation of the one or more first session termination points associated with the one or more radio access packet data sessions from the second wireless device to the first wireless device or from the first wireless device to the second wireless device based on the at least one configuration for the relocation of the one or more first session termination points. The user plane session offloading component 198*a* may be configured to transmit or receive data with a network via the second wireless device based on the relocation of the one or more first session termination points. In certain aspects, the relay UE 104*b* may include a user plane session offloading component 198*b* that may be configured to identify at least one configuration for a relocation of one or more first session termination points associated with one or more radio access packet data sessions from the second wireless device to a first wireless device or from the first wireless device to the second wireless device. The user plane session offloading component 198*b* may be configured to execute the relocation of the one or more first session termination points associated with the one or more radio access packet data sessions from the second wireless device to the first wireless device or from the first wireless device to the second wireless device based on the at least one configuration for the relocation of the one or more first session termination points. The user plane session offloading component 198*b* may be configured to forward data between a network and the first wireless device based on at least one first radio access packet data session of the one or more radio access packet data sessions. At least one first session termination point of the one or more first session termination points associated with the at least one first radio access packet data session may have been relocated. In certain aspects, the network entity (e.g., the base station 180) may include a user plane session offloading component 199 that may be configured to receive, from at least one of a first wireless device or a second wireless device, one or more indications of UE preferences associated with a relocation of one or more first session termination points associated with one or more radio access packet data sessions. The user plane session offloading component 199 may be configured to transmit at least one indication of at least one configuration for the relocation of the one or more first session termination points associated with the one or more radio access packet data sessions from the second wireless device to the first wireless device or from the first wireless device to the second wireless device. Although the following description may be focused on 5G NR, the concepts described herein may be applicable to other similar areas, such as LTE, LTE-A, CDMA, GSM, and other wireless technologies.

Figures 2A, 2B, 2C, 2D:
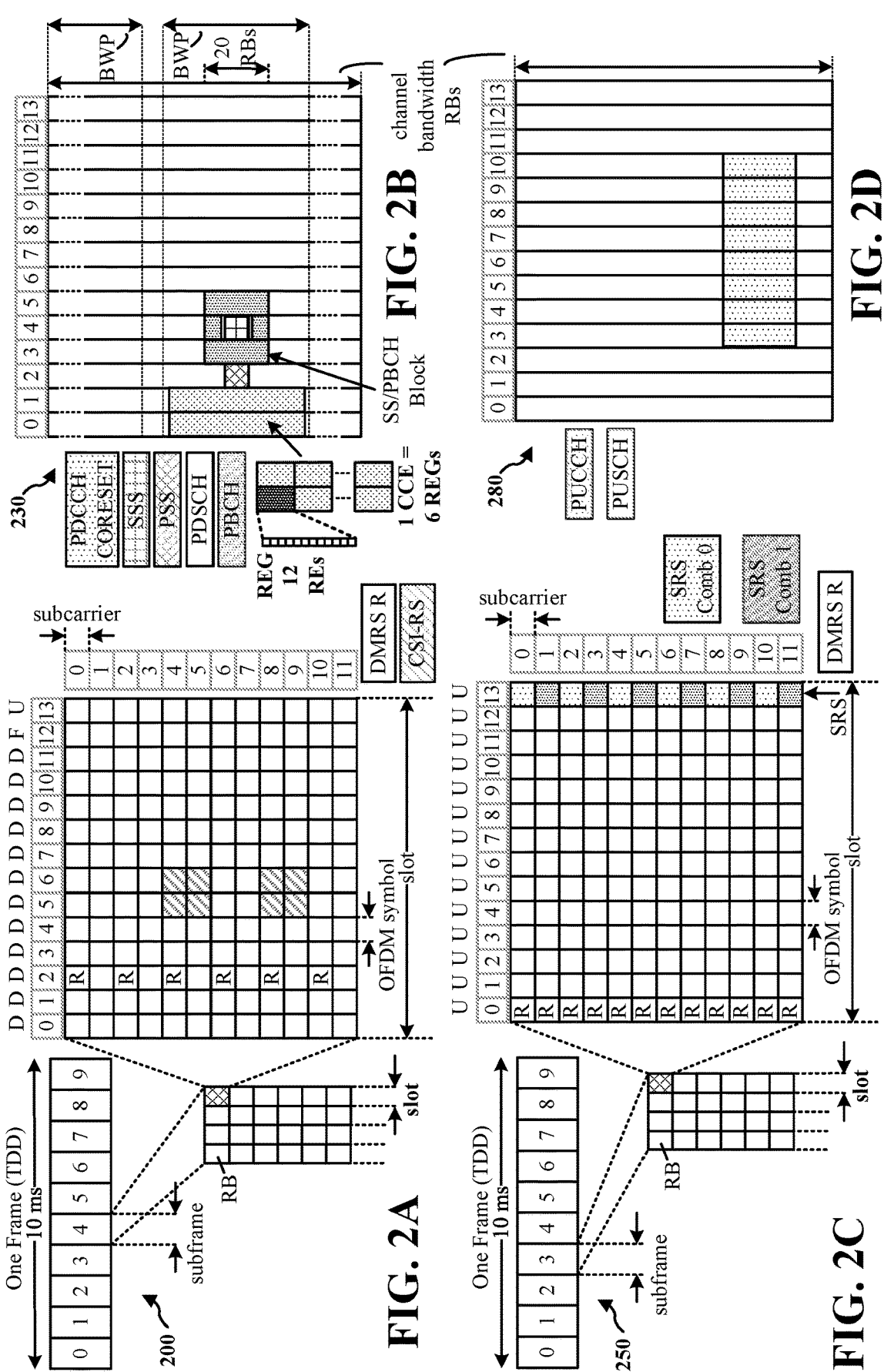
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| | SCS | |
| μ | $\Delta f = 2^{\mu} \cdot 15 [\text{kHz}]$ | Cyclic prefix |
| --- | --- | --- |
| 0 | 15 | Normal |
| 1 | 30 | Normal |
| 2 | 60 | Normal, Extended |

-continued

| | SCS | |
| μ | $\Delta f = 2^{\mu} \cdot 15 [\text{kHz}]$ | Cyclic prefix |
| --- | --- | --- |
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu} * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 22:
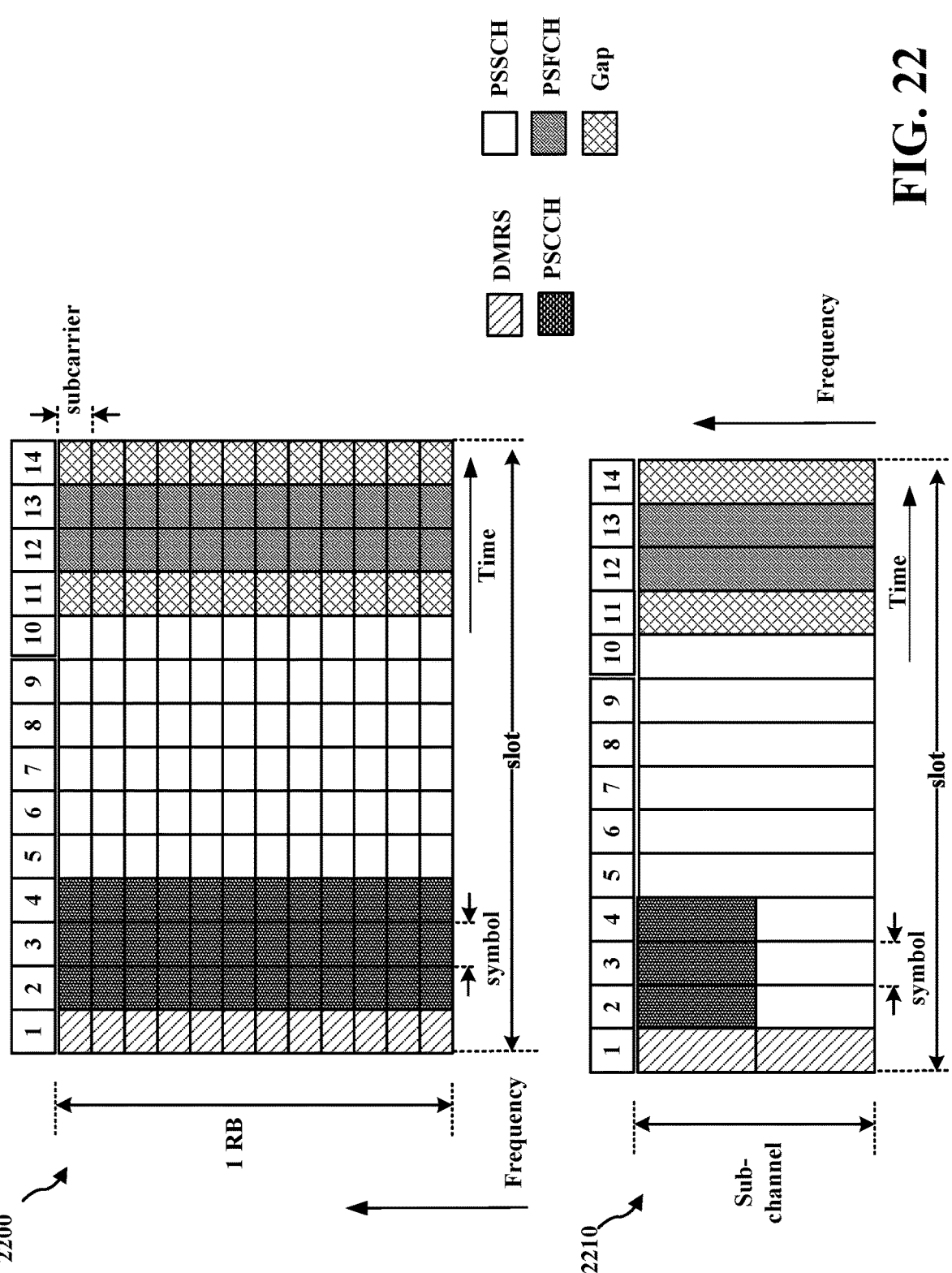
FIG. 22 includes diagrams illustrating example aspects of slot structures that may be used for sidelink communication.

FIG. 22 includes diagrams 2200 and 2210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 22 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 2200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 2210 in FIG. 22 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 22, some of the REs may include control information in PSCCH and some REs may include demodulation RS (DMRS). At least one symbol may be used for feedback. FIG. 22 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 22. Multiple slots may be aggregated together in some aspects.

Figure 3:
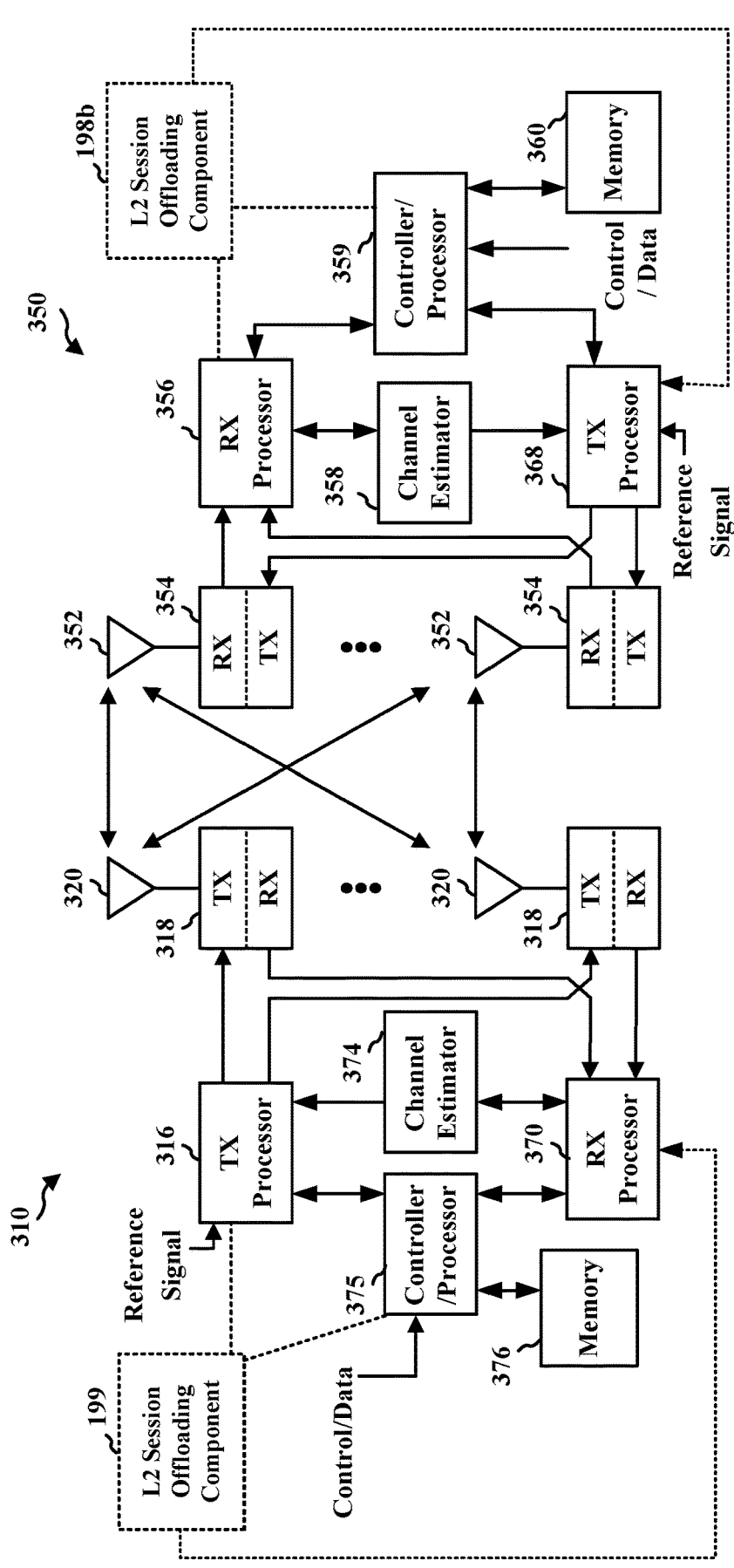
FIG. 3 is a diagram illustrating an example of a first wireless communication device in communication with a second wireless communication device.

FIG. 3 is a block diagram of a first wireless communication device 310 in communication with a second wireless communication device 350. In some aspects, the communication may be based on sidelink, e.g., based on V2X or other D2D communication. According to one or more examples, the communication may be based on a PC5 interface. As an example, the devices 310 and 350 may comprise a UE, an RSU, a base station, etc. In other aspects, the communication may be over an access link between a base station and a UE, e.g., Uu communication. In such examples, the device 310 may correspond to a base station, and the device 350 may correspond to a UE. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer protocol data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC

160. The controller/processor 359 is also responsible for error detection using an ACK and/or NACK protocol to support HARQ operations.

Similar to the functionality described in connection with the DL transmission by the device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the device 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198b of FIG. 1.

At least one of the TX processor 316, the RX processor 370, and the controller/processor 375 may be configured to perform aspects in connection with 199 of FIG. 1.

Figure 4:
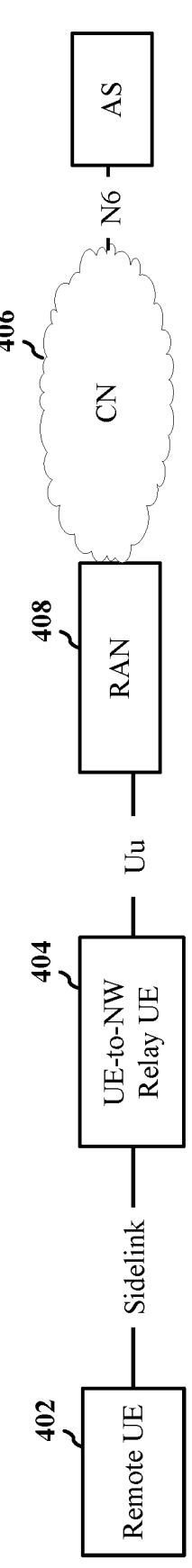
FIG. 4 is a block diagram illustrating an example user equipment (UE)-to-network relay architecture.

FIG. 4 is a block diagram 400 illustrating an example UE-to-network relay architecture. The RAN 408 may be an NG-RAN. The core network (CN) 406 may be a 5GC. The One or more remote UEs 402 may connect to the network 406 via a relay UE 404. The link between the remote UE 402 and the relay UE 404 may be referred to as a local link, and may be a sidelink (SL) (e.g., based on a PC5 interface), or any other suitable link (e.g., a Bluetooth link, a Bluetooth LE link, a Wi-Fi link, a Wi-Fi-Direct link, etc.) The relay UE 404 may be connected to the RAN 408 and thus the network 406 via a Uu link (i.e., a direct link). The remote UE 402 may be either in-coverage or out-of-coverage of the RAN 408. In case the remote UE 402 is within the coverage area of the RAN 408, the relay connection via the relay UE 404 may still be suitable because the relay connection may provide a better signal quality than a direct Uu connection between the remote UE 402 and the RAN 408, and better throughput or reliability may be achieved with the use of the relayed link. The remote UE 402 may use either preconfigured provisioning information or information received from the network to perform relay selection/reselection or relay path setup. If the remote UE 402 is out-of-coverage of the RAN 408, the remote UE 402 may use preconfigured provisioning information to perform relay selection/reselection or relay path setup. If the remote UE 402 is within the coverage area of the RAN 408, the remote UE 402 may use the information provided by the RAN 408 to perform relay selection/reselection or relay path setup.

The relay connection between the remote UE 402 and the network 406 via the relay UE 404 may be either a Layer 3 (L3) relay connection or an L2 relay connection. An L3 relay connection may be an IP relay connection, where the relay UE 404 may assign an IP address to the remote UE 402, and PDU sessions may be established over the IP relay. With an L2 relay connection, the remote UE 402 may establish a 5G NR connection with the base station/RAN 408 and the network 406 via the L2 relay connection. The connection the remote UE 402 may establish with the base station/RAN 408 and the network 406 may also be a connection other than a 5G NR connection, such as a connection associated with a future access technology.

Figures 5A, 5B:
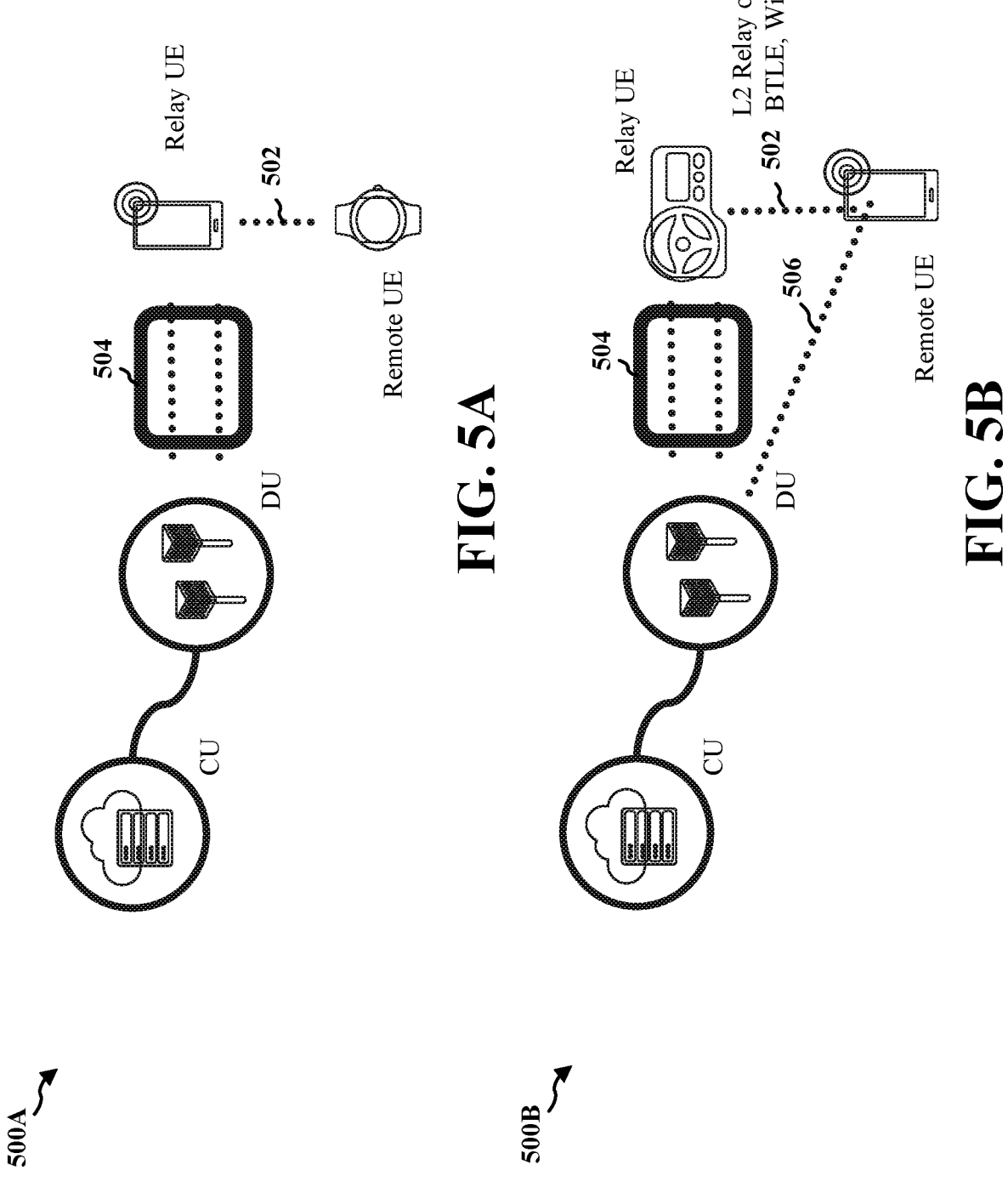
FIGS. 5A and 5B are diagrams illustrating example use cases of relay UEs.

FIGS. 5A and 5B are diagrams 500A and 500B illustrating example use cases of relay UEs. With the use of a relay UE, multiple virtual connections may be established to and from remote UEs over a single physical radio access connection 504 hosted at a relay UE. The local link 502 between a remote UE and the relay UE may be established over any suitable RAT (e.g., sidelink, Bluetooth, Bluetooth LE, Wi-Fi, Wi-Fi-Direct, Zigbee, etc.). In FIG. 5A, according to one example, the relay UE may be a UE such as a smartphone UE. According to one or more examples, the remote UE may be a wearable device, such as a smart watch, a pair of smart glasses, etc. A single direct connection 504 (e.g., a Uu connection) may be shared by multiple subscriptions (e.g., service subscriptions with wireless communication system providers) for multiple devices. For example, a first subscription may be hosted at the relay device, which may manage the physical connection 504. Additional subscriptions may be hosted at tethered (remote) devices. Therefore, each tether device may use E2E security (e.g., the user data may be encrypted E2E between the relocated user plane session termination point and the CN) and seamless mobility. In FIG. 5B, according to one example, the relay UE may be a vehicle. A smartphone in a vehicle may experience coverage issues due to the metallic window loss. The coverage issues may be alleviated when a smartphone UE connects to the network via the vehicle UE as a relay UE. Based on the subscription, the smartphone UE may also offload some flows or traffic to the vehicle UE. Furthermore, dual connectivity may be supported. For example, the master cell group (MCG) (e.g., the group of serving cells associated with the master node, the radio access node that may provide the control plane connection to the CN in case of dual connectivity) connection may be via the vehicle UE as the relay UE and the secondary cell group (SCG) (e.g., a group of serving cells associated with the secondary node, the radio access node with no control plane connection to the CN) connection may be over a best effort direct connection from the smartphone UE. Further, service continuity when the user carrying the smartphone UE is walking away or towards the vehicle relay UE may be supported via a mobility procedure. Accordingly, the 5G NR connection may be extended with the use of the relay UE.

Figures 6A, 6B:
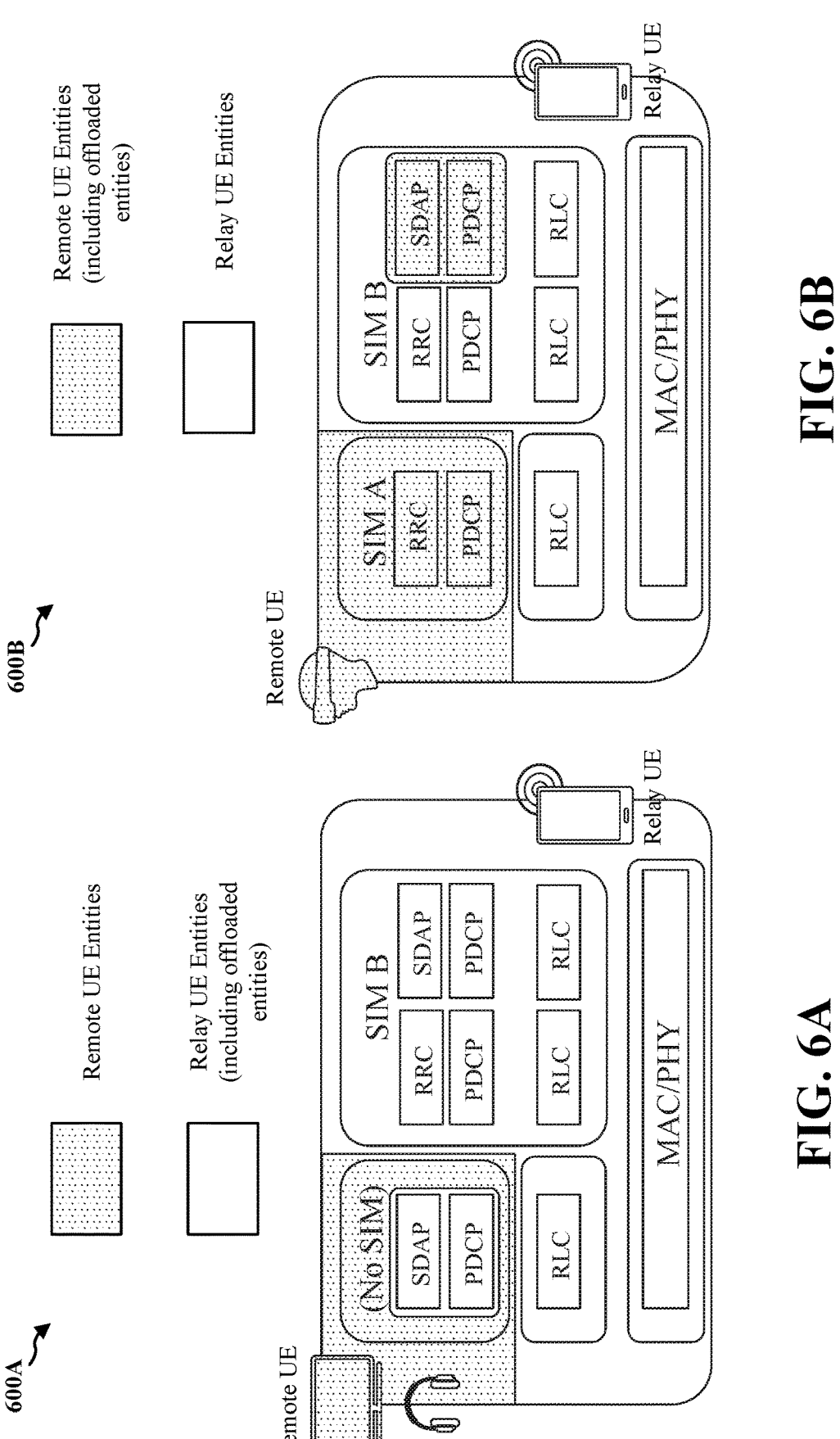
FIGS. 6A and 6B are diagrams illustrating additional example use cases of relay UEs.

FIGS. 6A and 6B are diagrams 600A and 600B illustrating additional example use cases of relay UEs. With UE disaggregation, the control and user planes may be split between different UEs. In FIG. 6A, according to one example, the remote UE may or may not include a universal subscriber identity module (USIM), and may be a reduced capability device (e.g., a wearable device, a sensor, etc.). For example, the remote UE may be a separate display or ear buds. The relay UE may offload a user plane session to the remote UE. Accordingly, the remote UE may host the user plane SDAP and PDCP entities for the relay UE. As a result, the remote UE may host the user plane endpoint, but not the control plane endpoint. Therefore, the remote UE may gain access to cellular data through the E2E user plane session. In FIG. 6B, according to one example, the remote UE may have its own subscriber identity module (SIM) and its own service subscription. The remote UE may offload a user plane session to the relay UE in order to use the processing capabilities of the relay UE. Accordingly, the relay UE may host the user plane SDAP and PDCP entities for the remote UE. The remote UE may retain its control plane endpoint corresponding to the control plane RRC and PDCP entities. Accordingly, advanced split rendering or other handing over of processing may be enabled. In other words, one of a remote UE or a relay UE may leverage the processing capabilities of the other of the remote UE or the relay UE by handing over some tasks to that other device.

Figures 7A, 7B:
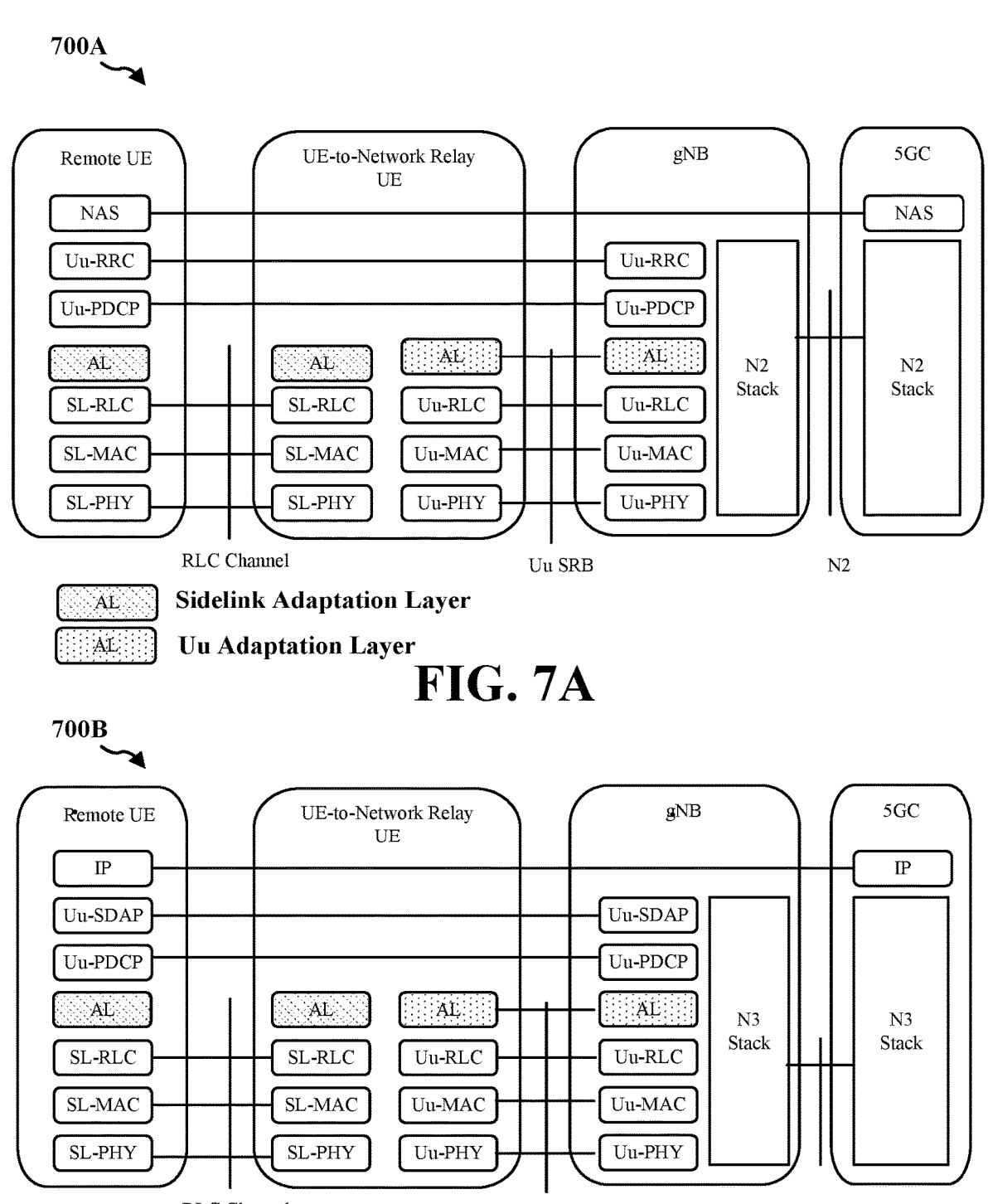
FIGS. 7A and 7B are block diagrams illustrating protocol stacks for an L2 UE-to-network relay.

FIGS. 7A and 7B are block diagrams 700A and 700B illustrating protocol stacks for an L2 UE-to-network relay. FIG. 7A illustrates a control plane protocol stack for an L2 UE-to-network relay. FIG. 7B illustrates a user plane protocol stack for an L2 UE-to-network relay. A Uu adaptation layer may be provided at the relay UE and at the base station. Depending on whether the local link is via a sidelink or a link based on another RAT and whether N:1 bearer mapping is supported on the local link, a sidelink or local link adaptation layer may or may not be present. The Uu adaptation layer may provide the functions of N:1 bearer mapping and data multiplexing for multiple remote UEs. At the relay UE, the Uu adaptation layer may provide the uplink bearer mapping between ingress sidelink RLC channels and egress Uu RLC channels. At the base station, the Uu adaptation layer may provide the downlink bearer mapping to map the Uu SRB or DRB of the remote UE into Uu RLC channels. The uplink or downlink adaptation layer header may include the Uu radio bearer information and identity information associated with the remote UE.

Figure 8:
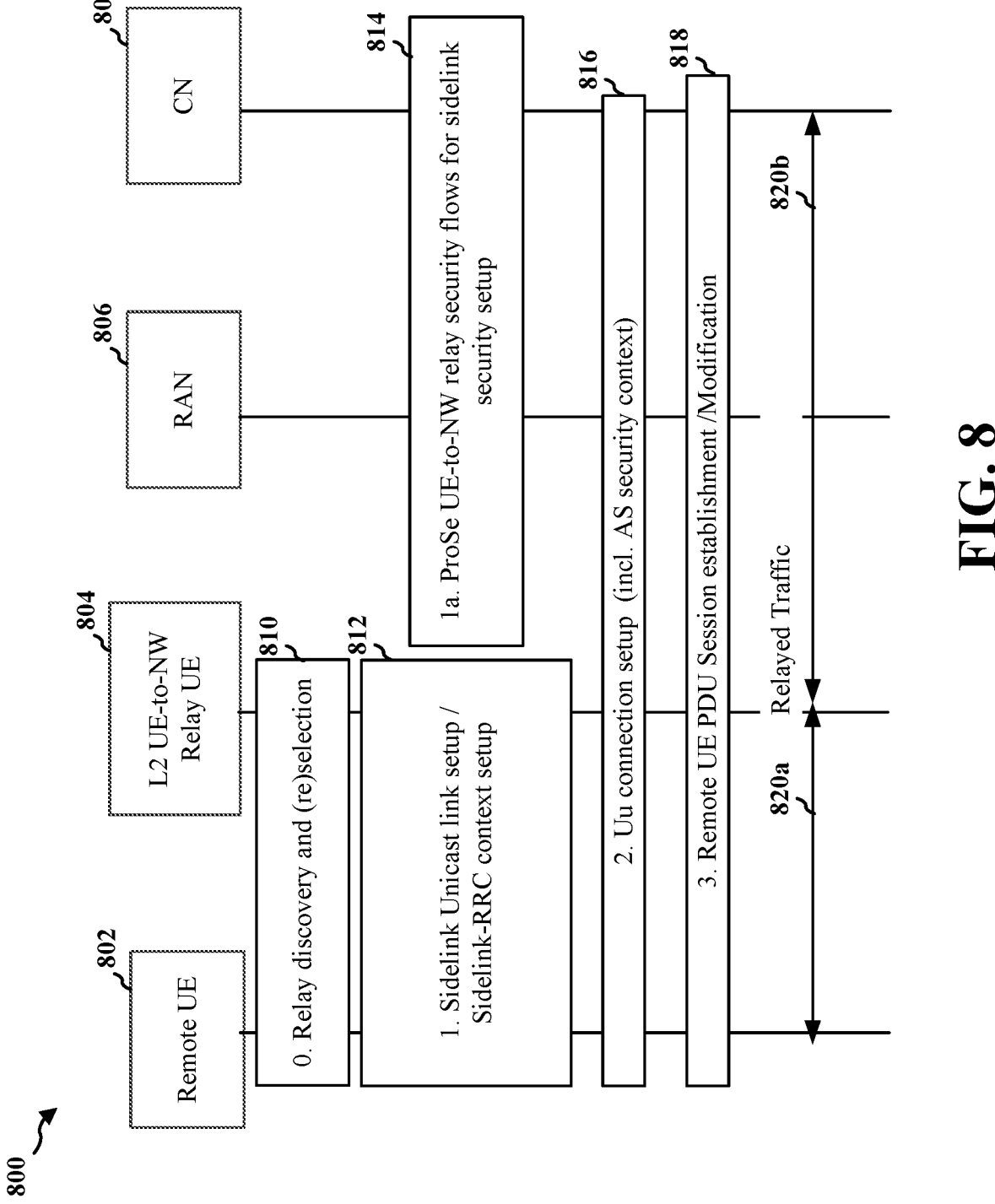
FIG. 8 is a communication flow of an L2 sidelink relay connection setup procedure.

FIG. 8 is a communication flow 800 of an L2 sidelink relay connection setup procedure. The RAN 806 may be an NG-RAN. The CN 808 may be a 5GC. At 810, the remote UE 802 may perform relay discovery and (re)selection, and may discover and (re)select the relay UE 804. At 812, the remote UE 802 and the relay UE 804 may set up a sidelink unicast link or a sidelink-RRC context. At 814, the relay UE 804, the base station 806, and the network 808 may perform a sidelink security setup procedure. At 816, the remote UE 802 may set up a relayed Uu connection to the base station 806 and the network 808 via the relay UE 804. An access stratum (AS) security context may be set up. At 818, the remote UE 802 may establish or modify a UE PDU session with the network 808 via the relayed connection. The remote UE 802 may then communicate with the network 808 via the relayed connection. The relayed traffic may include a first leg 820a transmitted between the remote UE 802 and the relay UE 804 and a second leg 820*b* transmitted between the relay UE 804 and the network 808.

At 812, the remote UE 802 may forward a connection establish RRC message (e.g., an RRCSetupRequest message or an RRCSetup message) using a default sidelink RLC/ MAC configuration. This may apply for both in-coverage and out-of-coverage remote UEs 802. A relay UE 804 that is not in the RRC_CONNECTED state may perform its own connection establishment before forwarding the first RRC message from the remote UE 802. The base station 806 and the relay UE 804 may perform the relaying channel setup procedure for additional SRBs or DRBs over a Uu link. Based on the configuration from the base station 806, the relay UE 804 or the remote UE 802 may establish additional RLC channels for relaying SRBs or DRBs. Therefore, the remote UE 802 may establish PDU sessions with the network 808 to route user traffic via the relay UE 804 to the network 808.

Figures 9A, 9B:
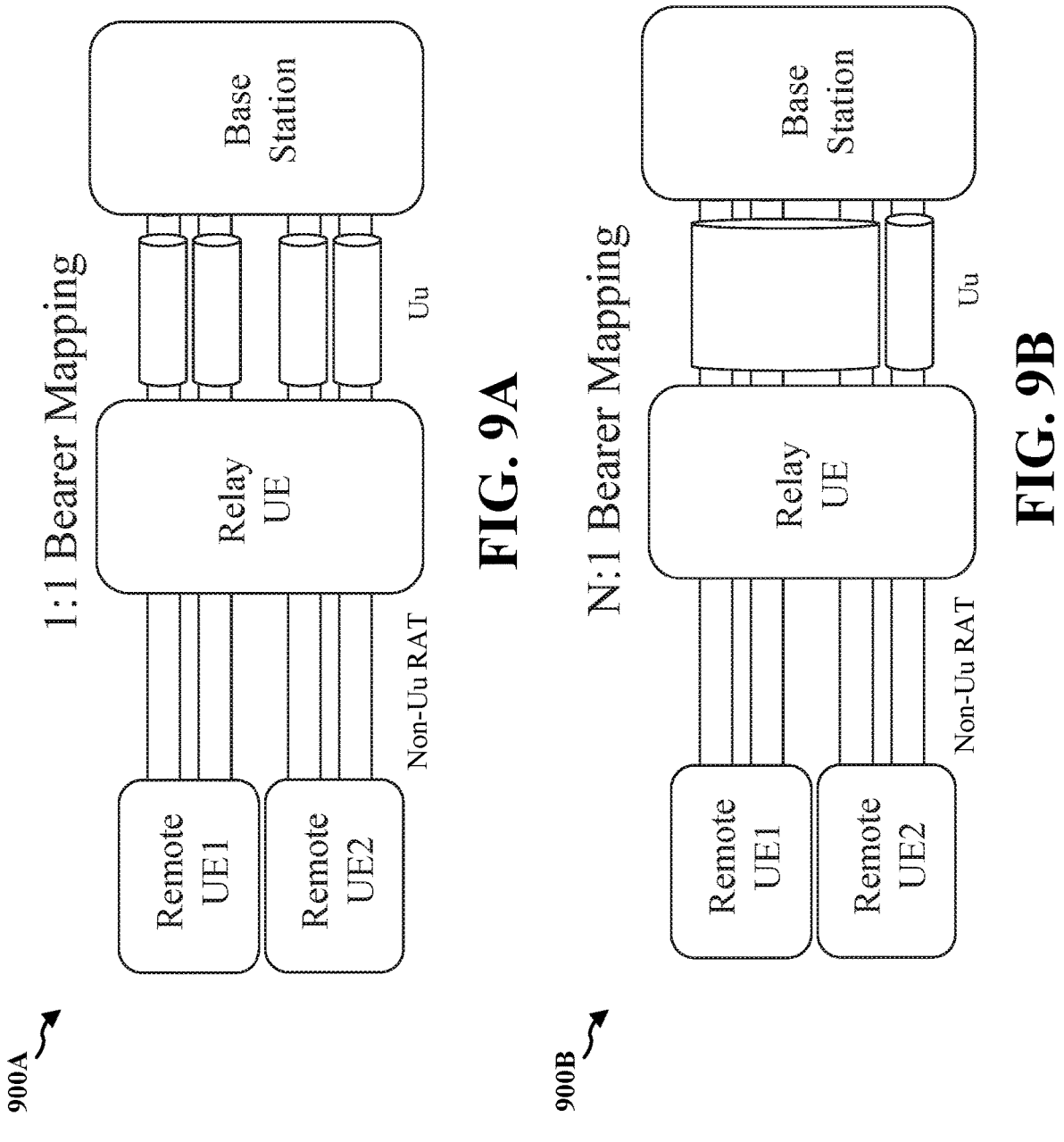
FIGS. 9A and 9B are diagrams illustrating the adaptation layer (AL).

FIGS. 9A and 9B are diagrams 900A and 900B illustrating the adaptation layer (AL). The AL may be used to multiplex multiple bearers between backhaul channels and access channels. The AL may be present between the PDCP layer and the RLC layer. The AL may be present on the link between the relay UE and the base station. The AL may be configured for the relay UE by the base station. The AL may enable either an N:1 or a 1:1 bearer mapping between access channels (e.g., over a non-Uu RAT) and backhaul channels (e.g., over a Uu connection). FIG. 9A illustrates the AL with a 1:1 bearer mapping. FIG. 9B illustrates the AL with an N:1 bearer mapping. The AL may multiplex data of remote UEs on the backhaul channels (e.g., over a Uu connection). The AL may identify the channels associated with remote UEs on the corresponding Uu bearers.

Figure 10A:
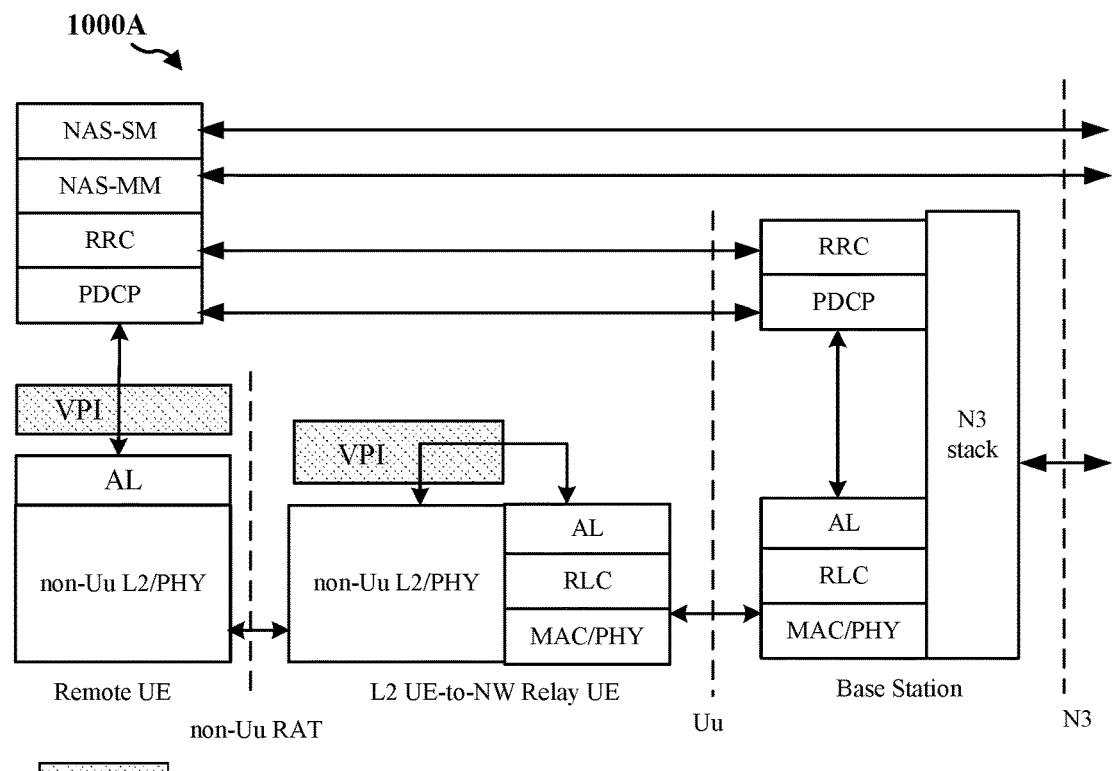
FIGS. 10A and 10B are block diagrams illustrating protocol stacks for an L2 UE-to-network relay.
Figure 10B:
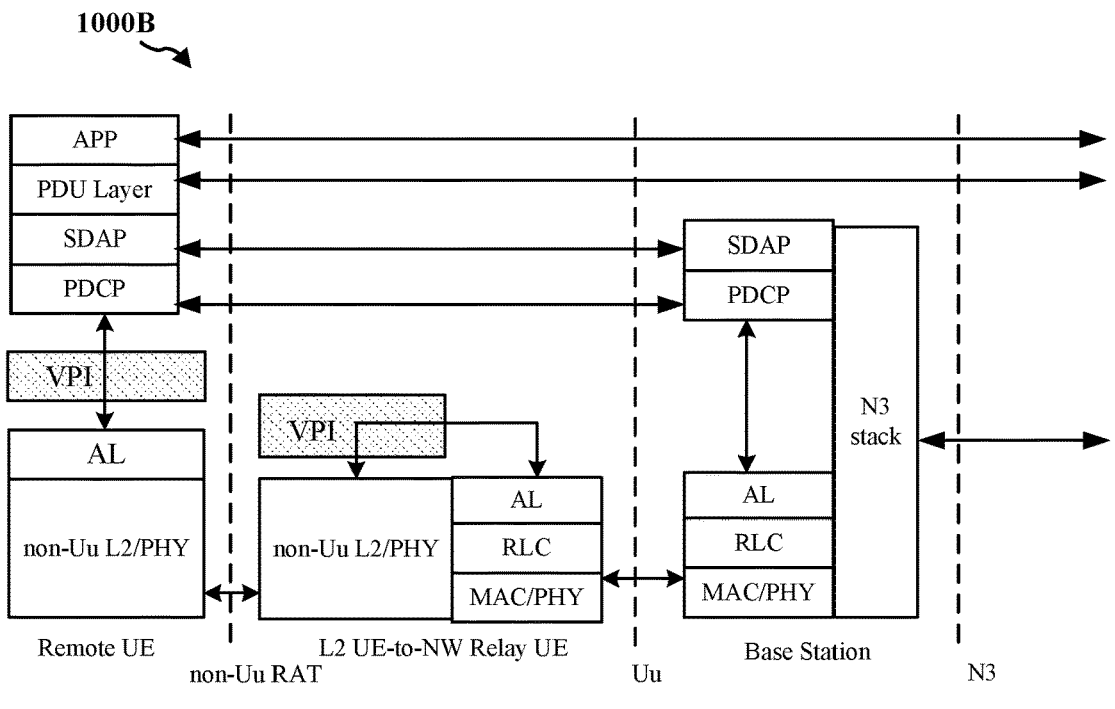

FIGS. 10A and 10B are block diagrams 1000A and 1000B illustrating protocol stacks for an L2 UE-to-network relay. An L2 relay may perform relaying operations at L2. Examples of non-Uu RATs may include PC5, Bluetooth, Bluetooth LE, Wi-Fi, Wi-Fi-Direct, Zigbee, etc. FIG. 10A illustrates a control plane protocol stack for an L2 UE-to-network relay. Non-Uu links may be managed locally by the remote UE or the relay UE, and may be managed independently from the Uu link. The 5G NR NAS/AS signaling may be carried transparently over the non-Uu RAT. FIG. 10B illustrates a user plane protocol stack for an L2 UE-to-network relay. The remote UE may use E2E security at the PDCP layer. E2E QoS may be available for remote UE DRBs. The Uu QoS may be managed by the base station and the core network. The non-Uu RAT QoS may be managed locally using a RAT configuration manager (not shown). According to one or more examples, the AL may also be present on the remote UE and the relay UE below the PDCP layer and above the non-Uu L2/PHY layer for the non-Uu RAT link relaying support. In both FIGS. 10A and 10B, a virtual protocol interface (VPI) may be located between the PDCP layer and the AL on the remote UE and between the AL and the non-Uu L2/PHY layer on the relay UE. The VPI may support application programming interfaces (APIs) between protocol stacks and the routing of traffic to the configured protocol entities.

Figure 11:
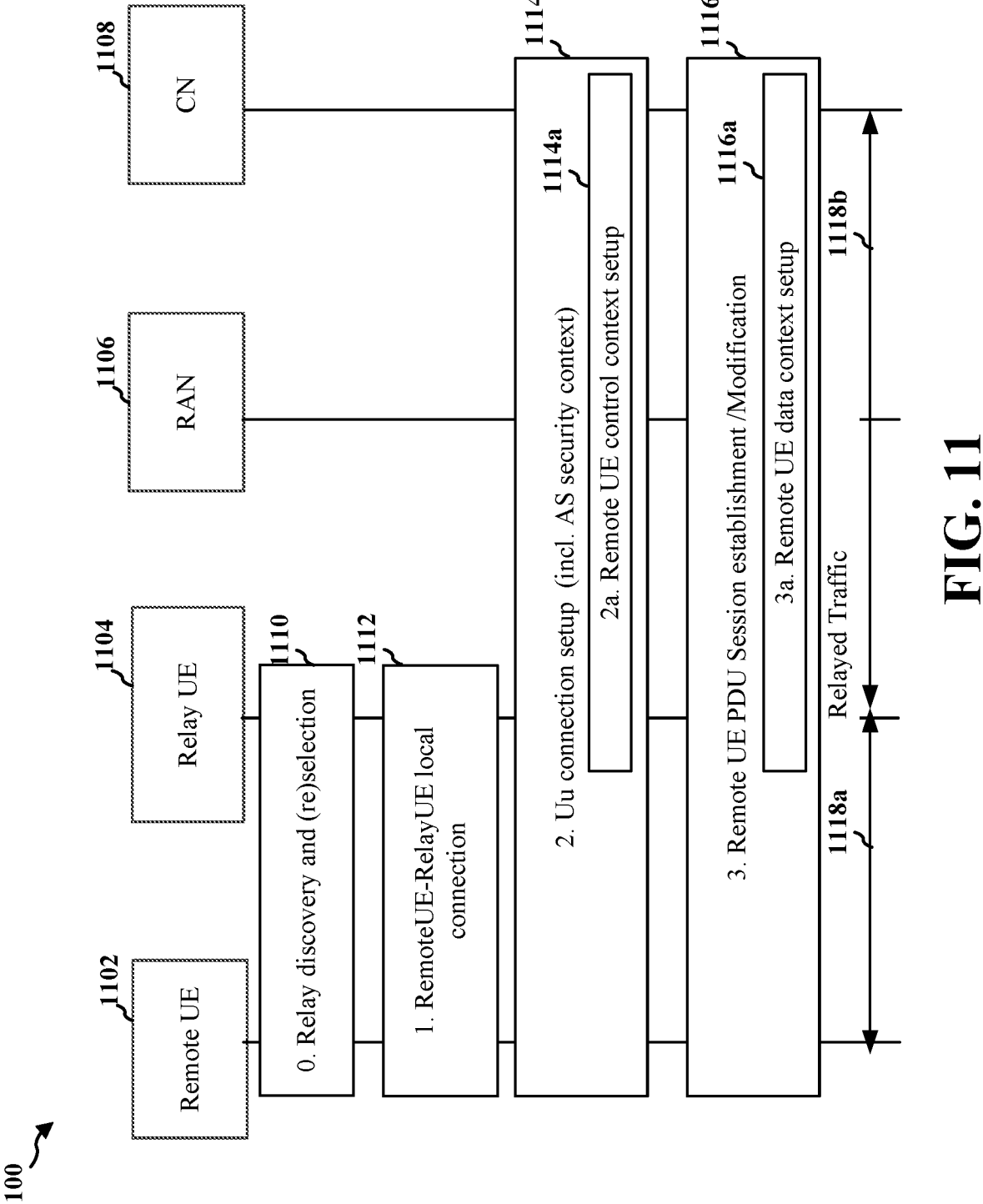
FIG. 11 is a communication flow of an L2 non-3GPP RAT relay connection setup procedure.

FIG. 11 is a communication flow 1100 of an L2 non-3GPP RAT relay connection setup procedure. The RAN 1106 may be an NG-RAN. The CN 1108 may be a 5GC. At 1110, the remote UE 1102 may perform relay discovery and (re) selection, and may discover and (re)select the relay UE 1104. The relay discovery may be based on the specific discovery method associated with the non-3GPP RAT used. At 1112, the remote UE 1102 and the relay UE 1104 may set up a local connection (e.g., a non-3GPP RAT connection such as a Bluetooth connection, a Wi-Fi connection, a Zigbee connection, etc.). The local connection may be set up based on the procedures associated with the non-3GPP RAT used. At 1114, the remote UE 1102 may set up a relayed Uu connection to the base station 1106 and the network 1108 via the relay UE 1104. An AS security context may be set up. At 1114*a*, a remote UE control context may be set up. A NAS context may also be set up. At 1116, the remote UE 1102 may establish or modify a UE PDU session with the network 1108 via the relayed connection. At 1116*a*, a remote UE data context may be set up. The remote UE 1102 may then communicate with the network 1108 via the relayed connection. The relayed traffic 1118 may include a first leg 1118*a* transmitted between the remote UE 1102 and the relay UE 1104 and a second leg 1118*b* transmitted between the relay UE 1104 and the network 1108. The base station 1106 may configure the Uu SRB s or DRBs of the remote UE 1102, which may include configuring the SRB or the DRB at the remote UE 1102, and configuring the Uu RLC channels at the relay UE 1104.

Figures 12A, 12B, 12C:
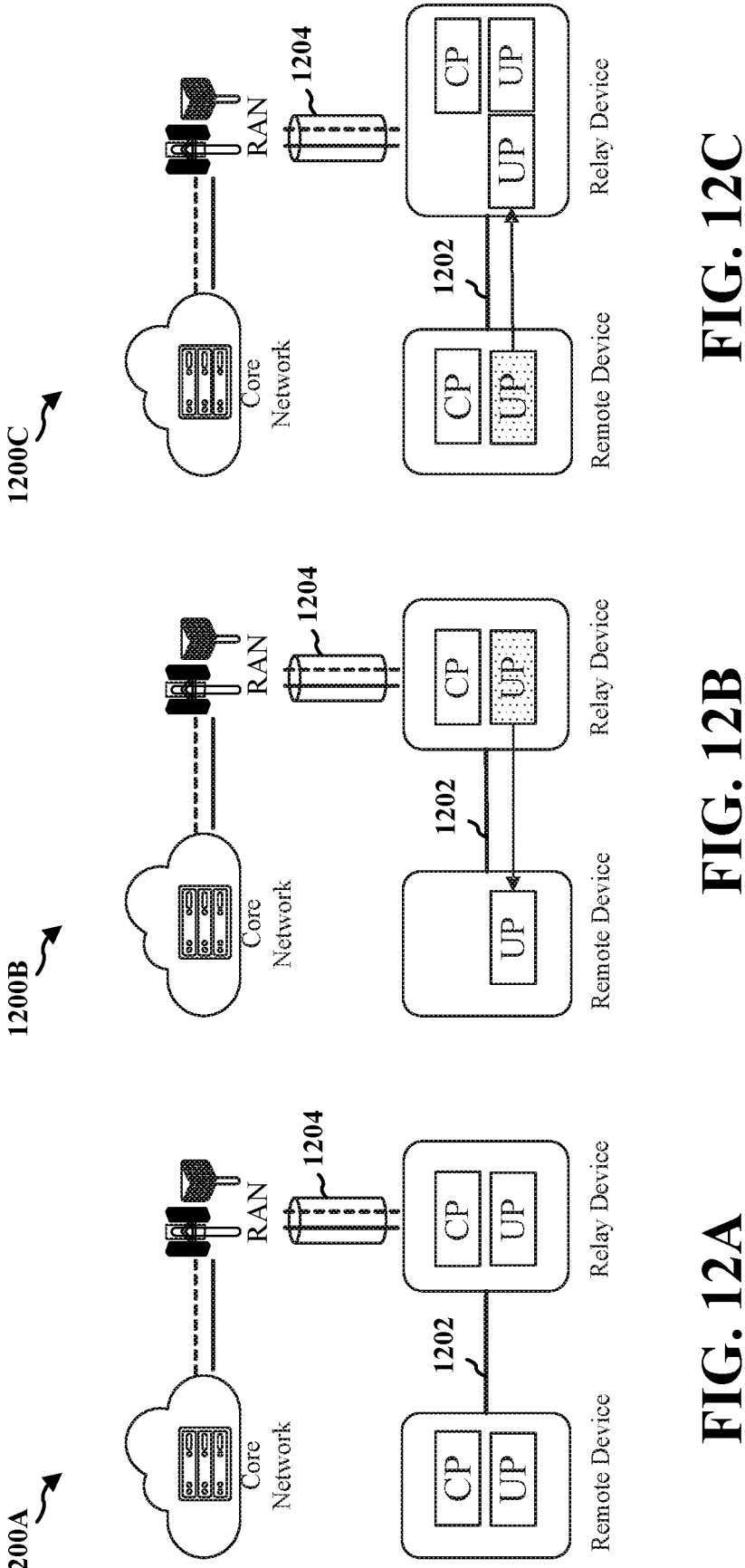
FIGS. 12A-C are diagrams illustrating session offloading scenarios.

FIGS. 12A-C are diagrams 1200A, 1200B, and 1200C illustrating session offloading scenarios. The illustrated core networks may be 5GCs. The illustrated RANs may be NG-RANs. In each of the FIGS. 12A-C, the relay UE may have a direct Uu connection 1204 with the NG-RAN and the core network. Based on the local link 1202 between the remote UE and the relay UE, the remote UE may have a connection with the cellular network via a relay path including the relay UE. The remote UE may also have a direct Uu connection (not shown) with the NG-RAN, even when session offloading is used within the relay path. In FIG. 12A, each of the relay UE and the remote UE may have an independent control plane session and an independent user plane session. A control plane (session) may include AS/NAS connections and SRBs. A user plane (session) may include PDU sessions and DRBs. The remote UE may set up AS/NAS connections via the relay path including the relay UE. In FIG. 12B, the relay UE may offload a user plane session to the remote UE. The remote UE may not host a control plane session. Accordingly, the remote UE may have no AS/NAS connections via the relay path. In FIG. 12C, the remote UE may offload a user plane session to the relay UE, while retaining a control plane session. Accordingly, the remote UE may set up AS/NAS connections via the relay path including the relay UE. The configuration of FIG. 12C may be useful when it is desirable to hand over some processing tasks to the relay UE (e.g., when the remote UE is a reduced capability device, or when the remote UE is overloaded). In one configuration, the offloading of a user plane session from the remote UE to a relay UE may be triggered by an application.

In one or more configurations, the session offloading in the relay path may be based on tethering over the local connection (e.g., a sidelink, a Bluetooth connection, a Wi-Fi connection, a Zigbee connection, etc.). Tethering based offloading may be associated with additional latencies due to hop-by-hop decoding. Further, there may be no E2E security for the offloaded session with tethering based offloading because the device to which the session is offloaded may not host the corresponding PDCP endpoint. In one or more configurations, the session offloading may be based on an E2E user plane session between the remote UE and the network via a relay UE in the relay path, where the decoding and security is E2E. In one or more configurations, the session offloading in the relay path may be controlled by a UE (e.g., the relay UE). The relay UE may manage the session offloading configuration locally. The UE controlled session offloading may not be optimal when the remote UE offloads a user plane session to the relay UE, when an N:1 bearer mapping is used for relaying, without NG-RAN involvement. QoS reconfiguration and relaying stack reconfiguration is efficient with modifications also at the NG-RAN. Further, there may be added complexity at the relay UE in connection with configuration and management of E2E QoS during mobility. In one or more configurations, the session offloading in the relay path may be controlled by the RAN (e.g., an NG-RAN) (e.g., a base station). The RAN may configure the session offloading with assistance information from the UEs. The RAN may be better able to control E2E QoS and context management during mobility. Policy or subscription based control may also be enforced by the RAN.

Figure 13:
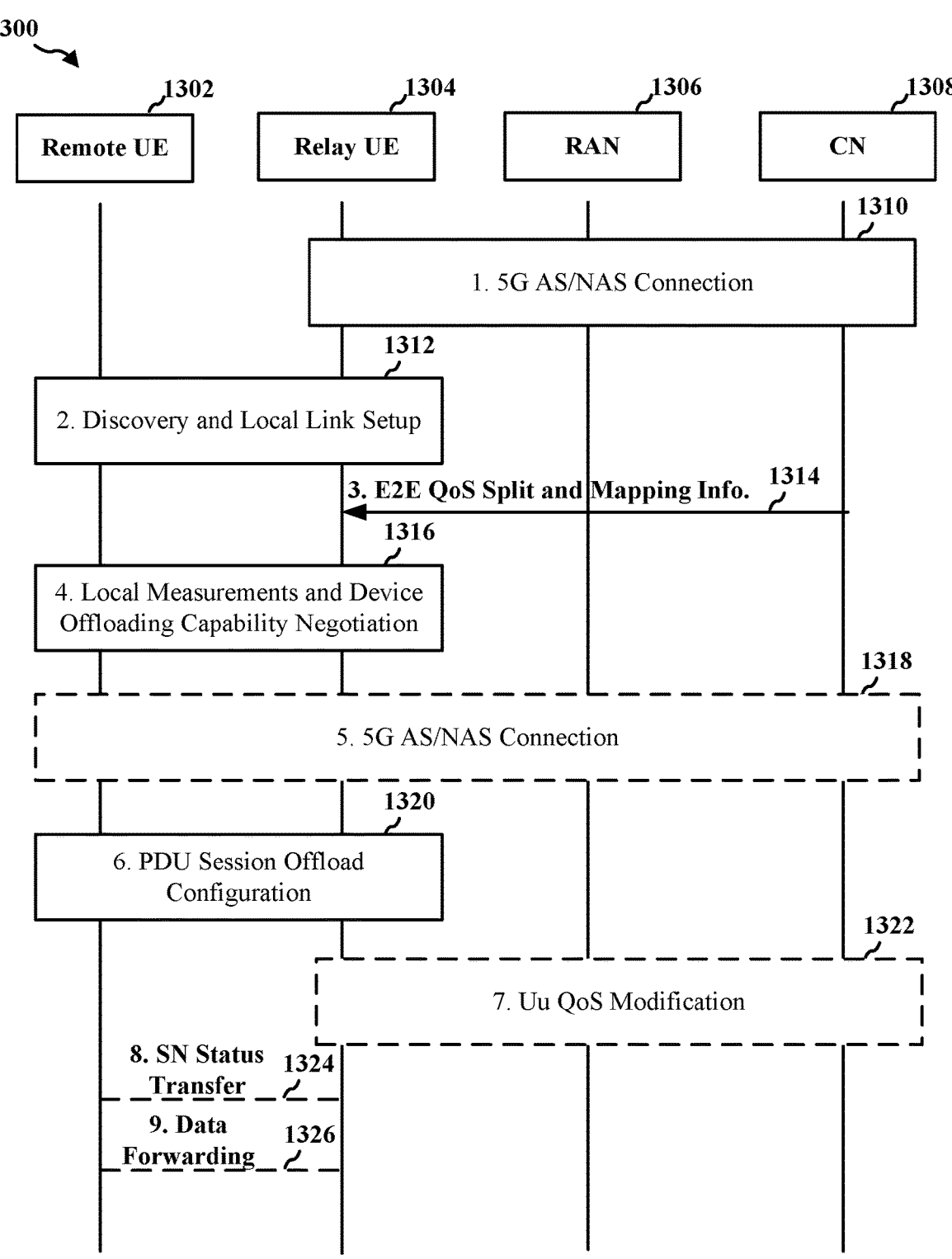
FIG. 13 is a diagram illustrating a communication flow of a method of wireless communication.

FIG. 13 is a diagram illustrating a communication flow 1300 of a method of wireless communication. The RAN 1306 may be an NG-RAN. The CN 1308 may be a 5GC. FIG. 13 illustrates operations associated with UE controlled session offloading within the relay path. The session offloading may be offloading of a user plane session either from the relay UE 1304 to the remote UE 1302 or from the remote UE 1302 to the relay UE 1304. At 1310, the relay UE 1304 may establish AS/NAS connections with the RAN 1306 (e.g., an NG-RAN) (e.g., a base station) and the core network 1308. At 1312, the remote UE 1302 and the relay UE 1304 may perform discovery and set up a local link (e.g., a sidelink, a Bluetooth link, a Wi-Fi link, a Zigbee link, etc.). At 1314, the core network 1308 may transmit, to the relay UE 1304, an indication of the E2E QoS split between the direct Uu link (between the relay UE 1304 and the RAN 1306) and the local link (between the remote UE 1302 and the relay UE 1304) and the bearer mapping information. The core network 1308 may provide the information either through proximity-based services (ProSe) policy provisioning or as part of the PDU session management procedures. At 1316, the remote UE 1302 and the relay UE 1304 may perform local measurements and negotiate device offloading capabilities. The remote UE 1302 and the relay UE 1304 may exchange information about whether session offloading in the relay path is supported, and if it is, which types of session offloading in the relay path are supported (e.g., by the remote UE 1302 as well as by the relay UE 1304). If the local link is a sidelink, a sidelink-RRC sidelink UE capability transfer procedure may be used at 1316. At 1318, the remote UE 1302 may establish AS/NAS connections with the RAN 1306 and the core network 1308, as appropriate.

At 1320, the relay UE 1304 and the remote UE 1302 may configure offloading of PDU sessions. If the user plane session offloading is from the relay UE 1304 to the remote UE 1302 (a similar procedure may be used even with an L3 UE-to-network relay), the relay UE 1304 may offload the PDU session(s) and the corresponding bearers, and may provide configuration information for the session offloading to the remote UE 1302. The configuration information may include the configuration for the offloaded PDU Session(s) and the corresponding radio access (i.e. Uu) DRBs. The PDU session configuration may further include the parameters received from the network to configure the PDU session and the corresponding QoS flows, as specified in clause 8.3 of TS 24.501. The DRB configuration may further include the parameters received from the network to configure the radio access DRBs and the corresponding SDAP and PDCP layers for radio access DRBs. This may include the same configuration as used by the relay UE 1304 prior to the offloading, including security key material (e.g., $K_{gNB}$). The same configuration including the same security key material may be used because the network may not be aware of the session offloading. The configuration information provided to the remote UE 1302 may also include the configuration for the local link AL, MAC and PHY entities, including QoS configuration for the local link. If the local link is a sidelink, the sidelink-RRC reconfiguration procedure may be used to offload the session from the relay UE 1304 to the remote UE 1302. The relay UE 1304 may suspend or release the PDU session, Uu SDAP and/or PDCP entities for bearers offloaded to the remote UE 1302. It may be preferable for the relay UE 1304 to suspend instead of release the PDU session, Uu SDAP and/or PDCP entities for possible later resumption of the offloaded user plane session.

On the other hand, if the user plane session offloading is from the remote UE 1302 to the relay UE 1304, the remote UE 1302 may have a connection to the core network 1308 via the relay UE 1304, and may have E2E DRBs set up via the relay UE 1304. In other words, the relay UE 1304 may have received the relaying configuration including configuration for the AL. The remote UE 1302 may offload the PDU session(s) and the corresponding bearers to the relay UE 1304, and may provide configuration information for the session offloading to the relay UE 1304. The configuration information may include the configuration for the offloaded PDU session(s) and the corresponding radio access (i.e. Uu) DRBs. The PDU session configuration may further include the parameters received from the network to configure the PDU session and the corresponding QoS flows, as specified in clause 8.3 of TS 24.501. The DRB configuration may further include the parameters received from the network to configure the radio access DRBs and the corresponding SDAP and PDCP layers for radio access DRBs. This may include the same configuration as used by the remote UE 1302 prior to the offloading, including security key material (e.g., $K_{gNB}$). The same configuration including the same security key material may be used because the network may not be aware of the session offloading. The configuration information provided to the relay UE 1304 may also include E2E QoS requirements as part of the PDU session configuration. The remote UE 1302 may either suspend or release the PDU session, Uu SDAP, PDCP, and/or AL entities and the local link channels for bearers offloaded to relay UE 1304. It may be preferable for the remote UE 1302 to suspend instead of release the PDU session, Uu SDAP, PDCP, and/or AL entities for possible later resumption of the offloaded user plane session.

At 1322, the RAN 1306 and the core network 1308 may modify the QoS for the direct Uu connection with the relay UE 1304, as appropriate. The RAN 1306 and the core network 1308 may modify the QoS in response to a request from the relay UE 1304 to modify the Uu link QoS corresponding to the PDU session(s) offloaded to the remote UE 1302 in order to meet the E2E QoS specifications in the relay setup. At 1324, if the user plane session offloading is from the relay UE 1304 to the remote UE 1302, the relay UE 1304 may transmit, to the remote UE 1302, a sequence number (SN) status transfer message. If the user plane session offloading is from the remote UE 1302 to the relay UE 1304, the remote UE 1302 may transmit, to the relay UE 1304, an SN status transfer message. PDCP SN continuity may be achieved with the SN status transfer. At 1326, if the user plane session offloading is from the relay UE 1304 to the remote UE 1302, the relay UE 1304 may forward first data (e.g., data corresponding to the offloaded user plane sessions) to the remote UE 1302. If the user plane session offloading is from the remote UE 1302 to the relay UE 1304, the remote UE 1302 may forward first data (e.g., data corresponding to the offloaded user plane sessions) to the relay UE 1304. If the AL header is configured for sidelink/Uu links, the relay UE 1304 may support the relaying for offloaded bearers with the AL between the sidelink/Uu PDCP and sidelink/Uu RLC layers.

Figure 14:
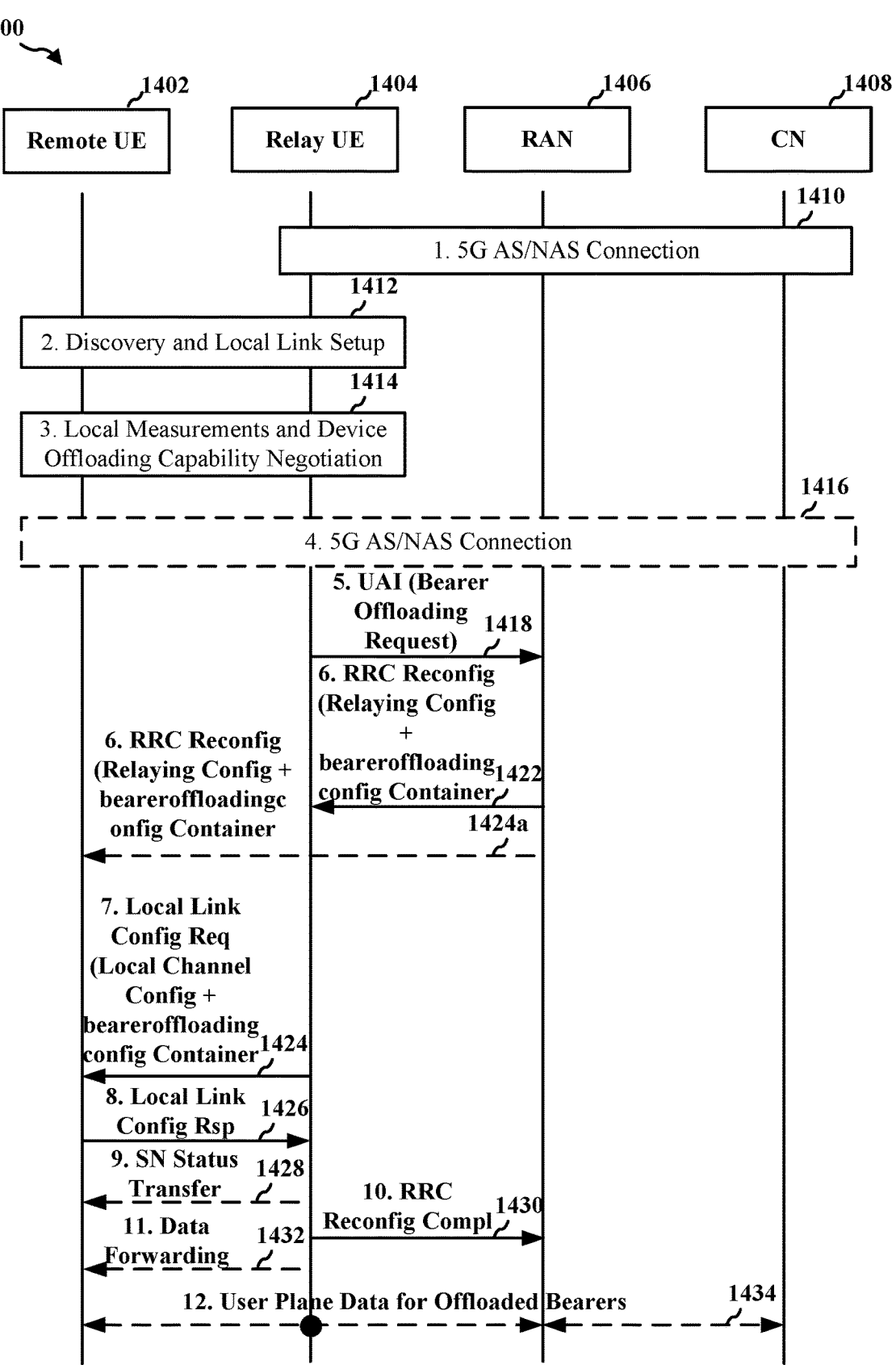
FIG. 14 is a diagram illustrating a communication flow of a method of wireless communication.

FIG. 14 is a diagram illustrating a communication flow 1400 of a method of wireless communication. The RAN 1406 may be an NG-RAN. The CN 1408 may be a 5GC. FIG. 14 illustrates operations associated with RAN controlled session offloading within the relay path where a user plane session is offloaded from the relay UE 1404 to the remote UE 1402. At 1410, the relay UE 1404 may establish AS/NAS connections with the RAN 1406 (e.g., an NG-RAN) (e.g., a base station) and the core network 1408. At 1412, the remote UE 1402 and the relay UE 1404 may perform discovery and set up a local link (e.g., a sidelink, a Bluetooth link, a Wi-Fi link, a Zigbee link, etc.). At 1414, the remote UE 1402 and the relay UE 1404 may perform local measurements and negotiate device offloading capabilities. The remote UE 1402 and the relay UE 1404 may exchange information about whether session offloading in the relay path is supported, and if it is, which types of session offloading in the relay path are supported (e.g., by the remote UE 1402 as well as by the relay UE 1404). At 1416, the remote UE 1402 may establish AS/NAS connections with the RAN 1406 and the core network 1408, as appropriate. At 1418, the relay UE 1404 may transmit, to the RAN 1406, a bearer offloading request via a UE assistance information (UAI) message. The bearer offloading request may correspond to a preference of the relay UE 1404 to offload some bearers to the remote UE 1402, and may include an identifier (ID) of the remote UE 1404 and offloading request E2E DRB IDs. The identifier (ID) of the remote UE may be a cell-radio network temporary identifier (RNTI) (C-RNTI), an inactive RNTI (I-RNTI), a remote UE source L2 ID, or a remote UE local ID used for relaying. The preference of the relay UE 1404 to offload some bearers may be based on one or more of a power consumption, a compute capability, a processing load, a channel quality, a resource utilization, etc. The bearer offloading request may also include the preference for security key material provisioning for the offloaded bearers. The RAN 1406 may receive offloading policies for the PDU session(s) offloading policies in a PDU Session Resource Setup Request Transfer message via one or more QoS Flow Setup Request Item information elements (IEs) forwarded by an AMF. The RAN 1406 may decide to offload all or some bearers of PDU session(s) to the remote UE 1402 based on a) detection of the relaying setup and the bearer offloading policy for the relay UE 1404 and/or b) an explicit request from the relay UE 1404 to offload the bearer and the policy check. The offloading may also be based on an application trigger. In one or more configurations, based on the network policies, the user plane sessions carrying certain applications or subscriptions may or may not be allowed to be offloaded.

At 1422, the RAN 1406 may transmit, to the relay UE 1404, a relaying configuration and a container for bearer offloading configurations (e.g., a bearerofﬂoadingconﬁg container, or "the container") via an RRC reconfiguration message. Accordingly, the RAN 1406 may reconfigure the relay UE 1404 bearers corresponding to the bearer offloading QoS flows. In particular, the RAN 1406 may configure the relaying Uu RLC channels and the Uu AL configuration with the relay UE 1404. The bearerofﬂoadingconﬁg container provided by the RAN 1406 may include the configuration for PDU session resources and the corresponding QoS flows, DRB(s) SDAP and PDCP entities, the configuration for the local link AL, and radio access security configurations (e.g., $K_{gNB}$ and $K_{ON}$, where $K_{ON}$, the offloaded node key, may be forwarded to the remote UE 1402 and the remote UE 1402 may derive further keys for the DRBs based on $K_{ON}$ for further communications with the network). The temporary or local ID of the remote UE 1402 may be assigned by the RAN 1406 at 1422 or may be indicated by the relay UE 1404 at 1418. The RAN 1406 and the relay UE 1404 may use the temporary or local remote UE 1402 ID in association with the relay UE 1404 ID for remote UE 1402 context maintenance.

If the remote UE 1402 hosts a control plane, at 1424a, the RAN 1406 may transmit, to the remote UE 1402, the relaying configuration and the bearerofﬂoadingconﬁg container via an RRC reconfiguration message. In some configurations (e.g., if the remote UE 1402 does not host a control plane session), at 1424, the relay UE 1404 may transmit, to the remote UE 1402, the relaying configuration and the bearerofﬂoadingconﬁg container via a local link configuration request message. Accordingly, the relay UE 1404 may use the local link configuration procedure to set up the relaying local link resources for the offloaded bearers, and may forward the container to the remote UE 1402. For example, if the local link is a sidelink, a sidelink-RRC RRC reconfiguration procedure may be used at 1424. At 1426, the remote UE 1402 may transmit, to the relay UE 1404, a response to the local link configuration request message 1424. At 1428, the relay UE 1404 may transmit, to the remote UE 1402, an SN status transfer message. At 1430, after the local link is successfully configured, the relay UE 1404 may transmit, to the RAN 1406, an RRC reconfiguration complete message in response to the RRC reconfiguration message 1422. In another configuration, the relay UE 1404 may transmit the RRC reconfiguration complete message immediately after 1422, and may transmit another UAI message to the RAN 1406 to indicate the success of the local link configuration after 1426. The relay UE 1404 may release the PDU session, Uu SDAP and/or PDCP entities for bearers offloaded to remote UE 1402. At 1432, the relay UE 1404 may forward first data (e.g., data corresponding to the offloaded user plane sessions) to the remote UE 1402. At 1434, the corresponding user plane data may be communicated over the offloaded bearers.

Figure 15:
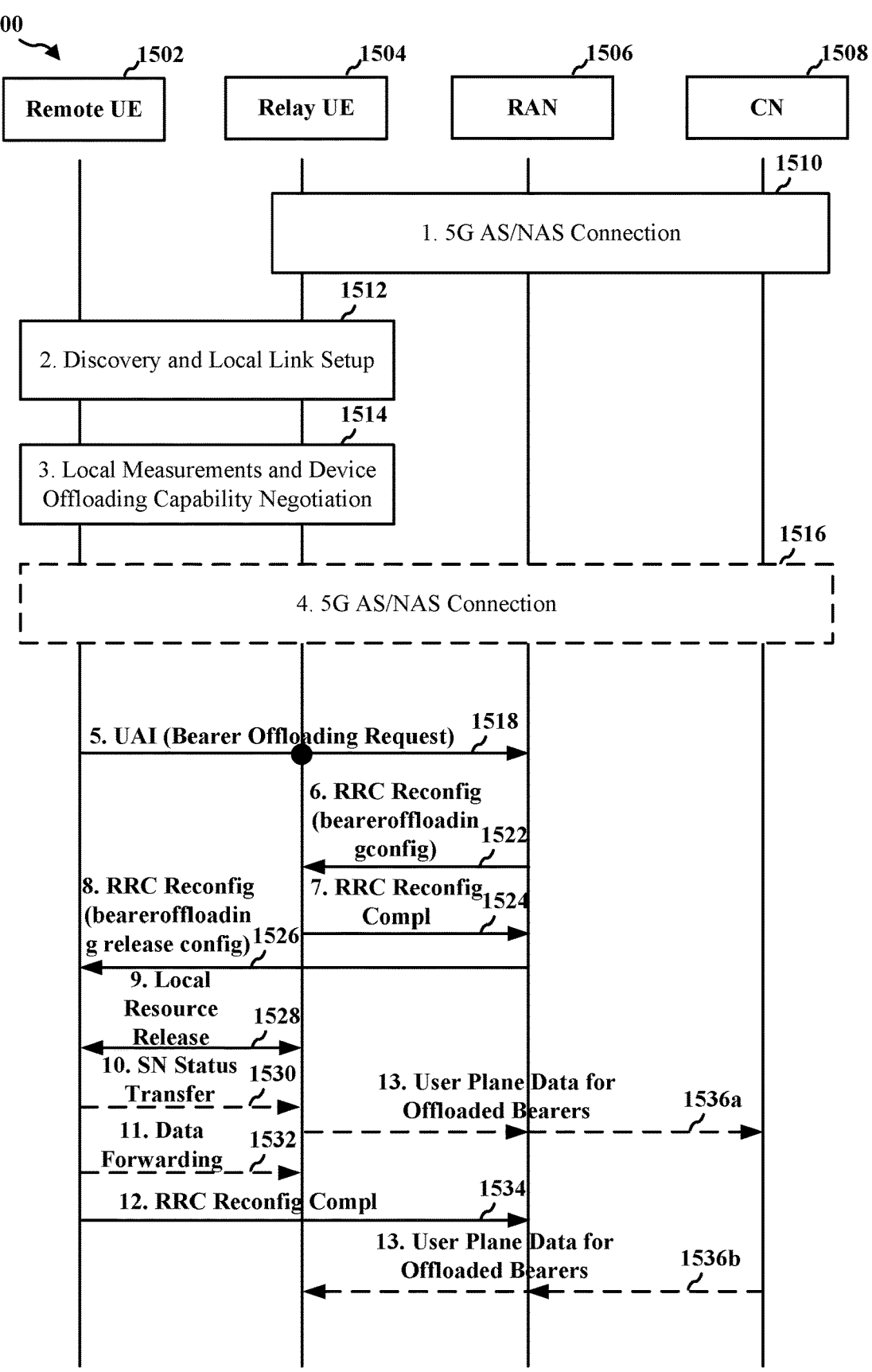
FIG. 15 is a diagram illustrating a communication flow of a method of wireless communication.

FIG. 15 is a diagram illustrating a communication flow 1500 of a method of wireless communication. The RAN 1506 may be an NG-RAN. The CN 1508 may be a 5GC. FIG. 15 illustrates operations associated with RAN controlled session offloading within the relay path where a user plane session is offloaded from the remote UE 1502 to the relay UE 1504. The preparation operations 1510 through 1516 may be similar to the preparation operations 1410 through 1416 illustrated in FIG. 14. At 1510, the relay UE 1504 may establish AS/NAS connections with the RAN 1506 (e.g., an NG-RAN) (e.g., a base station) and the core network 1508. At 1512, the remote UE 1502 and the relay UE 1504 may perform discovery and set up a local link (e.g., a sidelink, a Bluetooth link, a Wi-Fi link, a Zigbee link, etc.). At 1514, the remote UE 1502 and the relay UE 1504 may perform local measurements and negotiate device offloading capabilities. The remote UE 1502 and the relay UE 1504 may exchange information about whether session offloading in the relay path is supported, and if it is, which types of session offloading in the relay path are supported (e.g., by the remote UE 1502 as well as by the relay UE 1504). At 1516, the remote UE 1502 may establish AS/NAS connections with the RAN 1506 and the core network 1508, as appropriate. At 1518, the remote UE 1502 may transmit, to the relay UE 1504 and to the RAN 1506, a bearer offloading request via a UAI message. The bearer offloading request may correspond to a preference of the remote UE 1502 to offload some bearers to the relay UE 1504, and may include an identifier (ID) of the relay UE 1502 and offloading request E2E DRB IDs. The ID of the relay UE may be a C-RNTI or a relay UE source L2 ID used for relaying. The preference of the remote UE 1502 to offload some bearers may be based on one or more of a power consumption, a compute capability, a processing load, a channel quality, a resource utilization, etc. For example, the remote UE 1502 may prefer to offload some bearers when it is not capable of performing some of the processing. The bearer offloading request may also include the preference for security key material provisioning for the offloaded bearers. The RAN 1506 may receive offloading policies for the PDU session(s) offloading policies in a PDU Session Resource Setup Request Transfer message via one or more QoS Flow Setup Request Item IEs forwarded by an AMF. The RAN 1506 may decide to offload all or some bearers of PDU session(s) to the relay UE 1504 based on a) detection of the relaying setup and the bearer offloading policy for the remote UE 1502 and/or b) an explicit request from the remote UE 1502 to offload the bearer and the policy check. The offloading may also be based on an application trigger. In one or more configurations, based on the network policies, the user plane sessions carrying certain applications or subscriptions may or may not be allowed to be offloaded.

At 1522, the RAN 1506 may transmit, to the relay UE 1504, a bearerofloadingconfig container via an RRC reconfiguration message. Accordingly, the RAN 1506 may configure the relay UE 1504 with the offloaded bearers corresponding to the remote UE 1502 bearer offloading QoS flows. The bearerofloadingconfig container may include the configuration for PDU session resources and the corresponding QoS flows, DRB(s) SDAP and PDCP entities and security configurations. The security configurations may include the offloaded node key $K_{ON}$, which may be derived by the RAN 1506 based on the $K_{gNB}$ of the remote UE 1502 from which the bearer is offloaded. Derivation of $K_{ON}$ by the RAN 1506 may be similar to $K_{SN}$ derivation used in the case of multi-RAT dual connectivity (MR-DC). The relay UE 1504 may derive further keys based on $K_{ON}$ for further communications with the network. The RAN 1506 and the relay UE 1504 may use the remote UE 1502 ID in association with the relay UE 1504 ID for remote UE 1502 context maintenance. At 1524, the relay UE 1504 may transmit, to the RAN 1506, an RRC reconfiguration complete message in response to the RRC reconfiguration message 1522.

At 1526, the RAN 1506 may transmit, to the remote UE 1502, an indication of the bearer offloading release configuration via an RRC reconfiguration message. Accordingly, the RAN 1506 may reconfigure the remote UE 1502 to release the offloaded bearers. At 1528, the remote UE 1502 and the relay UE 1504 may release the corresponding local link resources. At 1530, the remote UE 1502 may transmit, to the relay UE 1504, an SN status transfer message. At 1532, the remote UE 1502 may forward first data (e.g., data corresponding to the offloaded user plane sessions) to the relay UE 1504. At 1534, the remote UE 1502 may transmit, to the RAN 1506, an RRC reconfiguration complete message in response to the RRC reconfiguration message 1526. At 1536a and 1536b, the corresponding user plane data may be communicated over the offloaded bearers.

Referring back to FIGS. 13-15, the remote UE 1302, 1402, and 1502 and the relay UE 1304, 1404, and 1504 may support the SN status transfer and data forwarding procedure in a similar fashion as base stations may support the SN status transfer and data forwarding procedure over the Xn interface between base stations. The UE offloading the bearer may initiate the SN status transfer procedure with the other UE by stopping assigning PDCP SNs to uplink SDUs. An SN status transfer message may include an indication of the receive status of the DL PDCP SDU, the PDCP-SN, and the hyper frame number (HFN) of the first missing DL SDU. The SN status transfer message may also include the PDCP-SN and the HFN that the UE to which the bearer is offloaded should assign for the next UL SDU not having an SN. For DRBs for which preservation of the SN status applies, the source UE may forward, in order, to the target UE all UL PDCP SDUs with their SNs corresponding to the PDCP PDUs that have not been acknowledged by the RAN.

To handle a radio link failure (RLF) in the Uu link between the relay UE and the RAN when session offloading is active, the relay UE may indicate the Uu RLF to the remote UE. The relay UE may release the remote UE user plane offloaded bearers and the configuration. The remote UE may release the relay UE user plane offloaded bearers and the configuration upon receiving the indication of the Uu RLF. Further, the remote UE may release the local link, and may perform cell or relay selection/reselection.

To handle an RLF in the local link (e.g., a sidelink RLF or a failure in a Bluetooth link, a Wi-Fi link, a Zigbee link, etc.), the relay UE may resume the relay UE user plane offloaded bearers. The remote UE may release the relay UE user plane offloaded bearers and the configuration. The remote UE may resume the remote UE user plane offloaded bearers. Further, the remote UE may perform cell or relay selection/reselection.

In case of the relay UE mobility, the relay UE may indicate the mobility event to the remote UE over the local link. If a group mobility is configured and the relay UE has not indicated to the remote UE to release the offloaded bearers, the remote UE may maintain the relay UE user plane offloaded bearers through the mobility event. If the relay UE has indicated to the remote UE to release the offloaded bearers, the remote UE may release the relay UE user plane offloaded bearers. For the remote UE user plane offloaded bearers, the remote UE may unilaterally resume the bearers on its own if the relay UE mobility is not a group mobility. If a group mobility is configured for the relay UE mobility, the remote UE may not indicate to the relay UE to release the remote UE user plane offloaded bearers.

In case of the remote UE mobility, the remote UE may release the relay UE user plane offloaded bearers upon a mobility event if the remote UE is moving to a different cell or relay. The remote UE may resume the remote UE user plane offloaded bearers upon a mobility event if the remote UE is moving to a different cell or relay. The network may notify the old relay UE to release the bearer configuration context for the remote UE.

FIG. 16 is a flowchart 1600 of a method of wireless communication. The method may be performed by a first wireless device (e.g., a remote UE) (e.g., the UE 104a/1302/1402/1502; the apparatus 1902). At 1602, the first wireless device may identify at least one configuration for a relocation of one or more first session termination points associated with one or more radio access packet data sessions from a second wireless device to the first wireless device or from the first wireless device to the second wireless device. For example, 1602 may be performed by the configuration component 1940 in FIG. 19. Referring back to FIGS. 13-15, at 1316, 1320, 1414, 1420, 1424, 1514, 1520, and 1526, the first wireless device (e.g., 1302, 1402, and 1502) may identify at least one configuration for a relocation of one or more first session termination points associated with one or more radio access packet data sessions from a second wireless device (e.g., 1304, 1404, and 1504) to the first wireless device (e.g., 1302, 1402, and 1502) or from the first wireless device (e.g., 1302, 1402, and 1502) to the second wireless device (e.g., 1304, 1404, and 1504).

At 1604, the first wireless device may execute the relocation of the one or more first session termination points associated with the one or more radio access packet data sessions from the second wireless device to the first wireless device or from the first wireless device to the second wireless device based on the at least one configuration for the relocation of the one or more first session termination points. For example, 1604 may be performed by the session component 1942 in FIG. 19. Referring back to FIGS. 13-15, at 1324, 1426, 1428, 1528, 1530, and 1534, the first wireless device (e.g., 1302, 1402, and 1502) may execute the relocation of the one or more first session termination points associated with the one or more radio access packet data sessions from the second wireless device (e.g., 1304, 1404, and 1504) to the first wireless device (e.g., 1302, 1402, and 1502) or from the first wireless device (e.g., 1302, 1402, and 1502) to the second wireless device (e.g., 1304, 1404, and 1504) based on the at least one configuration for the relocation of the one or more first session termination points.

At 1606, the first wireless device may transmit or receive data with a network via the second wireless device based on the relocation of the one or more first session termination points. For example, 1606 may be performed by the data component 1944 in FIG. 19. Referring back to FIGS. 13-15, at 1326, 1432, 1434, and 1532, the first wireless device (e.g., 1302, 1402, and 1502) may transmit or receive data with a network via the second wireless device (e.g., 1304, 1404, and 1504) based on the relocation of the one or more first session termination points.

In one configuration, the first wireless device may transmit, to the second wireless device, an indication of whether the first wireless device supports the relocation of the one or more first session termination points.

In one configuration, the relocation of the one or more first session termination points may be from the second wireless device to the first wireless device. To identify the at least one configuration for the relocation of the one or more first session termination points, the first wireless device may receive, from the second wireless device, a first indication of a first configuration for relocating one or more second session termination points associated with one or more PDU sessions from the second wireless device to the first wireless device and a second indication of a second configuration for relocating one or more third session termination points associated with one or more corresponding bearers from the second wireless device to the first wireless device. The second configuration may include at least one of an SDAP configuration, a PDCP configuration, radio access security key material, a local link configuration including a local link QoS configuration. At least one of the first configuration or the second configuration may be associated with the second wireless device prior to the one or more first session termination points being relocated. The at least one configuration may include the first configuration and the second configuration. The one or more first session termination points may include the one or more second session termination points and the one or more third session termination points.

In one configuration, the relocation of the one or more first session termination points may be from the first wireless device to the second wireless device. To identify the at least one configuration for the relocation of the one or more first session termination points, the first wireless device may generate, at the first wireless device, a first configuration for relocating one or more second session termination points associated with one or more PDU sessions from the first wireless device to the second wireless device and a second configuration for relocating one or more third session termination points associated with one or more corresponding bearers from the first wireless device to the second wireless device. The second configuration may include at least one of an SDAP configuration, a PDCP configuration, radio access security key material, at least one of the first configuration or the second configuration is associated with the first wireless device prior to the one or more first session termination points being relocated. The at least one configuration may include the first configuration and the second configuration. The one or more first session termination points may include the one or more second session termination points and the one or more third session termination points.

In one configuration, the first wireless device may transmit, to the second wireless device, a first indication of the first configuration and a second indication of the second configuration. The first wireless device may suspend or release the one or more PDU sessions, one or more radio access SDAP or PDCP entities, or one or more local link channels associated with the one or more corresponding bearers.

In one configuration, the first wireless device may transmit, to a network entity, an indication of a preference associated with the relocation of the one or more first session termination points.

In one configuration, the relocation of the one or more first session termination points may be from the second wireless device to the first wireless device. To identify the at least one configuration for the relocation of the one or more first session termination points, the first wireless device may receive, from the second wireless device, a first indication of a first configuration for relocating one or more second session termination points associated with one or more PDU sessions from the second wireless device to the first wireless device and a second indication of a second configuration for relocating one or more third session termination points associated with one or more corresponding bearers from the second wireless device to the first wireless device. The first configuration and the second configuration may be from a network entity. The second configuration may include at least one of an SDAP configuration, a PDCP configuration, or radio access security key material. The at least one configuration may include the first configuration and the second configuration. The one or more first session termination points may include the one or more second session termination points and the one or more third session termination points.

In one configuration, the radio access security key material may be associated with the second wireless device prior to the one or more first session termination points being relocated.

In one configuration, the radio access security key material may be derived from original security key material associated with the second wireless device prior to the one or more first session termination points being relocated.

In one configuration, the relocation of the one or more first session termination points may be from the first wireless device to the second wireless device. To identify the at least one configuration for the relocation of the one or more first session termination points, the first wireless device may receive, from a network entity, a third indication of a first configuration for relocating one or more second session termination points associated with one or more PDU sessions from the first wireless device to the second wireless device and a fourth indication of a second configuration for relocating one or more third session termination points associated with one or more corresponding bearers from the first wireless device to the second wireless device. The at least one configuration may include the first configuration and the second configuration. The one or more first session termination points may include the one or more second session termination points and the one or more third session termination points.

In one configuration, the first wireless device may release the one or more PDU sessions, one or more bearers, or one or more local link channels associated with the one or more corresponding bearers.

In one configuration, the relocation of the one or more first session termination points may be from the second wireless device to the first wireless device. The first wireless device may receive, from the second wireless device, a message for an SN status transfer. The first wireless device may receive, from the second wireless device, forwarded first data.

In one configuration, the relocation of the one or more first session termination points may be from the first wireless device to the second wireless device. The first wireless device may transmit, to the second wireless device, a message for an SN status transfer. The first wireless device may forward first data to the second wireless device.

In one configuration, the first wireless device may release one or more first PDU sessions, one or more radio access SDAP entities, one or more PDCP entities, or one or more local link channels in response to at least one of a first local link RLF, receiving from the second wireless device an indication of a first radio access link RLF, receiving from the second wireless device an indication of second wireless device mobility, or first wireless device mobility. The one or more first PDU sessions, the one or more SDAP entities, the one or more PDCP entities, or the one or more local link channels may be associated with at least some of the one or more first session termination points that have been relocated from the second wireless device to the first wireless device.

In one configuration, the first wireless device may resume one or more second PDU sessions or one or more radio access bearers over a radio access link or a relay link via a third wireless device in response to at least one of a second local link RLF, receiving from the second wireless device an indication of a second radio access link RLF, first wireless mobility, or second wireless mobility. The one or more second PDU sessions or the one or more radio access bearers may be associated with at least some of the one or more first session termination points that have been relocated from the first wireless device to the second wireless device.

In one configuration, each of the one or more radio access packet data sessions may correspond to a PDU session associated with a Uu RAT.

FIG. 17 is a flowchart 1700 of a method of wireless communication. The method may be performed by a second wireless device (e.g., a relay UE) (e.g., the UE 104*b*/1304/ 1404/1504; the device 350; the apparatus 2002). At 1702, the second wireless device may identify at least one configuration for a relocation of one or more first session termination points associated with one or more radio access packet data sessions from the second wireless device to a first wireless device or from the first wireless device to the second wireless device. For example, 1702 may be performed by the configuration component 2040 in FIG. 20. Referring back to FIGS. 13-15, at 1316, 1320, 1414, 1418, 1420, 1422, 1514, 1518, 1520, and 1522, the second wireless device (e.g., 1304, 1404, or 1504) may identify at least one configuration for a relocation of one or more first session termination points associated with one or more radio access packet data sessions from the second wireless device (e.g., 1304, 1404, or 1504) to a first wireless device (e.g., 1302, 1402, or 1502) or from the first wireless device (e.g., 1302, 1402, or 1502) to the second wireless device (e.g., 1304, 1404, or 1504).

At 1704, the second wireless device may execute the relocation of the one or more first session termination points associated with the one or more radio access packet data sessions from the second wireless device to the first wireless device or from the first wireless device to the second wireless device based on the at least one configuration for the relocation of the one or more first session termination points. For example, 1704 may be performed by the session component 2042 in FIG. 20. Referring back to FIGS. 13-15, at 1324, 1424, 1426, 1428, 1430, 1524, 1528, and 1530, the second wireless device (e.g., 1304, 1404, or 1504) may execute the relocation of the one or more first session termination points associated with the one or more radio access packet data sessions from the second wireless device (e.g., 1304, 1404, or 1504) to the first wireless device (e.g., 1302, 1402, or 1502) or from the first wireless device (e.g., 1302, 1402, or 1502) to the second wireless device (e.g., 1304, 1404, or 1504) based on the at least one configuration for the relocation of the one or more first session termination points.

At 1706, the second wireless device may forward data between a network and the first wireless device based on at least one first radio access packet data session of the one or more radio access packet data sessions. At least one first session termination point of the one or more first session termination points associated with the at least one first radio access packet data session may have been relocated. For example, 1706 may be performed by the data component 2044 in FIG. 20. Referring back to FIGS. 13-15, at 1326, 1432, 1434, 1532, and 1536, the second wireless device (e.g., 1304, 1404, or 1504) may forward data between a network and the first wireless device (e.g., 1302, 1402, and 1502) based on at least one first radio access packet data session of the one or more radio access packet data sessions.

In one configuration, the second wireless device may receive, from the first wireless device, an indication of whether the first wireless device supports the relocation of the one or more first session termination points.

In one configuration, the relocation of the one or more first session termination points may be from the second wireless device to the first wireless device. To identify the at least one configuration for the relocation of the one or more first session termination points, the second wireless device may generate, at the second wireless device, a first configuration for relocating one or more second session termination points associated with one or more PDU sessions from the second wireless device to the first wireless device and a second configuration for relocating one or more third session termination points associated with one or more corresponding bearers from the second wireless device to the first wireless device. The second configuration may include at least one of an SDAP configuration, a PDCP configuration, radio access security key material, a local link configuration including a local link QoS configuration. At least one of the first configuration or the second configuration may be associated with the second wireless device prior to the one or more first session termination points being relocated. The at least one configuration may include the first configuration and the second configuration. The one or more first session termination points may include the one or more second session termination points and the one or more third session termination points.

In one configuration, the second wireless device may transmit, to the first wireless device, a first indication of the first configuration and a second indication of the second configuration. The second wireless device may suspend or release the one or more PDU sessions or one or more radio access SDAP or PDCP entities associated with the one or more corresponding bearers.

In one configuration, the relocation of the one or more first session termination points may be from the first wireless device to the second wireless device. To identify the at least one configuration for the relocation of the one or more first session termination points, the second wireless device may receive, from the first wireless device, a first indication of a first configuration for relocating one or more second session termination points associated with one or more PDU sessions from the first wireless device to the second wireless device and a second indication of a second configuration for relocating one or more third session termination points associated with one or more corresponding bearers from the first wireless device to the second wireless device. The second configuration may include at least one of an SDAP configuration, a PDCP configuration, radio access security key material, at least one of the first configuration or the second configuration is associated with the first wireless device prior to the one or more first session termination points being relocated. The at least one configuration may include the first configuration and the second configuration. The one or more first session termination points may include the one or more second session termination points and the one or more third session termination points.

In one configuration, the second wireless device may transmit, to a network entity, an indication of a preference associated with the relocation of the one or more first session termination points.

In one configuration, the relocation of the one or more first session termination points may be from the second wireless device to the first wireless device. To identify the at least one configuration for the relocation of the one or more first session termination points, the second wireless device may receive, from a network entity, a fifth indication of an RLC configuration, a radio access MAC configuration, or a second adaptation layer configuration. The second device may receive, from the network entity, a first indication of a first configuration for relocating one or more second session termination points associated with one or more PDU sessions from the second wireless device to the first wireless device and a second indication of a second configuration for relocating one or more third session termination points associated with one or more corresponding bearers from the second wireless device to the first wireless device. The second configuration may include at least one of an SDAP configuration, a PDCP configuration, radio access security key material, or a first adaptation layer configuration. The at least one configuration may include the RLC configuration, the radio access MAC configuration, the second adaptation layer configuration, the first configuration, or the second configuration. The one or more first session termination points may include the one or more second session termination points and the one or more third session termination points.

In one configuration, the second wireless device may transmit, to the first wireless device, a third indication of the first configuration for relocating the one or more second session termination points associated with the one or more PDU sessions from the second wireless device to the first wireless device and a fourth indication of the second configuration for relocating the one or more third session termination points associated with the one or more corresponding bearers from the second wireless device to the first wireless device. The second wireless device may release the one or more PDU sessions or one or more SDAP or PDCP entities associated with the one or more corresponding bearers.

In one configuration, the relocation of the one or more first session termination points may be from the first wireless device to the second wireless device. To identify the at least one configuration for the relocation of the one or more first session termination points, the second wireless device may receive, from a network entity, a first indication of a first configuration for relocating one or more second session termination points associated with one or more PDU sessions from the first wireless device to the second wireless device and a second indication of a second configuration for relocating one or more third termination points associated with one or more corresponding bearers from the first wireless device to the second wireless device. The second configuration may include at least one of an SDAP configuration, a PDCP configuration, or radio access security key material. The at least one configuration may include the first configuration and the second configuration. The one or more first session termination points may include the one or more second session termination points and the one or more third session termination points.

In one configuration, the relocation of the one or more first session termination points may be from the second wireless device to the first wireless device. The second wireless device may transmit, to the first wireless device, a message for an SN status transfer. The second wireless device may forward first data to the first wireless device.

In one configuration, the relocation of the one or more first session termination points may be from the first wireless device to the second wireless device. The second wireless device may receive, from the first wireless device, a message for an SN status transfer. The second wireless device may receive, from the first wireless device, forwarded first data.

In one configuration, the second wireless device may release one or more first PDU sessions or one or more first radio access bearers in response to a first radio access link RLF. The one or more first PDU sessions or the one or more first radio access bearers may be associated with at least some of the one or more first session termination points that have been relocated from the first wireless device to the second wireless device.

In one configuration, the second wireless device may resume one or more second PDU sessions or one or more second radio access bearers in response to a second radio access link RLF. The one or more second PDU sessions or the one or more second radio access bearers may be associated with at least some of the one or more first session termination points that have been relocated from the second wireless device to the first wireless device.

In one configuration, the second wireless device may indicate to the first wireless device to release one or more third PDU sessions or one or more third radio access bearers in response to second wireless device mobility. The one or more third PDU sessions or the one or more third radio access bearers may be associated with at least some of the one or more first session termination points that have been relocated from the second wireless device to the first wireless device.

In one configuration, the second wireless device may receive, from the first wireless device, an indication to release one or more fourth PDU sessions or one or more fourth radio access bearers in response to first wireless device mobility. The one or more fourth PDU sessions or the one or more fourth radio access bearers may be associated with at least some of the one or more first session termination points that have been relocated from the first wireless device to the second wireless device.

In one configuration, each of the one or more radio access packet data sessions may correspond to a PDU session associated with a Uu RAT.

FIG. 18 is a flowchart 1800 of a method of wireless communication. The method may be performed by a network entity in a RAN (e.g., the base station 102/180; the device 310; the NG-RAN 1306/1406/1506 or part thereof; the apparatus 2102). At 1802, the network entity may receive, from at least one of a first wireless device or a second wireless device, one or more indications of UE preferences associated with a relocation of one or more first session termination points associated with one or more radio access packet data sessions. For example, 1802 may be performed by the preference component 2140 in FIG. 21. Referring back to FIGS. 14 and 15, at 1418, 1420, 1518, and 1520, the network entity (e.g., 1406 or 1506) may receive, from at least one of a first wireless device (e.g., 1402 or 1502) or a second wireless device (e.g., 1404 or 1504), one or more indications of UE preferences associated with a relocation of one or more first session termination points associated with one or more radio access packet data sessions.

At 1804, the network entity may transmit at least one indication of at least one configuration for the relocation of the one or more first session termination points associated with the one or more radio access packet data sessions from the second wireless device to the first wireless device or from the first wireless device to the second wireless device. For example, 1804 may be performed by the configuration component 2142 in FIG. 21. Referring back to FIGS. 14 and 15, at 1422, 1522, and 1526, the network entity (e.g., 1406 or 1506) may transmit at least one indication of at least one configuration for the relocation of the one or more first session termination points associated with the one or more radio access packet data sessions from the second wireless device (e.g., 1404 or 1504) to the first wireless device (e.g., 1402 or 1502) or from the first wireless device (e.g., 1402 or 1502) to the second wireless device (e.g., 1404 or 1504).

In one configuration, the relocation of the one or more first session termination points may be from the second wireless device to the first wireless device. To transmit the at least one indication of the at least one configuration, the network entity may transmit, to the second wireless device, a fifth indication of an RLC configuration, a radio access MAC configuration, or a second adaptation layer configuration. The network entity may transmit, to the second wireless device via an RRC message, a first indication of a first configuration for relocating one or more second session termination points associated with one or more PDU sessions from the second wireless device to the first wireless device and a second indication of a second configuration for relocating one or more third session termination points associated with one or more corresponding bearers from the second wireless device to the first wireless device, the second configuration may include at least one of an SDAP configuration, a PDCP configuration, radio access security key material, or a first adaptation layer configuration. The at least one configuration may include the RLC configuration, the radio access MAC configuration, the second adaptation layer configuration, the first configuration, or the second configuration. The one or more first session termination points may include the one or more second session termination points and the one or more third session termination points.

In one configuration, the relocation of the one or more first session termination points may be from the first wireless device to the second wireless device. To transmit the at least one indication of the at least one configuration, the network entity may transmit, to the second wireless device via a first RRC message, a first indication of a first configuration for relocating one or more second session termination points associated with one or more PDU sessions from the first wireless device to the second wireless device and a second indication of a second configuration for relocating one or more third session termination points associated with one or more corresponding bearers from the first wireless device to the second wireless device. The second configuration may include at least one of an SDAP configuration, a PDCP configuration, or radio access security key material. The at least one configuration may include the first configuration and the second configuration. The one or more first session termination points may include the one or more second session termination points and the one or more third session termination points. The network entity may transmit, to the first wireless device via a second RRC message, a third indication of the first configuration for relocating the one or more second session termination points associated with the one or more PDU sessions from the first wireless device to the second wireless device and a fourth indication of the second configuration for relocating the one or more third session termination points associated with the one or more corresponding bearers from the first wireless device to the second wireless device. The first configuration or the second configuration may include one or more identifiers of the one or more PDU sessions and the one or more corresponding bearers.

In one configuration, the network entity may maintain a first wireless device context associated with the relocation of the one or more first session termination points associated with the one or more radio access packet data sessions based on a first identifier of the first wireless device in association with a second identifier of the second wireless device.

In one configuration, each of the one or more radio access packet data sessions may correspond to a PDU session associated with a Uu RAT.

Figure 19:
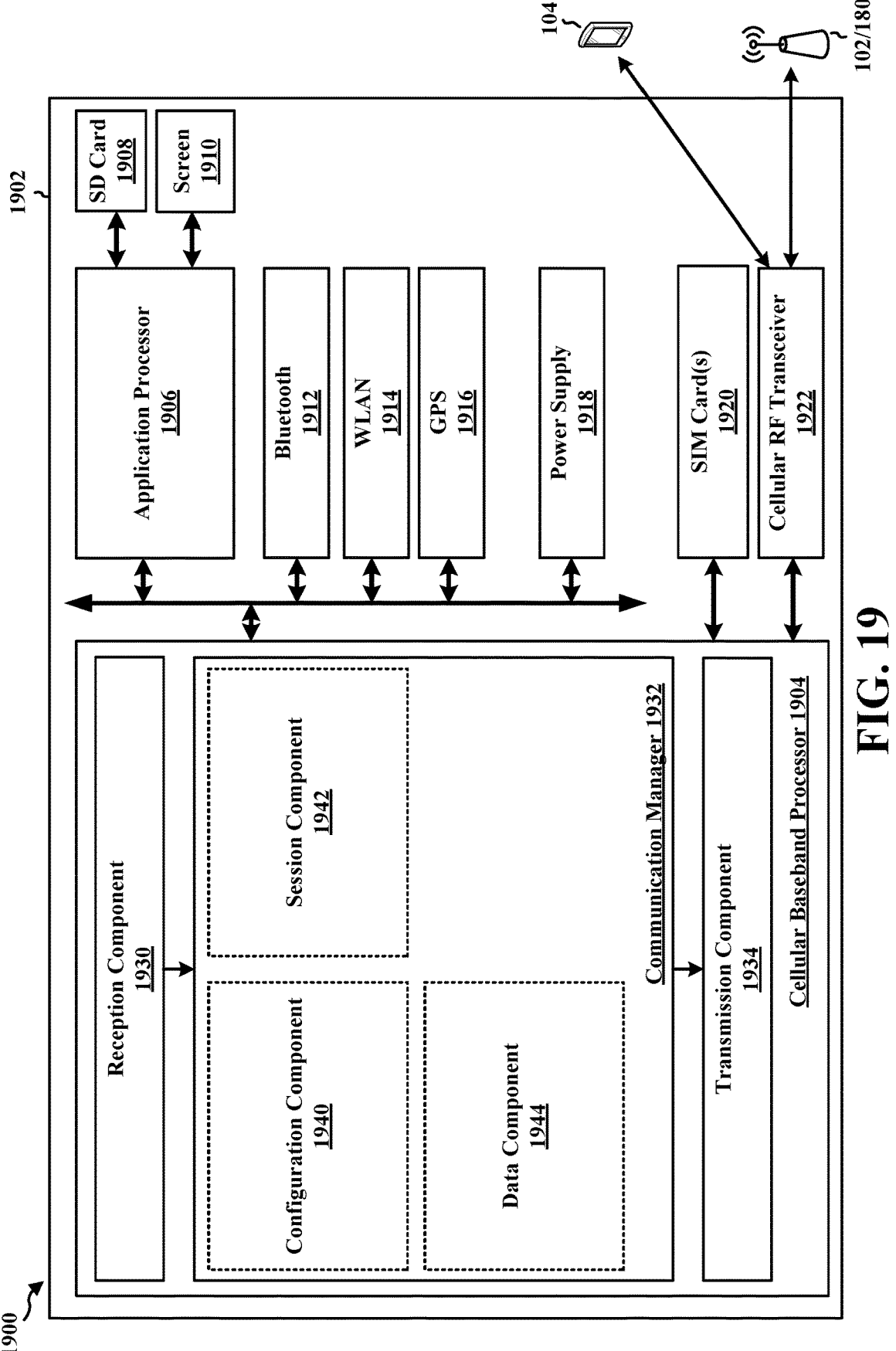
FIG. 19 is a diagram illustrating an example of a hardware implementation for an example apparatus.

FIG. 19 is a diagram 1900 illustrating an example of a hardware implementation for an apparatus 1902. The apparatus 1902 may be a remote UE/a first wireless device, a component of a remote UE/a first wireless device, or may implement remote UE/first wireless device functionality. In some aspects, the apparatus 1902 may include a cellular baseband processor 1904 (also referred to as a modem) coupled to a cellular RF transceiver 1922. In some aspects, the apparatus 1902 may further include one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, or a power supply 1918. The cellular baseband processor 1904 communicates through the cellular RF transceiver 1922 with the UE 104 and/or BS 102/180. The cellular baseband processor 1904 may include a computer-readable medium/memory. The computer-readable medium/memory may be non-transitory. The cellular baseband processor 1904 is responsible for general processing, including the execution of software stored on the computer-readable medium/memory. The software, when executed by the cellular baseband processor 1904, causes the cellular baseband processor 1904 to perform the various functions described supra. The computer-readable medium/memory may also be used for storing data that is manipulated by the cellular baseband processor 1904 when executing software. The cellular baseband processor 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the cellular baseband processor 1904. In one configuration, the apparatus 1902 may be a modem chip and include just the baseband processor 1904, and in another configuration, the apparatus 1902 may be the entire UE and include the additional modules of the apparatus 1902.

The communication manager 1932 includes a configuration component 1940 that may be configured to identify at least one configuration for a relocation of one or more first session termination points associated with one or more radio access packet data sessions from a second wireless device to the first wireless device or from the first wireless device to the second wireless device, e.g., as described in connection with 1602 in FIG. 16. The communication manager 1932 further includes a session component 1942 that may be configured to execute the relocation of the one or more first session termination points associated with the one or more radio access packet data sessions from the second wireless device to the first wireless device or from the first wireless device to the second wireless device based on the at least one configuration for the relocation of the one or more first session termination points, e.g., as described in connection with 1604 in FIG. 16. The communication manager 1932 further includes a data component 1944 that may be configured to transmit or receive data with a network via the second wireless device based on the relocation of the one or more first session termination points, e.g., as described in connection with 1606 in FIG. 16.

The apparatus may include additional components that perform each of the blocks of the algorithm in the flowcharts of FIGS. 13-16. As such, each block in the flowcharts of FIGS. 13-16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1902 may include a variety of components configured for various functions. In one configuration, the apparatus 1902, and in particular the cellular baseband processor 1904, includes means for identifying at least one configuration for a relocation of one or more first session termination points associated with one or more radio access packet data sessions from a second wireless device to the first wireless device or from the first wireless device to the second wireless device. The apparatus 1902, and in particular the cellular baseband processor 1904, includes means for executing the relocation of the one or more first session termination points associated with the one or more radio access packet data sessions from the second wireless device to the first wireless device or from the first wireless device to the second wireless device based on the at least one configuration for the relocation of the one or more first session termination points. The apparatus 1902, and in particular the cellular baseband processor 1904, includes means for transmit or receive data with a network via the second wireless device based on the relocation of the one or more first session termination points.

In one configuration, the apparatus 1902, and in particular the cellular baseband processor 1904, includes means for transmitting, to the second wireless device, an indication of whether the first wireless device supports the relocation of the one or more first session termination points. In one configuration, the relocation of the one or more first session termination points may be from the second wireless device to the first wireless device. The means for identifying the at least one configuration for the relocation of the one or more first session termination points may be further configured to: receive, from the second wireless device, a first indication of a first configuration for relocating one or more second session termination points associated with one or more PDU sessions from the second wireless device to the first wireless device and a second indication of a second configuration for relocating one or more third session termination points associated with one or more corresponding bearers from the second wireless device to the first wireless device. The second configuration may include at least one of an SDAP configuration, a PDCP configuration, radio access security key material, a local link configuration including a local link QoS configuration. At least one of the first configuration or the second configuration may be associated with the second wireless device prior to the one or more first session termination points being relocated. The at least one configuration may include the first configuration and the second configuration. The one or more first session termination points may include the one or more second session termination points and the one or more third session termination points. In one configuration, the relocation of the one or more first session termination points may be from the first wireless device to the second wireless device. The means for identifying the at least one configuration for the relocation of the one or more first session termination points may be further configured to: generate, at the first wireless device, a first configuration for relocating one or more second session termination points associated with one or more PDU sessions from the first wireless device to the second wireless device and a second configuration for relocating one or more third session termination points associated with one or more corresponding bearers from the first wireless device to the second wireless device. The second configuration may include at least one of an SDAP configuration, a PDCP configuration, radio access security key material, at least one of the first configuration or the second configuration is associated with the first wireless device prior to the one or more first session termination points being relocated. The at least one configuration may include the first configuration and the second configuration. The one or more first session termination points may include the one or more second session termination points and the one or more third session termination points. In one configuration, the apparatus 1902, and in particular the cellular baseband processor 1904, includes means for transmitting, to the second wireless device, a first indication of the first configuration and a second indication of the second configuration. The apparatus 1902, and in particular the cellular baseband processor 1904, includes means for suspending or releasing the one or more PDU sessions, one or more radio access SDAP or PDCP entities, or one or more local link channels associated with the one or more corresponding bearers. In one configuration, the apparatus 1902, and in particular the cellular baseband processor 1904, includes means for transmitting, to a network entity, an indication of a preference associated with the relocation of the one or more first session termination points. In one configuration, the relocation of the one or more first session termination points may be from the second wireless device to the first wireless device. The means for identifying the at least one configuration for the relocation of the one or more first session termination points may be further configured to: receive, from the second wireless device, a first indication of a first configuration for relocating one or more second session termination points associated with one or more PDU sessions from the second wireless device to the first wireless device and a second indication of a second configuration for relocating one or more third session termination points associated with one or more corresponding bearers from the second wireless device to the first wireless device. The first configuration and the second configuration may be from a network entity. The second configuration may include at least one of an SDAP configuration, a PDCP configuration, or radio access security key material. The at least one configuration may include the first configuration and the second configuration. The one or more first session termination points may include the one or more second session termination points and the one or more third session termination points. In one configuration, the radio access security key material may be associated with the second wireless device prior to the one or more first session termination points being relocated. In one configuration, the radio access security key material may be derived from original security key material associated with the second wireless device prior to the one or more first session termination points being relocated. In one configuration, the relocation of the one or more first session termination points may be from the first wireless device to the second wireless device. The means for identifying the at least one configuration for the relocation of the one or more first session termination points may be further configured to: receive, from a network entity, a third indication of a first configuration for relocating one or more second session termination points associated with one or more PDU sessions from the first wireless device to the second wireless device and a fourth indication of a second configuration for relocating one or more third session termination points associated with one or more corresponding bearers from the first wireless device to the second wireless device. The at least one configuration may include the first configuration and the second configuration. The one or more first session termination points may include the one or more second session termination points and the one or more third session termination points. In one configuration, the apparatus 1902, and in particular the cellular baseband processor 1904, includes means for releasing the one or more PDU sessions, one or more bearers, or one or more local link channels associated with the one or more corresponding bearers. In one configuration, the relocation of the one or more first session termination points may be from the second wireless device to the first wireless device. The apparatus 1902, and in particular the cellular baseband processor 1904, includes means for receiving, from the second wireless device, a message for an SN status transfer. The apparatus 1902, and in particular the cellular baseband processor 1904, includes means for receiving, from the second wireless device, forwarded first data. In one configuration, the relocation of the one or more first session termination points may be from the first wireless device to the second wireless device. The apparatus 1902, and in particular the cellular baseband processor 1904, includes means for transmitting, to the second wireless device, a message for an SN status transfer. The apparatus 1902, and in particular the cellular baseband processor 1904, includes means for forwarding first data to the second wireless device. In one configuration, the apparatus 1902, and in particular the cellular baseband processor 1904, includes means for releasing one or more first PDU sessions, one or more radio access SDAP entities, one or more PDCP entities, or one or more local link channels in response to at least one of a first local link RLF, receiving from the second wireless device an indication of a first radio access link RLF, receiving from the second wireless device an indication of second wireless device mobility, or first wireless device mobility. The one or more first PDU sessions, the one or more SDAP entities, the one or more PDCP entities, or the one or more local link channels may be associated with at least some of the one or more first session termination points that have been relocated from the second wireless device to the first wireless device. In one configuration, the apparatus 1902, and in particular the cellular baseband processor 1904, includes means for resuming one or more second PDU sessions or one or more radio access bearers over a radio access link or a relay link via a third wireless device in response to at least one of a second local link RLF, receiving from the second wireless device an indication of a second radio access link RLF, first wireless mobility, or second wireless mobility. The one or more second PDU sessions or the one or more radio access bearers may be associated with at least some of the one or more first session termination points that have been relocated from the first wireless device to the second wireless device. In one configuration, each of the one or more radio access packet data sessions may correspond to a PDU session associated with a Uu RAT.

The means may be one or more of the components of the apparatus 1902 configured to perform the functions recited by the means.

Figure 20:
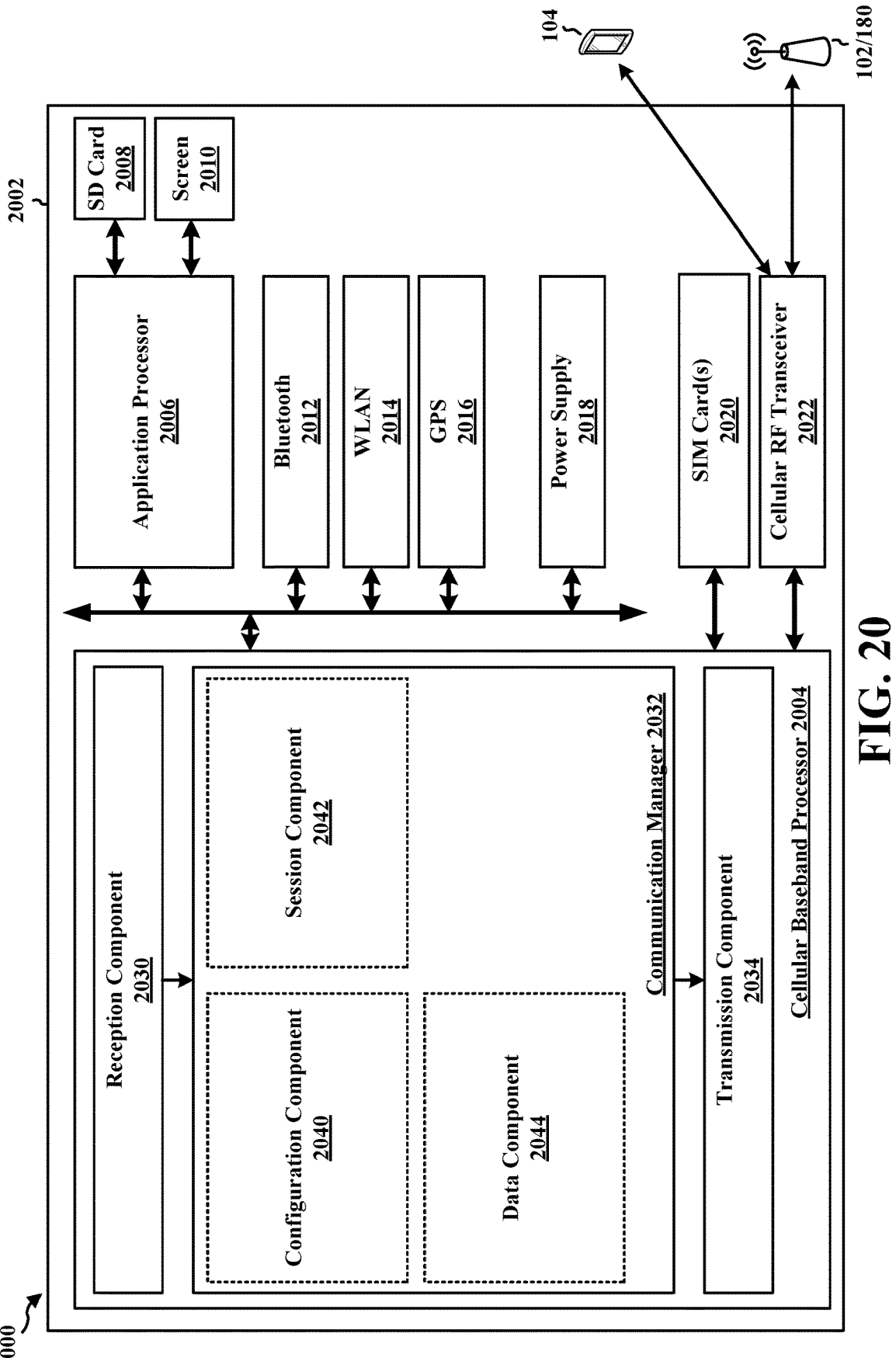
FIG. 20 is a diagram illustrating an example of a hardware implementation for an example apparatus.

FIG. 20 is a diagram 2000 illustrating an example of a hardware implementation for an apparatus 2002. The apparatus 2002 may be a relay UE/a second wireless device, a component of a relay UE/a second wireless device, or may implement relay UE/second wireless device functionality. In some aspects, the apparatus 2002 may include a cellular baseband processor 2004 (also referred to as a modem) coupled to a cellular RF transceiver 2022. In some aspects, the apparatus 2002 may further include one or more subscriber identity modules (SIM) cards 2020, an application processor 2006 coupled to a secure digital (SD) card 2008 and a screen 2010, a Bluetooth module 2012, a wireless local area network (WLAN) module 2014, a Global Positioning System (GPS) module 2016, or a power supply 2018. The cellular baseband processor 2004 communicates through the cellular RF transceiver 2022 with the UE 104 and/or BS 102/180. The cellular baseband processor 2004 may include a computer-readable medium/memory. The computer-readable medium/memory may be non-transitory. The cellular baseband processor 2004 is responsible for general processing, including the execution of software stored on the computer-readable medium/memory. The software, when executed by the cellular baseband processor 2004, causes the cellular baseband processor 2004 to perform the various functions described supra. The computer-readable medium/memory may also be used for storing data that is manipulated by the cellular baseband processor 2004 when executing software. The cellular baseband processor 2004 further includes a reception component 2030, a communication manager 2032, and a transmission component 2034. The communication manager 2032 includes the one or more illustrated components. The components within the communication manager 2032 may be stored in the computer-readable medium/memory and/or configured as hardware within the cellular baseband processor 2004. The cellular baseband processor 2004 may be a component of the device 350 and may include the memory 360 and/or at least one of the TX processor 368, the RX processor 356, and the controller/processor 359. In one configuration, the apparatus 2002 may be a modem chip and include just the baseband processor 2004, and in another configuration, the apparatus 2002 may be the entire UE (e.g., see the device 350 of FIG. 3) and include the additional modules of the apparatus 2002.

The communication manager 2032 includes a configuration component 2040 that may be configured to identify at least one configuration for a relocation of one or more first session termination points associated with one or more radio access packet data sessions from the second wireless device to a first wireless device or from the first wireless device to the second wireless device, e.g., as described in connection with 1702 in FIG. 17. The communication manager 2032 further includes a session component 2042 that may be configured to execute the relocation of the one or more first session termination points associated with the one or more radio access packet data sessions from the second wireless device to the first wireless device or from the first wireless device to the second wireless device based on the at least one configuration for the relocation of the one or more first session termination points, e.g., as described in connection with 1704 in FIG. 17. The communication manager 2032 further includes a data component 2044 that may be configured to forward data between a network and the first wireless device based on at least one first radio access packet data session of the one or more radio access packet data sessions, e.g., as described in connection with 1706 in FIG. 17.

The apparatus may include additional components that perform each of the blocks of the algorithm in the flowcharts of FIGS. 13-15 and 17. As such, each block in the flowcharts of FIGS. 13-15 and 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2002 may include a variety of components configured for various functions. In one configuration, the apparatus 2002, and in particular the cellular baseband processor 2004, includes means for identifying at least one configuration for a relocation of one or more first session termination points associated with one or more radio access packet data sessions from the second wireless device to a first wireless device or from the first wireless device to the second wireless device. The apparatus 2002, and in particular the cellular baseband processor 2004, includes means for executing the relocation of the one or more first session termination points associated with the one or more radio access packet data sessions from the second wireless device to the first wireless device or from the first wireless device to the second wireless device based on the at least one configuration for the relocation of the one or more first session termination points. The apparatus 2002, and in particular the cellular baseband processor 2004, includes means for forwarding data between a network and the first wireless device based on at least one first radio access packet data session of the one or more radio access packet data sessions. At least one first session termination point of the one or more first session termination points associated with the at least one first radio access packet data session may have been relocated.

In one configuration, the apparatus 2002, and in particular the cellular baseband processor 2004, includes means for receiving, from the first wireless device, an indication of whether the first wireless device supports the relocation of the one or more first session termination points. In one configuration, the relocation of the one or more first session termination points may be from the second wireless device to the first wireless device. The means for identifying the at least one configuration for the relocation of the one or more first session termination points may be further configured to: generate, at the second wireless device, a first configuration for relocating one or more second session termination points associated with one or more PDU sessions from the second wireless device to the first wireless device and a second configuration for relocating one or more third session termination points associated with one or more corresponding bearers from the second wireless device to the first wireless device. The second configuration may include at least one of an SDAP configuration, a PDCP configuration, radio access security key material, a local link configuration including a local link QoS configuration. At least one of the first configuration or the second configuration may be associated with the second wireless device prior to the one or more first session termination points being relocated. The at least one configuration may include the first configuration and the second configuration. The one or more first session termination points may include the one or more second session termination points and the one or more third session termination points. In one configuration, the apparatus 2002, and in particular the cellular baseband processor 2004, includes means for transmitting, to the first wireless device, a first indication of the first configuration and a second indication of the second configuration. The apparatus 2002, and in particular the cellular baseband processor 2004, includes means for suspending or releasing the one or more PDU sessions or one or more radio access SDAP or PDCP entities associated with the one or more corresponding bearers. In one configuration, the relocation of the one or more first session termination points may be from the first wireless device to the second wireless device. The means for identifying the at least one configuration for the relocation of the one or more first session termination points may be further configured to: receive, from the first wireless device, a first indication of a first configuration for relocating one or more second session termination points associated with one or more PDU sessions from the first wireless device to the second wireless device and a second indication of a second configuration for relocating one or more third session termination points associated with one or more corresponding bearers from the first wireless device to the second wireless device. The second configuration may include at least one of an SDAP configuration, a PDCP configuration, radio access security key material, at least one of the first configuration or the second configuration is associated with the first wireless device prior to the one or more first session termination points being relocated. The at least one configuration may include the first configuration and the second configuration. The one or more first session termination points may include the one or more second session termination points and the one or more third session termination points. In one configuration, the apparatus 2002, and in particular the cellular baseband processor 2004, includes means for transmitting, to a network entity, an indication of a preference associated with the relocation of the one or more first session termination points. In one configuration, the relocation of the one or more first session termination points may be from the second wireless device to the first wireless device. The means for identifying the at least one configuration for the relocation of the one or more first session termination points may be further configured to: receive, from a network entity, a fifth indication of an RLC configuration, a radio access MAC configuration, or a second adaptation layer configuration; and receive, from the network entity, a first indication of a first configuration for relocating one or more second session termination points associated with one or more PDU sessions from the second wireless device to the first wireless device and a second indication of a second configuration for relocating one or more third session termination points associated with one or more corresponding bearers from the second wireless device to the first wireless device. The second configuration may include at least one of an SDAP configuration, a PDCP configuration, radio access security key material, or a first adaptation layer configuration. The at least one configuration may include the RLC configuration, the radio access MAC configuration, the second adaptation layer configuration, the first configuration, or the second configuration. The one or more first session termination points may include the one or more second session termination points and the one or more third session termination points. In one configuration, the apparatus 2002, and in particular the cellular baseband processor 2004, includes means for transmitting, to the first wireless device, a third indication of the first configuration for relocating the one or more second session termination points associated with the one or more PDU sessions from the second wireless device to the first wireless device and a fourth indication of the second configuration for relocating the one or more third session termination points associated with the one or more corresponding bearers from the second wireless device to the first wireless device. The apparatus 2002, and in particular the cellular baseband processor 2004, includes means for releasing the one or more PDU sessions or one or more SDAP or PDCP entities associated with the one or more corresponding bearers. In one configuration, the relocation of the one or more first session termination points may be from the first wireless device to the second wireless device. The means for identifying the at least one configuration for the relocation of the one or more first session termination points may be further configured to: receive, from a network entity, a first indication of a first configuration for relocating one or more second session termination points associated with one or more PDU sessions from the first wireless device to the second wireless device and a second indication of a second configuration for relocating one or more third termination points associated with one or more corresponding bearers from the first wireless device to the second wireless device. The second configuration may include at least one of an SDAP configuration, a PDCP configuration, or radio access security key material. The at least one configuration may include the first configuration and the second configuration. The one or more first session termination points may include the one or more second session termination points and the one or more third session termination points. In one configuration, the relocation of the one or more first session termination points may be from the second wireless device to the first wireless device. The apparatus 2002, and in particular the cellular baseband processor 2004, includes means for transmitting, to the first wireless device, a message for an SN status transfer. The apparatus 2002, and in particular the cellular baseband processor 2004, includes means for forwarding first data to the first wireless device. In one configuration, the relocation of the one or more first session termination points may be from the first wireless device to the second wireless device. The apparatus 2002, and in particular the cellular baseband processor 2004, includes means for receiving, from the first wireless device, a message for an SN status transfer. The apparatus 2002, and in particular the cellular baseband processor 2004, includes means for receiving, from the first wireless device, forwarded first data. In one configuration, the apparatus 2002, and in particular the cellular baseband processor 2004, includes means for releasing one or more first PDU sessions or one or more first radio access bearers in response to a first radio access link RLF. The one or more first PDU sessions or the one or more first radio access bearers may be associated with at least some of the one or more first session termination points that have been relocated from the first wireless device to the second wireless device. In one configuration, the apparatus 2002, and in particular the cellular baseband processor 2004, includes means for resuming one or more second PDU sessions or one or more second radio access bearers in response to a second radio access link RLF. The one or more second PDU sessions or the one or more second radio access bearers may be associated with at least some of the one or more first session termination points that have been relocated from the second wireless device to the first wireless device. In one configuration, the apparatus 2002, and in particular the cellular baseband processor 2004, includes means for indicating to the first wireless device to release one or more third PDU sessions or one or more third radio access bearers in response to second wireless device mobility. The one or more third PDU sessions or the one or more third radio access bearers may be associated with at least some of the one or more first session termination points that have been relocated from the second wireless device to the first wireless device. In one configuration, the apparatus 2002, and in particular the cellular baseband processor 2004, includes means for receiving, from the first wireless device, an indication to release one or more fourth PDU sessions or one or more fourth radio access bearers in response to first wireless device mobility. The one or more fourth PDU sessions or the one or more fourth radio access bearers may be associated with at least some of the one or more first session termination points that have been relocated from the first wireless device to the second wireless device. In one configuration, each of the one or more radio access packet data sessions may correspond to a PDU session associated with a Uu RAT.

The means may be one or more of the components of the apparatus 2002 configured to perform the functions recited by the means. As described supra, the apparatus 2002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 21:
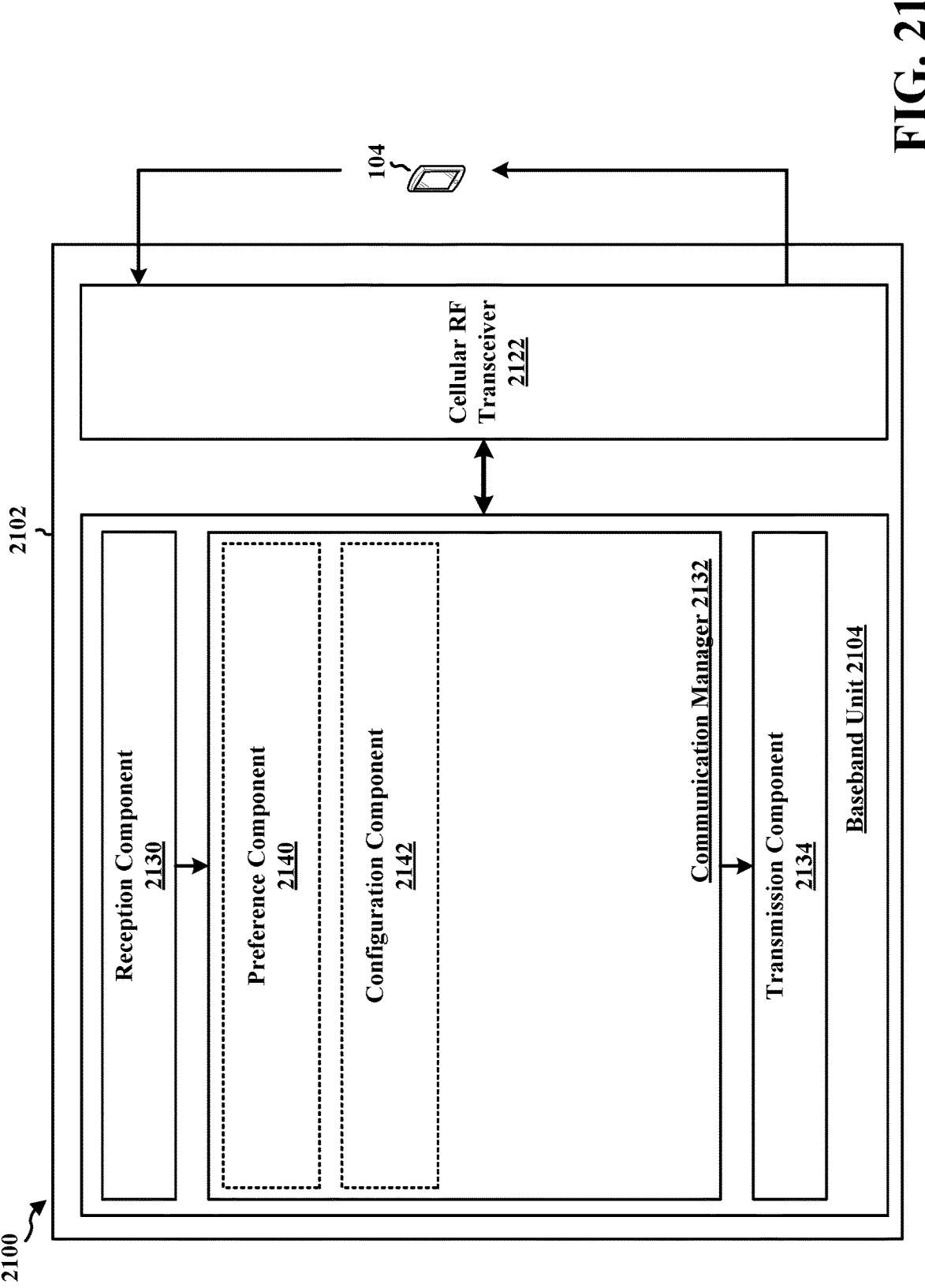
FIG. 21 is a diagram illustrating an example of a hardware implementation for an example apparatus.

FIG. 21 is a diagram 2100 illustrating an example of a hardware implementation for an apparatus 2102. The apparatus 2102 may be a network entity in the RAN (e.g., a base station), a component of a network entity, or may implement network entity functionality. In some aspects, the apparatus 2102 may include a baseband unit 2104. The baseband unit 2104 may communicate through a cellular RF transceiver 2122 with the UE 104. The baseband unit 2104 may include a computer-readable medium/memory. The baseband unit 2104 is responsible for general processing, including the execution of software stored on the computer-readable medium/memory. The software, when executed by the baseband unit 2104, causes the baseband unit 2104 to perform the various functions described supra. The computer-readable medium/memory may also be used for storing data that is manipulated by the baseband unit 2104 when executing software. The baseband unit 2104 further includes a reception component 2130, a communication manager 2132, and a transmission component 2134. The communication manager 2132 includes the one or more illustrated components. The components within the communication manager 2132 may be stored in the computer-readable medium/memory and/or configured as hardware within the baseband unit 2104. The baseband unit 2104 may be a component of the device 310 and may include the memory 376 and/or at least one of the TX processor 316, the RX processor 370, and the controller/processor 375.

The communication manager 2132 includes a preference component 2140 that may be configured to receive, from at least one of a first wireless device or a second wireless device, one or more indications of UE preferences associated with offloading one or more radio access packet data sessions, e.g., as described in connection with 1802 in FIG. 18. The communication manager 2132 further includes a configuration component 2142 that may be configured to transmit a configuration for offloading of the one or more radio access packet data sessions from the second wireless device to the first wireless device or from the first wireless device to the second wireless device, e.g., as described in connection with 1804 in FIG. 18.

The apparatus may include additional components that perform each of the blocks of the algorithm in the flowcharts of FIGS. 13-15 and 18. As such, each block in the flowcharts of FIGS. 13-15 and 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2102 may include a variety of components configured for various functions. In one configuration, the apparatus 2102, and in particular the baseband unit 2104, includes means for receiving, from at least one of a first wireless device or a second wireless device, one or more indications of UE preferences associated with a relocation of one or more first session termination points associated with one or more radio access packet data sessions. The apparatus 2102, and in particular the cellular baseband processor 2104, includes means for transmitting at least one indication of at least one configuration for the relocation of the one or more first session termination points associated with the one or more radio access packet data sessions from the second wireless device to the first wireless device or from the first wireless device to the second wireless device.

In one configuration, the relocation of the one or more first session termination points may be from the second wireless device to the first wireless device. The means for transmitting the at least one indication of the at least one configuration may be further configured to: transmit, to the second wireless device, a fifth indication of an RLC configuration, a radio access MAC configuration, or a second adaptation layer configuration; and transmit, to the second wireless device via an RRC message, a first indication of a first configuration for relocating one or more second session termination points associated with one or more PDU sessions from the second wireless device to the first wireless device and a second indication of a second configuration for relocating one or more third session termination points associated with one or more corresponding bearers from the second wireless device to the first wireless device, the second configuration may include at least one of an SDAP configuration, a PDCP configuration, radio access security key material, or a first adaptation layer configuration. The at least one configuration may include the RLC configuration, the radio access MAC configuration, the second adaptation layer configuration, the first configuration, or the second configuration. The one or more first session termination points may include the one or more second session termination points and the one or more third session termination points. In one configuration, the relocation of the one or more first session termination points may be from the first wireless device to the second wireless device. The means for transmitting the at least one indication of the at least one configuration may be configured to: transmit, to the second wireless device via a first RRC message, a first indication of a first configuration for relocating one or more second session termination points associated with one or more PDU sessions from the first wireless device to the second wireless device and a second indication of a second configuration for relocating one or more third session termination points associated with one or more corresponding bearers from the first wireless device to the second wireless device. The second configuration may include at least one of an SDAP configuration, a PDCP configuration, or radio access security key material. The at least one configuration may include the first configuration and the second configuration. The one or more first session termination points may include the one or more second session termination points and the one or more third session termination points. The means for transmitting the at least one indication of the at least one configuration may be configured to: transmit, to the first wireless device via a second RRC message, a third indication of the first configuration for relocating the one or more second session termination points associated with the one or more PDU sessions from the first wireless device to the second wireless device and a fourth indication of the second configuration for relocating the one or more third session termination points associated with the one or more corresponding bearers from the first wireless device to the second wireless device. The first configuration or the second configuration may include one or more identifiers of the one or more PDU sessions and the one or more corresponding bearers. In one configuration, the apparatus 2102, and in particular the cellular baseband processor 2104, includes means for maintaining a first wireless device context associated with the relocation of the one or more first session termination points associated with the one or more radio access packet data sessions based on a first identifier of the first wireless device in association with a second identifier of the second wireless device. In one configuration, each of the one or more radio access packet data sessions may correspond to a PDU session associated with a Uu RAT.

The means may be one or more of the components of the apparatus 2102 configured to perform the functions recited by the means. As described supra, the apparatus 2102 may include the TX Processor 316, the RX Processor 370, and the controller/processor 375. As such, in one configuration, the means may be the TX Processor 316, the RX Processor

370, and the controller/processor 375 configured to perform the functions recited by the means.

Referring back to FIGS. 12A-21, a remote UE or a relay UE may identify a configuration for a relocation of one or more session termination points associated with one or more radio access packet data sessions from the relay UE to the remote UE or from the remote UE to the relay UE. The relocation of the one or more session termination points may be controlled by the remote UE, the relay UE, or a network entity. If the network entity controls the session termination point relocation, the network entity may provide the configuration for the relocation of the one or more session termination points from the relay UE to the remote UE or from the remote UE to the relay UE. The remote UE may transmit or receive data with a network via the relay UE based on the relocation of the one or more session termination points. The relay UE may forward data between a network and the remote UE based on the relocation of the one or more session termination points. Accordingly, data processing may be handed over to a more capable device. E2E security and E2E QoS between the network and the user plane endpoints may be realized.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first wireless device including at least one processor coupled to a memory and configured to identify at least one configuration for a relocation of one or more first session termination points associated with one or more radio access packet data sessions from a second wireless device to the first wireless device or from the first wireless device to the second wireless device; execute the relocation of the one or more first session termination points associated with the one or more radio access packet data sessions from the second wireless device to the first wireless device or from the first wireless device to the second wireless device based on the at least one configuration for the relocation of the one or more first session termination points; and transmit or receive data with a network via the second wireless device based on the relocation of the one or more first session termination points.

Aspect 2 is the apparatus of aspect 1, the memory and the at least one processor being further configured to: transmit, to the second wireless device, an indication of whether the first wireless device supports the relocation of the one or more first session termination points.

Aspect 3 is the apparatus of any of aspects 1 and 2, where the relocation of the one or more first session termination points is from the second wireless device to the first wireless device, and to identify the at least one configuration for the relocation of the one or more first session termination points, the memory and the at least one processor are further configured to: receive, from the second wireless device, a first indication of a first configuration for relocating one or more second session termination points associated with one or more PDU sessions from the second wireless device to the first wireless device and a second indication of a second configuration for relocating one or more third session termination points associated with one or more corresponding bearers from the second wireless device to the first wireless device, where the second configuration includes at least one of an SDAP configuration, a PDCP configuration, radio access security key material, a local link configuration including a local link QoS configuration, at least one of the first configuration or the second configuration is associated with the second wireless device prior to the one or more first session termination points being relocated, the at least one configuration includes the first configuration and the second configuration, and the one or more first session termination points include the one or more second session termination points and the one or more third session termination points.

Aspect 4 is the apparatus of any of aspects 1 and 2, where the relocation of the one or more first session termination points is from the first wireless device to the second wireless device, and to identify the at least one configuration for the relocation of the one or more first session termination points, the memory and the at least one processor are further configured to: generate, at the first wireless device, a first configuration for relocating one or more second session termination points associated with one or more PDU sessions from the first wireless device to the second wireless device and a second configuration for relocating one or more third session termination points associated with one or more corresponding bearers from the first wireless device to the second wireless device, where the second configuration includes at least one of an SDAP configuration, a PDCP configuration, radio access security key material, at least one of the first configuration or the second configuration is associated with the first wireless device prior to the one or more first session termination points being relocated, the at least one configuration includes the first configuration and the second configuration, and the one or more first session termination points include the one or more second session termination points and the one or more third session termination points.

Aspect 5 is the apparatus of aspect 4, the memory and the at least one processor being further configured to: transmit, to the second wireless device, a first indication of the first configuration and a second indication of the second configuration; and suspend or release the one or more PDU sessions, one or more radio access SDAP or PDCP entities, or one or more local link channels associated with the one or more corresponding bearers.

Aspect 6 is the apparatus of aspect 1, the memory and the at least one processor being further configured to: transmit, to a network entity, an indication of a preference associated with the relocation of the one or more first session termination points.

Aspect 7 is the apparatus of any of aspects 1 and 6, where the relocation of the one or more first session termination points is from the second wireless device to the first wireless device, and to identify the at least one configuration for the relocation of the one or more first session termination points, the memory and the at least one processor are further configured to: receive, from the second wireless device, a first indication of a first configuration for relocating one or more second session termination points associated with one or more PDU sessions from the second wireless device to the first wireless device and a second indication of a second configuration for relocating one or more third session termination points associated with one or more corresponding bearers from the second wireless device to the first wireless device, where the first configuration and the second configuration are from a network entity, the second configuration includes at least one of an SDAP configuration, a PDCP configuration, or radio access security key material, the at least one configuration includes the first configuration and the second configuration, and the one or more first session termination points include the one or more second session termination points and the one or more third session termination points.

Aspect 8 is the apparatus of aspect 7, where the radio access security key material is associated with the second wireless device prior to the one or more first session termination points being relocated.

Aspect 9 is the apparatus of aspect 7, where the radio access security key material is derived from original security key material associated with the second wireless device prior to the one or more first session termination points being relocated.

Aspect 10 is the apparatus of any of aspects 1 and 6, where the relocation of the one or more first session termination points is from the first wireless device to the second wireless device, and to identify the at least one configuration for the relocation of the one or more first session termination points, the memory and the at least one processor are further configured to: receive, from a network entity, a third indication of a first configuration for relocating one or more second session termination points associated with one or more PDU sessions from the first wireless device to the second wireless device and a fourth indication of a second configuration for relocating one or more third session termination points associated with one or more corresponding bearers from the first wireless device to the second wireless device, where the at least one configuration includes the first configuration and the second configuration, and the one or more first session termination points include the one or more second session termination points and the one or more third session termination points.

Aspect 11 is the apparatus of aspect 10, the memory and the at least one processor being further configured to: release the one or more PDU sessions, one or more bearers, or one or more local link channels associated with the one or more corresponding bearers.

Aspect 12 is the apparatus of any of aspects 1 to 3 and 6 to 9, where the relocation of the one or more first session termination points is from the second wireless device to the first wireless device, and the memory and the at least one processor are further configured to: receive, from the second wireless device, a message for an SN status transfer; and receive, from the second wireless device, forwarded first data.

Aspect 13 is the apparatus of any of aspects 1, 2, 4 to 6, 10, and 11, where the relocation of the one or more first session termination points is from the first wireless device to the second wireless device, and the memory and the at least one processor are further configured to: transmit, to the second wireless device, a message for an SN status transfer; and forward first data to the second wireless device.

Aspect 14 is the apparatus of any of aspects 1 to 13, the memory and the at least one processor being further configured to: release one or more first PDU sessions, one or more radio access SDAP entities, one or more PDCP entities, or one or more local link channels in response to at least one of a first local link RLF, receiving from the second wireless device an indication of a first radio access link RLF, receiving from the second wireless device an indication of second wireless device mobility, or first wireless device mobility, the one or more first PDU sessions, the one or more SDAP entities, the one or more PDCP entities, or the one or more local link channels being associated with at least some of the one or more first session termination points that have been relocated from the second wireless device to the first wireless device.

Aspect 15 is the apparatus of any of aspects 1 to 13, the memory and the at least one processor being further configured to: resume one or more second PDU sessions or one or more radio access bearers over a radio access link or a relay link via a third wireless device in response to at least one of a second local link RLF, receiving from the second wireless device an indication of a second radio access link RLF, first wireless mobility, or second wireless mobility, the one or more second PDU sessions or the one or more radio access bearers being associated with at least some of the one or more first session termination points that have been relocated from the first wireless device to the second wireless device.

Aspect 16 is the apparatus of any of aspects 1 to 15, where each of the one or more radio access packet data sessions corresponds to a PDU session associated with a Uu RAT.

Aspect 17 is the apparatus of any of aspects 1 to 16, further including at least one antenna coupled to the memory and the at least one processor.

Aspect 18 is an apparatus for wireless communication at a second wireless device including at least one processor coupled to a memory and configured to identify at least one configuration for a relocation of one or more first session termination points associated with one or more radio access packet data sessions from the second wireless device to a first wireless device or from the first wireless device to the second wireless device; execute the relocation of the one or more first session termination points associated with the one or more radio access packet data sessions from the second wireless device to the first wireless device or from the first wireless device to the second wireless device based on the at least one configuration for the relocation of the one or more first session termination points; and forward data between a network and the first wireless device based on at least one first radio access packet data session of the one or more radio access packet data sessions, at least one first session termination point of the one or more first session termination points associated with the at least one first radio access packet data session having been relocated.

Aspect 19 is the apparatus of aspect 18, the memory and the at least one processor being further configured to: receive, from the first wireless device, an indication of whether the first wireless device supports the relocation of the one or more first session termination points.

Aspect 20 is the apparatus of any of aspects 18 and 19, where the relocation of the one or more first session termination points is from the second wireless device to the first wireless device, and to identify the at least one configuration for the relocation of the one or more first session termination points, the memory and the at least one processor are further configured to: generate, at the second wireless device, a first configuration for relocating one or more second session termination points associated with one or more PDU sessions from the second wireless device to the first wireless device and a second configuration for relocating one or more third session termination points associated with one or more corresponding bearers from the second wireless device to the first wireless device, where the second configuration includes at least one of an SDAP configuration, a PDCP configuration, radio access security key material, a local link configuration including a local link QoS configuration, at least one of the first configuration or the second configuration is associated with the second wireless device prior to the one or more first session termination points being relocated, the at least one configuration includes the first configuration and the second configuration, and the one or more first session termination points include the one or more second session termination points and the one or more third session termination points.

Aspect 21 is the apparatus of aspect 20, the memory and the at least one processor being further configured to: transmit, to the first wireless device, a first indication of the first configuration and a second indication of the second configuration; and suspend or release the one or more PDU sessions or one or more radio access SDAP or PDCP entities associated with the one or more corresponding bearers.

Aspect 22 is the apparatus of any of aspects 18 and 19, where the relocation of the one or more first session termination points is from the first wireless device to the second wireless device, and to identify the at least one configuration for the relocation of the one or more first session termination points, the memory and the at least one processor are further configured to: receive, from the first wireless device, a first indication of a first configuration for relocating one or more second session termination points associated with one or more PDU sessions from the first wireless device to the second wireless device and a second indication of a second configuration for relocating one or more third session termination points associated with one or more corresponding bearers from the first wireless device to the second wireless device, where the second configuration includes at least one of an SDAP configuration, a PDCP configuration, radio access security key material, at least one of the first configuration or the second configuration is associated with the first wireless device prior to the one or more first session termination points being relocated, the at least one configuration includes the first configuration and the second configuration, and the one or more first session termination points include the one or more second session termination points and the one or more third session termination points.

Aspect 23 is the apparatus of aspect 18, the memory and the at least one processor being further configured to: transmit, to a network entity, an indication of a preference associated with the relocation of the one or more first session termination points.

Aspect 24 is the apparatus of any of aspects 18 and 23, where the relocation of the one or more first session termination points is from the second wireless device to the first wireless device, and to identify the at least one configuration for the relocation of the one or more first session termination points, the memory and the at least one processor are further configured to: receive, from a network entity, a fifth indication of an RLC configuration, a radio access MAC configuration, or a second adaptation layer configuration; and receive, from the network entity, a first indication of a first configuration for relocating one or more second session termination points associated with one or more PDU sessions from the second wireless device to the first wireless device and a second indication of a second configuration for relocating one or more third session termination points associated with one or more corresponding bearers from the second wireless device to the first wireless device, where the second configuration includes at least one of an SDAP configuration, a PDCP configuration, radio access security key material, or a first adaptation layer configuration, the at least one configuration includes the RLC configuration, the radio access MAC configuration, the second adaptation layer configuration, the first configuration, or the second configuration, and the one or more first session termination points include the one or more second session termination points and the one or more third session termination points.

Aspect 25 is the apparatus of aspect 24, the memory and the at least one processor are further configured to: transmit, to the first wireless device, a third indication of the first configuration for relocating the one or more second session termination points associated with the one or more PDU sessions from the second wireless device to the first wireless device and a fourth indication of the second configuration for relocating the one or more third session termination points associated with the one or more corresponding bearers from the second wireless device to the first wireless device; and release the one or more PDU sessions or one or more SDAP or PDCP entities associated with the one or more corresponding bearers.

Aspect 26 is the apparatus of any of aspects 18 and 23, where the relocation of the one or more first session termination points is from the first wireless device to the second wireless device, and to identify the at least one configuration for the relocation of the one or more first session termination points, the memory and the at least one processor are further configured to: receive, from a network entity, a first indication of a first configuration for relocating one or more second session termination points associated with one or more PDU sessions from the first wireless device to the second wireless device and a second indication of a second configuration for relocating one or more third termination points associated with one or more corresponding bearers from the first wireless device to the second wireless device, where the second configuration includes at least one of an SDAP configuration, a PDCP configuration, or radio access security key material, the at least one configuration includes the first configuration and the second configuration, and the one or more first session termination points include the one or more second session termination points and the one or more third session termination points.

Aspect 27 is the apparatus of any aspects 18 to 21 and 23 to 25, where the relocation of the one or more first session termination points is from the second wireless device to the first wireless device, and the memory and the at least one processor are further configured to: transmit, to the first wireless device, a message for an SN status transfer; and forward first data to the first wireless device.

Aspect 28 is the apparatus of any of aspects 18, 19, 22, 23, and 26, where the relocation of the one or more first session termination points is from the first wireless device to the second wireless device, and the memory and the at least one processor are further configured to: receive, from the first wireless device, a message for an SN status transfer; and receive, from the first wireless device, forwarded first data.

Aspect 29 is the apparatus of any of aspects 18 to 28, the memory and the at least one processor being further configured to: release one or more first PDU sessions or one or more first radio access bearers in response to a first radio access link RLF, the one or more first PDU sessions or the one or more first radio access bearers being associated with at least some of the one or more first session termination points that have been relocated from the first wireless device to the second wireless device.

Aspect 30 is the apparatus of any of aspects 18 to 28, the memory and the at least one processor being further configured to: resume one or more second PDU sessions or one or more second radio access bearers in response to a second radio access link RLF, the one or more second PDU sessions or the one or more second radio access bearers being associated with at least some of the one or more first session termination points that have been relocated from the second wireless device to the first wireless device.

Aspect 31 is the apparatus of any of aspects 18 to 28, the memory and the at least one processor being further configured to: indicate to the first wireless device to release one or more third PDU sessions or one or more third radio access bearers in response to second wireless device mobility, the one or more third PDU sessions or the one or more third radio access bearers being associated with at least some of the one or more first session termination points that have been relocated from the second wireless device to the first wireless device.

Aspect 32 is the apparatus of any of aspects 18 to 28, the memory and the at least one processor being further configured to: receive, from the first wireless device, an indication to release one or more fourth PDU sessions or one or more fourth radio access bearers in response to first wireless device mobility, the one or more fourth PDU sessions or the one or more fourth radio access bearers being associated with at least some of the one or more first session termination points that have been relocated from the first wireless device to the second wireless device.

Aspect 33 is the apparatus of any of aspects 18 to 32, where each of the one or more radio access packet data sessions corresponds to a PDU session associated with a Uu RAT.

Aspect 34 is the apparatus of any of aspects 18 to 33, further including at least one antenna coupled to the memory and the at least one processor.

Aspect 35 is an apparatus for wireless communication at a network entity including at least one processor coupled to a memory and configured to receive, from at least one of a first wireless device or a second wireless device, one or more indications of UE preferences associated with a relocation of one or more first session termination points associated with one or more radio access packet data sessions; and transmit at least one indication of at least one configuration for the relocation of the one or more first session termination points associated with the one or more radio access packet data sessions from the second wireless device to the first wireless device or from the first wireless device to the second wireless device.

Aspect 36 is the apparatus of aspect 35, where the relocation of the one or more first session termination points is from the second wireless device to the first wireless device, and to transmit the at least one indication of the at least one configuration, the memory and the at least one processor are further configured to: transmit, to the second wireless device, a fifth indication of an RLC configuration, a radio access MAC configuration, or a second adaptation layer configuration; and transmit, to the second wireless device via an RRC message, a first indication of a first configuration for relocating one or more second session termination points associated with one or more PDU sessions from the second wireless device to the first wireless device and a second indication of a second configuration for relocating one or more third session termination points associated with one or more corresponding bearers from the second wireless device to the first wireless device, where the second configuration includes at least one of an SDAP configuration, a PDCP configuration, radio access security key material, or a first adaptation layer configuration, the at least one configuration includes the RLC configuration, the radio access MAC configuration, the second adaptation layer configuration, the first configuration, or the second configuration, and the one or more first session termination points include the one or more second session termination points and the one or more third session termination points.

Aspect 37 is the apparatus of aspect 35, where the relocation of the one or more first session termination points is from the first wireless device to the second wireless device, and to transmit the at least one indication of the at least one configuration, the memory and the at least one processor are further configured to: transmit, to the second wireless device via a first RRC message, a first indication of a first configuration for relocating one or more second session termination points associated with one or more PDU sessions from the first wireless device to the second wireless device and a second indication of a second configuration for relocating one or more third session termination points associated with one or more corresponding bearers from the first wireless device to the second wireless device, where the second configuration includes at least one of an SDAP configuration, a PDCP configuration, or radio access security key material, the at least one configuration includes the first configuration and the second configuration, and the one or more first session termination points include the one or more second session termination points and the one or more third session termination points; and transmit, to the first wireless device via a second RRC message, a third indication of the first configuration for relocating the one or more second session termination points associated with the one or more PDU sessions from the first wireless device to the second wireless device and a fourth indication of the second configuration for relocating the one or more third session termination points associated with the one or more corresponding bearers from the first wireless device to the second wireless device, where the first configuration or the second configuration includes one or more identifiers of the one or more PDU sessions and the one or more corresponding bearers.

Aspect 38 is the apparatus of any of aspects 35 to 37, the memory and the at least one processor being further configured to: maintain a first wireless device context associated with the relocation of the one or more first session termination points associated with the one or more radio access packet data sessions based on a first identifier of the first wireless device in association with a second identifier of the second wireless device.

Aspect 39 is the apparatus of any of aspects 35 to 38, where each of the one or more radio access packet data sessions corresponds to a PDU session associated with a Uu RAT.

Aspect 40 is the apparatus of any of aspects 35 to 39, further including at least one antenna coupled to the memory and the at least one processor.

Aspect 41 is a method of wireless communication for implementing any of aspects 1 to 40.

Aspect 42 is an apparatus for wireless communication including means for implementing any of aspects 1 to 40.

Aspect 43 is a non-transitory computer-readable storage medium storing computer executable code, where the code when executed by a processor causes the processor to implement any of aspects 1 to 40.

What is claimed is:

1. An apparatus for wireless communication at a first wireless device, comprising:
   memory; and
   one or more processors coupled to the memory and configured to cause the first wireless device to:
   identify at least one configuration for a relocation of one or more first session termination points associated with one or more radio access packet data sessions from a second wireless device to the first wireless device or from the first wireless device to the second wireless device;
   execute the relocation of the one or more first session termination points associated with the one or more radio access packet data sessions from the second wireless device to the first wireless device or from the first wireless device to the second wireless device based on the at least one configuration for the relocation of the one or more first session termination points;
   communicate, with the second wireless device, a message for a sequence number (SN) status transfer that comprises a hyper frame number (HFN) associated with a missing service data unit (SDU); and
   transmit or receive data with a network, based on a radio access security key material and the SN status transfer, wherein the radio access security key material is based on an original security key material associated with the second wireless device prior to execution of the relocation of the one or more first session termination points, via the second wireless device based on the relocation of the one or more first session termination points, wherein the radio access security key material is different from the original security key material, and wherein the original security key material is associated with a UE to base station connection.

2. The apparatus of claim 1, further comprising at least one antenna coupled to the memory and the one or more processors, wherein the one or more processors are further configured to cause the first wireless device to:
   transmit, to the second wireless device, an indication of whether the first wireless device supports the relocation of the one or more first session termination points.

3. The apparatus of claim 1, wherein the relocation of the one or more first session termination points is from the second wireless device to the first wireless device, and to identify the at least one configuration for the relocation of the one or more first session termination points, the one or more processors are further configured to cause the first wireless device to:
   receive, from the second wireless device, a first indication of a first configuration for relocation of one or more second session termination points associated with one or more protocol data unit (PDU) sessions from the second wireless device to the first wireless device and a second indication of a second configuration for relocation of one or more third session termination points associated with one or more corresponding bearers from the second wireless device to the first wireless device, wherein the second configuration comprises at least one of a service data adaptation protocol (SDAP) configuration, a packet data convergence protocol (PDCP) configuration, the radio access security key material, or a local link configuration that includes a local link quality of service (Qos) configuration, wherein at least one of the first configuration or the second configuration is associated with the second wireless device prior to the execution of the relocation of the one or more first session termination points, the at least one configuration includes the first configuration and the second configuration, and the one or more first session termination points include the one or more second session termination points and the one or more third session termination points.

4. The apparatus of claim 1, wherein the relocation of the one or more first session termination points is from the first wireless device to the second wireless device, and to identify the at least one configuration for the relocation of the one or more first session termination points, the one or more processors are further configured to cause the first wireless device to:
   generate, at the first wireless device, a first configuration for relocation of one or more second session termination points associated with one or more protocol data unit (PDU) sessions from the first wireless device to the second wireless device and a second configuration for relocation of one or more third session termination points associated with one or more corresponding bearers from the first wireless device to the second wireless device, wherein the second configuration comprises at least one of a service data adaptation protocol (SDAP) configuration, a packet data convergence protocol (PDCP) configuration, or the radio access security key material, wherein at least one of the first configuration or the second configuration is associated with the first wireless device prior to the execution of the relocation of the one or more first session termination points, the at least one configuration includes the first configuration and the second configuration, and the one or more first session termination points include the one or more second session termination points and the one or more third session termination points.

5. The apparatus of claim 4, wherein the one or more processors are further configured to cause the first wireless device to:

transmit, to the second wireless device, a first indication of the first configuration and a second indication of the second configuration; and suspend or release the one or more PDU sessions, one or more radio access SDAP or PDCP entities, or one or more local link channels associated with the one or more corresponding bearers.

6. The apparatus of claim 1, wherein the one or more processors are further configured to cause the first wireless device to:

transmit, to a network entity, an indication of a preference associated with the relocation of the one or more first session termination points.

7. The apparatus of claim 1, wherein the relocation of the one or more first session termination points is from the second wireless device to the first wireless device, and to identify the at least one configuration for the relocation of the one or more first session termination points, the one or more processors are further configured to cause the first wireless device to:

receive, from the second wireless device, a first indication of a first configuration for relocation of one or more second session termination points associated with one or more protocol data unit (PDU) sessions from the second wireless device to the first wireless device and a second indication of a second configuration for relocation of one or more third session termination points associated with one or more corresponding bearers from the second wireless device to the first wireless device, wherein the first configuration and the second configuration are from a network entity, wherein the second configuration comprises at least one of a service data adaptation protocol (SDAP) configuration, a packet data convergence protocol (PDCP) configuration, or the radio access security key material, and wherein the at least one configuration includes the first configuration and the second configuration, and the one or more first session termination points include the one or more second session termination points and the one or more third session termination points.

8. The apparatus of claim 7, wherein the radio access security key material is associated with the second wireless device prior to the execution of the relocation of the one or more first session termination points.

9. The apparatus of claim 7, wherein the radio access security key material is based on the original security key material associated with the second wireless device prior to the execution of the relocation of the one or more first session termination points, and wherein a relationship between the radio access security key material and the original security key material is based on a multi-RAT dual connectivity (MR-DC) key derivation.

10. The apparatus of claim 1, wherein the relocation of the one or more first session termination points is from the first wireless device to the second wireless device, and to identify the at least one configuration for the relocation of the one or more first session termination points, the one or more processors are further configured to cause the first wireless device to:

receive, from a network entity, a third indication of a first configuration for relocation of one or more second session termination points associated with one or more protocol data unit (PDU) sessions from the first wireless device to the second wireless device and a fourth indication of a second configuration for relocation of one or more third session termination points associated with one or more corresponding bearers from the first wireless device to the second wireless device, wherein the at least one configuration includes the first configuration and the second configuration, and the one or more first session termination points include the one or more second session termination points and the one or more third session termination points.

11. The apparatus of claim 10, wherein the one or more processors are further configured to cause the first wireless device to:

release the one or more PDU sessions, one or more bearers, or one or more local link channels associated with the one or more corresponding bearers.

12. The apparatus of claim 1, wherein the relocation of the one or more first session termination points is from the second wireless device to the first wireless device, and wherein to communicate the message for the SN status transfer, the one or more processors are configured to cause the first wireless device to:

receive, from the second wireless device, the message for the SN status transfer; and receive, from the second wireless device, forwarded first data.

13. The apparatus of claim 1, wherein the relocation of the one or more first session termination points is from the first wireless device to the second wireless device, and wherein to communicate the message for the SN status transfer, the one or more processors are configured to cause the first wireless device to:

transmit, to the second wireless device, the message for the SN status transfer; and forward first data to the second wireless device.

14. The apparatus of claim 1, wherein the one or more processors are further configured to cause the first wireless device to perform at least one of:

release one or more first protocol data unit (PDU) sessions, one or more radio access service data adaptation protocol (SDAP) entities, one or more packet data convergence protocol (PDCP) entities, or one or more local link channels in response to at least one of a first local link radio link failure (RLF), reception of a first indication of a first radio access link RLF from the second wireless device, reception of an indication of second wireless device mobility, or first wireless device mobility from the second wireless device, wherein the one or more first PDU sessions, the one or more SDAP entities, the one or more PDCP entities, or the one or more local link channels are associated with at least some of the one or more first session termination points associated with the relocation; or resume one or more second PDU sessions or one or more radio access bearers over a radio access link or a relay link via a third wireless device in response to at least one of a second local link RLF, receipt of a second indication of a second radio access link RLF, first wireless mobility from the second wireless device, or second wireless mobility, wherein the one or more second PDU sessions or the one or more radio access bearers are associated with at least one of the one or more first session termination points associated with the relocation.

15. The apparatus of claim 1, wherein each of the one or more radio access packet data sessions corresponds to a protocol data unit (PDU) session associated with a Uu radio access technology (RAT).

16. An apparatus for wireless communication at a second wireless device, comprising:

memory; and one or more processors coupled to the memory and configured to cause the second wireless device to:

identify at least one configuration for a relocation of one or more first session termination points associated with one or more radio access packet data sessions from the second wireless device to a first wireless device or from the first wireless device to the second wireless device;

execute the relocation of the one or more first session termination points associated with the one or more radio access packet data sessions from the second wireless device to the first wireless device or from the first wireless device to the second wireless device based on the at least one configuration for the relocation of the one or more first session termination points;

communicate, with the first wireless device, a message for a sequence number (SN) status transfer that comprises a hyper frame number (HFN) associated with a missing service data unit (SDU); and forward data between a network and the first wireless device based on at least one first radio access packet data session of the one or more radio access packet data sessions, the SN status transfer, and a radio access security key material, wherein the radio access security key material is based on an original security key material associated with the second wireless device prior to execution of the relocation of the one or more first session termination points, wherein at least one first session termination point of the one or more first session termination points is associated with the at least one first radio access packet data session associated with the relocation, wherein the radio access security key material is different from the original security key material, and wherein the original security key material is associated with a UE to base station connection.

17. The apparatus of claim 16, further comprising at least one antenna coupled to the memory and the one or more processors, wherein the one or more processors are further configured to cause the second wireless device to:

receive, from the first wireless device, an indication of whether the first wireless device supports the relocation of the one or more first session termination points.

18. The apparatus of claim 16, wherein the relocation of the one or more first session termination points is from the second wireless device to the first wireless device, and to identify the at least one configuration for the relocation of the one or more first session termination points, the one or more processors are further configured to cause the second wireless device to:

generate, at the second wireless device, a first configuration for relocation of one or more second session termination points associated with one or more protocol data unit (PDU) sessions from the second wireless device to the first wireless device and a second configuration for relocation of one or more third session termination points associated with one or more corresponding bearers from the second wireless device to the first wireless device, wherein the second configuration comprises at least one of a service data adaptation protocol (SDAP) configuration, a packet data convergence protocol (PDCP) configuration, the radio access security key material, or a local link configuration that includes a local link quality of service (QoS) configuration, wherein at least one of the first configuration or the second configuration is associated with the second wireless device prior to the execution of the relocation of the one or more first session termination points, the at least one configuration includes the first configuration and the second configuration, and the one or more first session termination points include the one or more second session termination points and the one or more third session termination points.

19. The apparatus of claim 18, wherein the one or more processors are further configured to cause the second wireless device to:

transmit, to the first wireless device, a first indication of the first configuration and a second indication of the second configuration; and suspend or release the one or more PDU sessions or one or more radio access SDAP or PDCP entities associated with the one or more corresponding bearers.

20. The apparatus of claim 16, wherein the relocation of the one or more first session termination points is from the first wireless device to the second wireless device, and to identify the at least one configuration for the relocation of the one or more first session termination points, the one or more processors are further configured to cause the second wireless device to:

receive, from the first wireless device, a first indication of a first configuration for relocation of one or more second session termination points associated with one or more protocol data unit (PDU) sessions from the first wireless device to the second wireless device and a second indication of a second configuration for relocation of one or more third session termination points associated with one or more corresponding bearers from the first wireless device to the second wireless device, wherein the second configuration comprises at least one of a service data adaptation protocol (SDAP) configuration, a packet data convergence protocol (PDCP) configuration, or the radio access security key material, wherein at least one of the first configuration or the second configuration is associated with the first wireless device prior to the execution of the relocation of the one or more first session termination points, the at least one configuration includes the first configuration and the second configuration, and the one or more first session termination points include the one or more second session termination points and the one or more third session termination points.

21. The apparatus of claim 16, wherein the one or more processors are further configured to cause the second wireless device to:

transmit, to a network entity, an indication of a preference associated with the relocation of the one or more first session termination points.

22. The apparatus of claim 16, wherein the relocation of the one or more first session termination points is from the second wireless device to the first wireless device, and to identify the at least one configuration for the relocation of the one or more first session termination points, wherein the one or more processors are further configured to cause the second wireless device to:

receive, from a network entity, a fifth indication of a radio link control (RLC) configuration, a radio access medium access control (MAC) configuration, or a second adaptation layer configuration; and receive, from the network entity, a first indication of a first configuration for relocation of one or more second session termination points associated with one or more protocol data unit (PDU) sessions from the second wireless device to the first wireless device and a second indication of a second configuration for relocation of one or more third session termination points associated with one or more corresponding bearers from the second wireless device to the first wireless device, wherein the second configuration comprises at least one of a service data adaptation protocol (SDAP) configuration, a packet data convergence protocol (PDCP) configuration, the radio access security key material, or a first adaptation layer configuration, wherein the at least one configuration includes the RLC configuration, the radio access MAC configuration, the second adaptation layer configuration, the first configuration, or the second configuration, and the one or more first session termination points include the one or more second session termination points and the one or more third session termination points.

23. The apparatus of claim 22, wherein the one or more processors are further configured to cause the second wireless device to:

transmit, to the first wireless device, a third indication of the first configuration for the relocation of the one or more second session termination points associated with the one or more PDU sessions from the second wireless device to the first wireless device and a fourth indication of the second configuration for the relocation of the one or more third session termination points associated with the one or more corresponding bearers from the second wireless device to the first wireless device; and release the one or more PDU sessions or one or more SDAP or PDCP entities associated with the one or more corresponding bearers.

24. The apparatus of claim 16, wherein the relocation of the one or more first session termination points is from the first wireless device to the second wireless device, and to identify the at least one configuration for the relocation of the one or more first session termination points, the one or more processors are further configured to cause the second wireless device to:

receive, from a network entity, a first indication of a first configuration for relocation of one or more second session termination points associated with one or more protocol data unit (PDU) sessions from the first wireless device to the second wireless device and a second indication of a second configuration for relocation of one or more third session termination points associated with one or more corresponding bearers from the first wireless device to the second wireless device, wherein the second configuration comprises at least one of a service data adaptation protocol (SDAP) configuration, a packet data convergence protocol (PDCP) configuration, or the radio access security key material, wherein the at least one configuration includes the first configuration and the second configuration, and the one or more first session termination points include the one or more second session termination points and the one or more third session termination points.

25. The apparatus of claim 16, wherein the relocation of the one or more first session termination points is from the second wireless device to the first wireless device, and wherein to communicate the message for the SN status transfer, the one or more processors are configured to cause the first wireless device to:

transmit, to the first wireless device, the message for the SN status transfer; and forward first data to the first wireless device.

26. The apparatus of claim 16, wherein the relocation of the one or more first session termination points is from the first wireless device to the second wireless device, and wherein to communicate the message for the SN status transfer, the one or more processors are configured to cause the first wireless device to:

receive, from the first wireless device, the message for the SN status transfer; and receive, from the first wireless device, forwarded first data.

27. The apparatus of claim 16, wherein the one or more processors are further configured to cause the second wireless device to perform at least one of:

release one or more first protocol data unit (PDU) sessions or one or more first radio access bearers in response to a first radio access link radio link failure (RLF), wherein the one or more first PDU sessions or the one or more first radio access bearers are associated with at least some of the one or more first session termination points associated with the execution of the relocation;

resume one or more second PDU sessions or one or more second radio access bearers in response to a second radio access link RLF, wherein the one or more second PDU sessions or the one or more second radio access bearers are associated with at least some of the one or more first session termination points associated with the relocation;

indicate to the first wireless device to release one or more third PDU sessions or one or more third radio access bearers in response to second wireless device mobility, wherein the one or more third PDU sessions or the one or more third radio access bearers are associated with at least some of the one or more first session termination points associated with the execution of the relocation; or receive, from the first wireless device, an indication to release one or more fourth PDU sessions or one or more fourth radio access bearers in response to first wireless device mobility, wherein the one or more fourth PDU sessions or the one or more fourth radio access bearers are associated with at least some of the one or more first session termination points associated with the execution of the relocation.

28. The apparatus of claim 16, wherein each of the one or more radio access packet data sessions corresponds to a protocol data unit (PDU) session associated with a Uu radio access technology (RAT).

29. A method for wireless communication performed by a first wireless device, comprising:

identifying at least one configuration for a relocation of one or more first session termination points associated with one or more radio access packet data sessions from a second wireless device to the first wireless device or from the first wireless device to the second wireless device;

executing the relocation of the one or more first session termination points associated with the one or more radio access packet data sessions from the second wireless device to the first wireless device or from the first wireless device to the second wireless device based on the at least one configuration for the relocation of the one or more first session termination points;

communicating, with the second wireless device, a message for a sequence number (SN) status transfer that comprises a hyper frame number (HFN) associated with a missing service data unit (SDU); and transmitting or receiving data with a network, based on a radio access security key material and the SN status transfer, wherein the radio access security key material is based on an original security key material associated with the second wireless device prior to the executing of the relocation of the one or more first session termination points, via the second wireless device based on the relocation of the one or more first session termination points, wherein the radio access security key material is different from the original security key material, and wherein the original security key material is associated with a UE to base station connection.

30. The method of claim 29, further comprising:

transmitting, to the second wireless device, an indication of whether the first wireless device supports the relocation of the one or more first session termination points.

31. The method of claim 29, wherein the relocation of the one or more first session termination points is from the second wireless device to the first wireless device, and identifying the at least one configuration for the relocation of the one or more first session termination points further comprises:

receiving, from the second wireless device, a first indication of a first configuration for relocation of one or more second session termination points associated with one or more protocol data unit (PDU) sessions from the second wireless device to the first wireless device and a second indication of a second configuration for relocation of one or more third session termination points associated with one or more corresponding bearers from the second wireless device to the first wireless device, wherein the second configuration comprises at least one of a service data adaptation protocol (SDAP) configuration, a packet data convergence protocol (PDCP) configuration, the radio access security key material, or a local link configuration that includes a local link quality of service (QoS) configuration, wherein at least one of the first configuration or the second configuration is associated with the second wireless device prior to the executing of the relocation of the one or more first session termination points, the at least one configuration includes the first configuration and the second configuration, and the one or more first session termination points include the one or more second session termination points and the one or more third session termination points.

32. The method of claim 29, wherein the relocation of the one or more first session termination points is from the first wireless device to the second wireless device, and identifying the at least one configuration for the relocation of the one or more first session termination points further comprises:

generating, at the first wireless device, a first configuration for relocation of one or more second session termination points associated with one or more protocol data unit (PDU) sessions from the first wireless device to the second wireless device and a second configuration for relocation of one or more third session termination points associated with one or more corresponding bearers from the first wireless device to the second wireless device, wherein the second configuration comprises at least one of a service data adaptation protocol (SDAP) configuration, a packet data convergence protocol (PDCP) configuration, or the radio access security key material, wherein at least one of the first configuration or the second configuration is associated with the first wireless device prior to the executing of the relocation of the one or more first session termination points, the at least one configuration includes the first configuration and the second configuration, and the one or more first session termination points include the one or more second session termination points and the one or more third session termination points.

33. The method of claim 32, further comprising:

transmitting, to the second wireless device, a first indication of the first configuration and a second indication of the second configuration; and suspending or releasing the one or more PDU sessions, one or more radio access SDAP or PDCP entities, or one or more local link channels associated with the one or more corresponding bearers.

34. The method of claim 29, further comprising:

transmitting, to a network entity, an indication of a preference associated with the relocation of the one or more first session termination points.

35. The method of claim 29, wherein the relocation of the one or more first session termination points is from the second wireless device to the first wireless device, and identifying the at least one configuration for the relocation of the one or more first session termination points further comprises:

receiving, from the second wireless device, a first indication of a first configuration for relocation of one or more second session termination points associated with one or more protocol data unit (PDU) sessions from the second wireless device to the first wireless device and a second indication of a second configuration for relocation of one or more third session termination points associated with one or more corresponding bearers from the second wireless device to the first wireless device, wherein the first configuration and the second configuration are from a network entity, the second configuration comprises at least one of a service data adaptation protocol (SDAP) configuration, a packet data convergence protocol (PDCP) configuration, or the radio access security key material, wherein the at least one configuration includes the first configuration and the second configuration, and the one or more first session termination points include the one or more second session termination points and the one or more third session termination points.

36. A method for wireless communication performed by a second wireless device, comprising:

identifying at least one configuration for a relocation of one or more first session termination points associated with one or more radio access packet data sessions from the second wireless device to a first wireless device or from the first wireless device to the second wireless device;

executing the relocation of the one or more first session termination points associated with the one or more radio access packet data sessions from the second wireless device to the first wireless device or from the first wireless device to the second wireless device based on the at least one configuration for the relocation of the one or more first session termination points;

communicating, with the first wireless device, a message for a sequence number (SN) status transfer that comprises a hyper frame number (HFN) associated with a missing service data unit (SDU); and forwarding data between a network and the first wireless device based on at least one first radio access packet data session of the one or more radio access packet data sessions, the SN status transfer, and a radio access security key material, wherein the radio access security key material is based on an original security key material associated with the second wireless device prior to execution of the relocation of the one or more first session termination points, wherein at least one first session termination point of the one or more first session termination points is associated with the at least one first radio access packet data session associated with the relocation, wherein the radio access security key material is different from the original security key material, and wherein the original security key material is associated with a UE to base station connection.

37. A method for wireless communication performed by a second wireless device, comprising:

identifying at least one configuration for a relocation of one or more first session termination points associated with one or more radio access packet data sessions from the second wireless device to a first wireless device or from the first wireless device to the second wireless device;

executing the relocation of the one or more first session termination points associated with the one or more radio access packet data sessions from the second wireless device to the first wireless device or from the first wireless device to the second wireless device based on the at least one configuration for the relocation of the one or more first session termination points;

communicating, with the second wireless device, a message for a sequence number (SN) status transfer that comprises a hyper frame number (HFN) associated with a missing service data unit (SDU); and forwarding data between a network and the first wireless device based on at least one first radio access packet data session of the one or more radio access packet data sessions, the SN status transfer, and a radio access security key material, wherein the radio access security key material is based on an original security key material associated with the second wireless device prior to execution of the relocation of the one or more first session termination points, wherein at least one first session termination point of the one or more first session termination points is associated with the at least one first radio access packet data session associated with the relocation, wherein the radio access security key material is different from the original security key material, and wherein the original security key material is associated with a UE to base station connection.

38. A non-transitory computer-readable medium storing computer executable code at a first wireless device, the code when executed by one or more processors causes the first wireless device to:

identify at least one configuration for a relocation of one or more first session termination points associated with one or more radio access packet data sessions from a second wireless device to the first wireless device or from the first wireless device to the second wireless device;

execute the relocation of the one or more first session termination points associated with the one or more radio access packet data sessions from the second wireless device to the first wireless device or from the first wireless device to the second wireless device based on the at least one configuration for the relocation of the one or more first session termination points;

communicate, with the second wireless device, a message for a sequence number (SN) status transfer that comprises a hyper frame number (HFN) associated with a missing service data unit (SDU); and transmit or receive data with a network, based on a radio access security key material and the SN status transfer, wherein the radio access security key material is based on an original security key material associated with the second wireless device prior to executing of the relocation of the one or more first session termination points, via the second wireless device based on the relocation of the one or more first session termination points, wherein the radio access security key material is different from the original security key material, and wherein the original security key material is associated with a UE to base station connection.

39. A non-transitory computer-readable medium storing computer executable code at a second wireless device, the code when executed by one or more processors causes the second wireless device to:

identify at least one configuration for a relocation of one or more first session termination points associated with one or more radio access packet data sessions from the second wireless device to a first wireless device or from the first wireless device to the second wireless device;

execute the relocation of the one or more first session termination points associated with the one or more radio access packet data sessions from the second wireless device to the first wireless device or from the first wireless device to the second wireless device based on the at least one configuration for the relocation of the one or more first session termination points;

communicate, with the first wireless device, a message for a sequence number (SN) status transfer that comprises a hyper frame number (HFN) associated with a missing service data unit (SDU); and forward data between a network and the first wireless device based on at least one first radio access packet data session of the one or more radio access packet data sessions, the SN status transfer, and a radio access security key material, wherein the radio access security key material is based on an original security key material associated with the second wireless device prior to execution of the relocation of the one or more first session termination points, wherein at least one first session termination point of the one or more first session termination points is associated with the at least one first radio access packet data session associated with the relocation, wherein the radio access security key material is different from the original security key material, and wherein the original security key material is associated with a UE to base station connection.

40. The non-transitory computer-readable medium of claim 38, wherein the code, when executed by the one or more processors, is further configured to cause the first wireless device to:

transmit, to the second wireless device, an indication of whether the first wireless device supports the relocation of the one or more first session termination points.

41. The non-transitory computer-readable medium of claim 38, wherein the relocation of the one or more first session termination points is from the second wireless device to the first wireless device, and to identify the at least one configuration for the relocation of the one or more first session termination points, and the code, when executed by the one or more processors, is further configured to cause the first wireless device to:

receive, from the second wireless device, a first indication of a first configuration for relocation of one or more second session termination points associated with one or more protocol data unit (PDU) sessions from the second wireless device to the first wireless device and a second indication of a second configuration for relocation of one or more third session termination points associated with one or more corresponding bearers from the second wireless device to the first wireless device, wherein the second configuration comprises at least one of a service data adaptation protocol (SDAP) configuration, a packet data convergence protocol (PDCP) configuration, or the radio access security key material, a local link configuration that includes a local link quality of service (Qos) configuration, wherein at least one of the first configuration or the second configuration is associated with the second wireless device prior to the execution of the relocation of the one or more first session termination points, the at least one configuration includes the first configuration and the second configuration, and the one or more first session termination points include the one or more second session termination points and the one or more third session termination points.

42. The non-transitory computer-readable medium of claim 39, wherein the code, when executed by the one or more processors, is further configured to cause the second wireless device to:

receive, from the first wireless device, an indication of whether the first wireless device supports the relocation of the one or more first session termination points.

43. The non-transitory computer-readable medium of claim 39, wherein the relocation of the one or more first session termination points is from the second wireless device to the first wireless device, and to identify the at least one configuration for the relocation of the one or more first session termination points, the code, when executed by the one or more processors, is further configured to cause the second wireless device to:

generate, at the second wireless device, a first configuration for relocation of one or more second session termination points associated with one or more protocol data unit (PDU) sessions from the second wireless device to the first wireless device and a second configuration for relocation of one or more third session termination points associated with one or more corresponding bearers from the second wireless device to the first wireless device, wherein the second configuration comprises at least one of a service data adaptation protocol (SDAP) configuration, a packet data convergence protocol (PDCP) configuration, the radio access security key material, or a local link configuration that includes a local link quality of service (QoS) configuration, wherein at least one of the first configuration or the second configuration is associated with the second wireless device prior to the execution of the relocation of the one or more first session termination points, the at least one configuration includes the first configuration and the second configuration, and the one or more first session termination points include the one or more second session termination points and the one or more third session termination points.

44. The method of claim 36, further comprising:

receiving, from the first wireless device, an indication of whether the first wireless device supports the relocation of the one or more first session termination points.

45. The method of claim 36, wherein the relocation of the one or more first session termination points is from the second wireless device to the first wireless device, and identifying the at least one configuration for the relocation of the one or more first session termination points, includes:

generating, at the second wireless device, a first configuration for relocation of one or more second session termination points associated with one or more protocol data unit (PDU) sessions from the second wireless device to the first wireless device and a second configuration for relocation of one or more third session termination points associated with one or more corresponding bearers from the second wireless device to the first wireless device, wherein the second configuration comprises at least one of a service data adaptation protocol (SDAP) configuration, a packet data convergence protocol (PDCP) configuration, the radio access security key material, or a local link configuration that includes a local link quality of service (QoS) configuration, wherein at least one of the first configuration or the second configuration is associated with the second wireless device prior to the execution of the relocation of the one or more first session termination points, the at least one configuration includes the first configuration and the second configuration, and the one or more first session termination points include the one or more second session termination points and the one or more third session termination points.

46. The method of claim 36, wherein the relocation of the one or more first session termination points is from the first wireless device to the second wireless device, and identifying the at least one configuration for the relocation of the one or more first session termination points, further includes:

receiving, from the first wireless device, a first indication of a first configuration for relocation of one or more second session termination points associated with one or more protocol data unit (PDU) sessions from the first wireless device to the second wireless device and a second indication of a second configuration for relocation of one or more third session termination points associated with one or more corresponding bearers from the first wireless device to the second wireless device, wherein the second configuration comprises at least one of a service data adaptation protocol (SDAP) configuration, a packet data convergence protocol (PDCP) configuration, or the radio access security key material, wherein at least one of the first configuration or the second configuration is associated with the first wireless device prior to the execution of the relocation of the one or more first session termination points, the at least one configuration includes the first configuration and the second configuration, and the one or more first session termination points include the one or more second session termination points and the one or more third session termination points.

47. The method of claim 36, further comprising:

transmitting, to a network entity, an indication of a preference associated with the relocation of the one or more first session termination points.

48. The method of claim 36, wherein the relocation of the one or more first session termination points is from the second wireless device to the first wireless device, and identifying the at least one configuration for the relocation of the one or more first session termination points, includes:

receiving, from a network entity, a fifth indication of a radio link control (RLC) configuration, a radio access medium access control (MAC) configuration, or a second adaptation layer configuration; and receiving, from the network entity, a first indication of a first configuration for relocation of one or more second session termination points associated with one or more protocol data unit (PDU) sessions from the second wireless device to the first wireless device and a second indication of a second configuration for relocation of one or more third session termination points associated with one or more corresponding bearers from the second wireless device to the first wireless device, wherein the second configuration comprises at least one of a service data adaptation protocol (SDAP) configuration, a packet data convergence protocol (PDCP) configuration, the radio access security key material, or a first adaptation layer configuration, wherein the at least one configuration includes the RLC configuration, the radio access MAC configuration, the second adaptation layer configuration, the first configuration, or the second configuration, and the one or more first session termination points include the one or more second session termination points and the one or more third session termination points.

\* \* \* \* \*